United States Patent [19]
Knowles et al.

[11] Patent Number: 5,661,822
[45] Date of Patent: Aug. 26, 1997

[54] DATA COMPRESSION AND DECOMPRESSION

[75] Inventors: Gregory P. Knowles; Adrian S. Lewis, both of Palma, Spain

[73] Assignees: Klics, Ltd., St. Helier, United Kingdom; Media Vision, Inc., Fremont, Calif.

[*] Notice: The term of this patent shall not extend beyond the expiration date of Pat. No. 5,546,477.

[21] Appl. No.: 321,656

[22] Filed: Oct. 12, 1994

Related U.S. Application Data

[63] Continuation of Ser. No. 100,747, Jul. 30, 1993, abandoned, which is a continuation-in-part of Ser. No. 40,301, Mar. 30, 1993.

[51] Int. Cl.$^6$ .................................................. G06K 9/36
[52] U.S. Cl. .................................................. 382/233
[58] Field of Search ................................. 382/205, 278, 382/279, 233, 244, 260, 264

[56] References Cited

U.S. PATENT DOCUMENTS

| | | | |
|---|---|---|---|
| 4,599,567 | 7/1986 | Goupillaud et al. | 324/76.33 |
| 4,817,182 | 3/1989 | Adelson et al. | 382/56 |
| 4,821,223 | 4/1989 | David | 364/724.05 |
| 4,827,336 | 5/1989 | Acampora et al. | 358/135 |
| 4,829,378 | 5/1989 | Legall | 382/43 |
| 4,837,517 | 6/1989 | Barber | 324/339 |
| 4,864,398 | 9/1989 | Avis et al. | 358/140 |
| 4,982,283 | 1/1991 | Acampora | 358/133 |
| 5,014,134 | 5/1991 | Lawton et al. | 358/261.3 |

OTHER PUBLICATIONS

IEEE Transactions On Information Theory, "Special Issue On Wavelet Transforms And Multiresolution Signal Analysis", vol. 38, No. 2, (Part II of two parts), Mar. 1992, (pp. 529–930).

*Information technology—Digital compression and coding of continuous–tone still images*—, Draft International Standard, ISO/IEC DIS 10918–1, 1991, pp. i–M3.

A.S. Lewis et al., "Video Compression Using 3D Wavelet Transforms", Electronic Letters, Mar. 15, 1990, vol. 26, No. 6, pp. 396–397.

(List continued on next page.)

*Primary Examiner*—Joseph Mancuso
*Assistant Examiner*—Gerard Del Rosso
*Attorney, Agent, or Firm*—Robert O. Guillot; Emil C. Chang

[57] ABSTRACT

A decompression method uses four coefficient inverse perfect reconstruction digital filters. The coefficients of these inverse perfect reconstruction digital filters require a small number of additions to implement thereby enabling rapid decompression in software. The method partially inverse transforms a sub-band decomposition to generate a small low pass component image. This small image is expanded in one dimension by performing interpolation on the rows of the small image and is expanded in a second dimension by replicating rows of the interpolated small image. Transformed chrominance data values may be inverse transformed using inverse perfect reconstruction digital filters having a fewer number of coefficients than the inverse perfect reconstruction digital filters used to inverse transform the corresponding transformed luminance data values. In one embodiment, two coefficient Haar digital filters are used as the inverse perfect reconstruction digital filters which inverse transform transformed chrominance data values. Variable-length tokens are used in the compressed data stream to indicate changes in encoding methods used to encode data values in the compressed data stream.

8 Claims, 24 Drawing Sheets

Microfiche Appendix Included
(2 Microfiche, 170 Pages)

OTHER PUBLICATIONS

A.S. Lewis et al., "VLSI Architecture For 2-D Daubechies Wavelet Transform Without Multipliers", Electronic Letters, Jan. 17, 1991, vol. 27, No. 2, pp. 171-172.

A.S. Lewis et al., "A 64 Kb/s Video Codec Using The 2-D Wavelet Transform", IEEE Jan., 1991, pp. 196-201.

G. Knowles, "VLSI Architecture For The Discrete Wavelet Transform," Electronic Letters, Jul. 19, 1990, vol. 26 No. 15, pp. 1184-1185.

A.S. Lewis et al., "Image Compression Using the 2-D Wavelet Transform," IEEE, vol. 1 No. 2, Apr. 1992, pp. 244-250.

Ronald E. Crochiere et al., "Multirate Digital Signal Processing", Prentice-Hall, 1983, pp. 378-392.

I. Daubechies, "Orthonormal Bases of Compactly Supported Wavelets", Technical Report AT&T Bell Laboratories, 1988, pp. 909-996.

A. Grossman et al., "Decomposition of Functions into Wavelets of Constant Shape and Related Transforms", *Mathematics + Physics*; *Lectures on Recent Results*, World Scientific Publishing Co., Singapore 1985, pp. 135-165.

R. Kronland-Martinet et al., "Analysis of sound patterns through wavelet transforms", IEEE Workshop on Expert Systems and Pattern Analysis, vol. 1, Jan. 1987, pp. 1-8.

D. Marr, "Vision: A Computational Investigation into the Human Representation and Processing of Visual Information", W.H. Freeman & Co., 1982, pp. 61-67.

W.K. Pratt, "Digital Image Processing", J. Wiley & Sons, 1978, pp. 254-257.

F.B. Tuteur, "Wavelet Transformations in Signal Detection", IEEE Int'l. Conf. on Acoustics, Speech and Signal Processing, 1988, pp. 1435-1438.

P.M. Farrelle et al., "Recursive Block Coding—A New Approach to Transform Coding", IEEE Trans. on Comm. Tech., vol. Com-34, No. 2, Feb. 1986, pp. 161-179.

J.C. Candy et al., "Transmitting Television as Clusters of Frame-to-Frame Differences", The Bell System Technical Journal, vol. 50, No. 6, Jul.-Aug. 1971, pp. 1889-1917.

M. Tasto et al., "Image Coding by Adaptive Block Quantization", IEEE Trans. on Comm. Tech., vol. COM-19, No. 6, Dec. 1971, pp. 957-971.

J.O. Limb et al., "Combining Intraframe and Frame-to-Frame Coding for Television", The Bell System Technical Journal, vol. 53, No. 6, Jul./Aug. 1974, pp. 1137-1173.

C. Reader, "Intraframe and Interframe Adaptive Transform Coding", SPIE vol. 66, Efficient Transmission of Pictorial Information, 1975, pp. 108-117.

B.G. Haskell, "Interframe Coding of Monochrome Television—A Review", SPIE vol. 87, Advances in Image Transmission Techniques, 1976, pp. 212-221.

A.G. Tescher et al., "An Adaptive Transform Coding Algorithm", IEEE Int'l Conf. on Comm., Jan. 1976, pp. 47-20 through 47-25.

R.V. Cox et al., "Channel Rate Equalization Techniques for Adaptive Transform Coders", SPIE vol. 87, Advances in Image Transmission Techniques, 1976, pp. 239-246.

A.G. Tescher et al., "Image Coding: Variable Rate DPCM Through Fixed Rate Channel", SPIE vol. 119, Applications of Digital Image Processing (IOCC1977), 1977, pp. 147-154.

B.G. Haskell et al., "Interframe Coding of 525-Line, Monochrome Television at 1.5 Mbits/s", IEEE Trans. on Comm., vol. COM-25, No. 11, Nov. 1977, pp. 1339-1348.

A.G. Tescher, "A Dual Transform Coding Algorithm", National Telecommunications Conference, IEEE Publication No. CH1514-9/79/0000-0032, Nov. 1979, pp. 53.4.1 through 53.4.4.

A.G. Tescher, "Adaptive Transform Coding of Color Images at Low Rates", National Telecommunications Conference, IEEE Publication No. CH1539-6/80/0000-0180, Nov. 30-Dec., 4, 1980, pp. 36.3.1-36.3.4..

H. Kaneko et al., "Digital Television Transmission Using Bandwidth Compression Techniques", IEEE Communications Magazine, IEEE No. 0163-6804/80/07000-0014, Jul. 1980, pp. 14-22.

A.G. Tescher, "Transform Coding Strategies at Low Rates", National Telecommunications Conference, IEEE No. CH1679-0/81/0000-0140, Nov. 1981, pp. C9.2.1-C9.2.3.

I. Daubechies et al., "Introduction to the Special Issue on Wavelet Transforms and Multiresolution Signal Analysis", IEEE Trans. on Info. Theory, vol. 38, No. 2, Mar. 1992, pp. 529-531.

W.M. Lawton, "tight frames of compactly supported affine wavelets", J. Math. Phys. 31(8), Aug. 1990, pp. 1898-1901.

W.M. Lawton, "Necessary and sufficient conditions for constructing orthonormal wavelet bases", J. Math. Phys. 32(1), Jan. 1991, pp. 57-61.

W.M. Lawton, "Multi-resolution properties of the wavelet Galerkin operator", J. Math. Phys. 32(6), Jun. 1991, pp. 1440-1443.

Criminal Justice Information Services—Federal Bureau of Investigation, "WSQ Gray-scale Fingerprint Image Compression Specification", LAFS-IC, Feb. 16, 1993, 53 pgs.

J. Bradley et al., "1992 Progress Report: Compression Of Fingerprint Data Using The Wavelet Vector Quantization Image Compression Algorithm", Los Alamos National Laboratory, Apr. 11, 1992, 34 pgs.

M. Antonini et al., "Image Coding Using Wavelet Transform", IEEE Trans. on Image Processing, vol. 1, No. 2, Apr. 1992, pp. 205-220.

C.M. Brislawn et al., "Classification Of Symmetric Wavelet Transforms", Los Alamos National Laboratory, Aug. 10, 1992 (revised Mar. 22, 1993) 45 pgs.

T. Hopper et al., "Compression of Grey-scale Fingerprint Images", *DCC '92 Data Compression Conference*, IEEE Computer Society Press, Los Alamitos, CA, 1992, pp. 309-318.

American National Standards Institute, "fingerprint identification—data format for information interchange", ANSI/NBS-ICST Jan. 1986, 61 pgs.

R.R. Coifman et al., "Wavelet Analysis and Signal Processing", Yale University, New Haven, CT., pp. 1-30.

S.G. Mallat, "Multiresolution Approximation And Wavelets", U. Penn. Report No. MS-CIS-87-87, GRASP LAB 80, Sep. (1987), 19 pgs.

S.G. Mallat, "A Theory For Multiresolution Signal Decompression: The Wavelet Representation", U. Penn. Report No. MS-CIS-87-22, GRASP LAB 103, May (1987), 28 pgs.

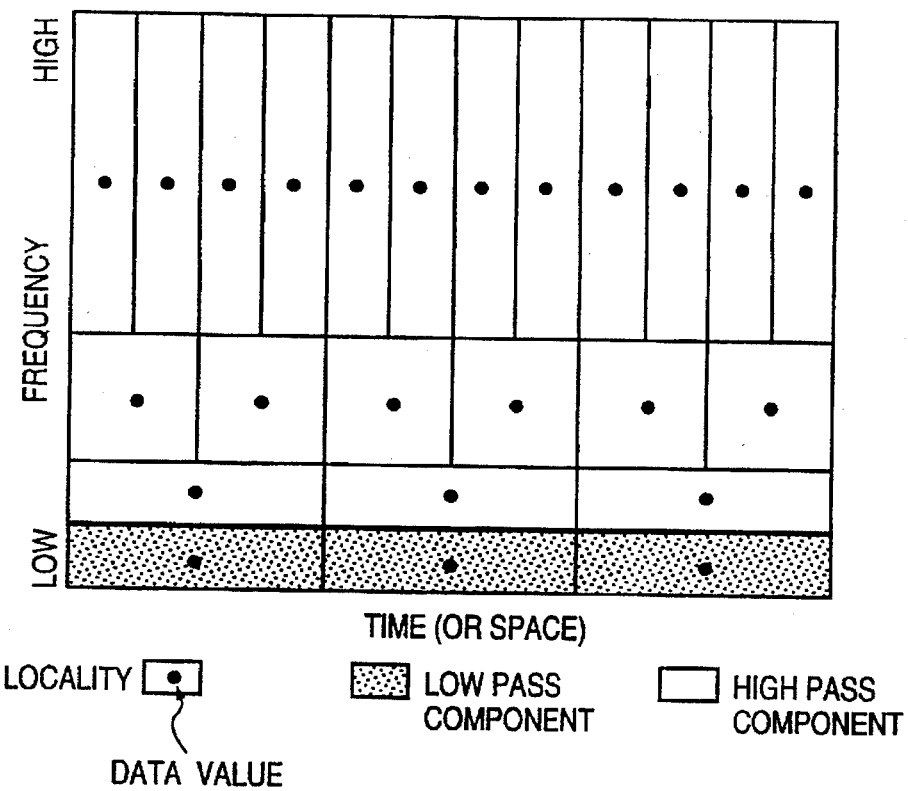
Fig. 7
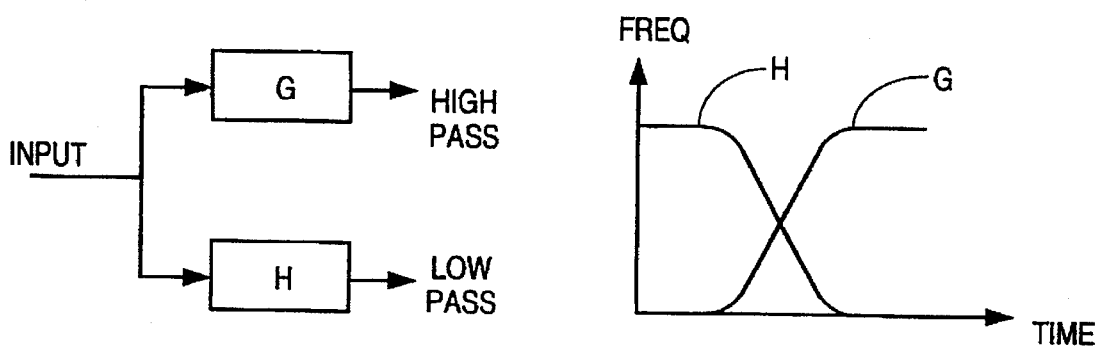
Fig. 8
Fig. 9

| ROW\COLUMN | 0 | 1 | 2 | 3 | 4 | 5 | 6 | 7 | 8 | 9 | A | B |
|---|---|---|---|---|---|---|---|---|---|---|---|---|
| 0 | $D_{00}$ | $D_{01}$ | $D_{02}$ | $D_{03}$ | $D_{04}$ | $D_{05}$ | $D_{06}$ | $D_{07}$ | $D_{08}$ | $D_{09}$ | $D_{0A}$ | $D_{0B}$ |
| 1 | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{1A}$ | $D_{1B}$ |
| 2 | $D_{20}$ | $D_{21}$ | $D_{22}$ | $D_{23}$ | $D_{24}$ | $D_{25}$ | $D_{26}$ | $D_{27}$ | $D_{28}$ | $D_{29}$ | $D_{2A}$ | $D_{2B}$ |
| 3 | $D_{30}$ | $D_{31}$ | $D_{32}$ | $D_{33}$ | $D_{34}$ | $D_{35}$ | $D_{36}$ | $D_{37}$ | $D_{38}$ | $D_{39}$ | $D_{3A}$ | $D_{3B}$ |
| 4 | $D_{40}$ | $D_{41}$ | $D_{42}$ | $D_{43}$ | $D_{44}$ | $D_{45}$ | $D_{46}$ | $D_{47}$ | $D_{48}$ | $D_{49}$ | $D_{4A}$ | $D_{4B}$ |
| 5 | $D_{50}$ | $D_{51}$ | $D_{52}$ | $D_{53}$ | $D_{54}$ | $D_{55}$ | $D_{56}$ | $D_{57}$ | $D_{58}$ | $D_{59}$ | $D_{5A}$ | $D_{5B}$ |
| 6 | $D_{60}$ | $D_{61}$ | $D_{62}$ | $D_{63}$ | $D_{64}$ | $D_{65}$ | $D_{66}$ | $D_{67}$ | $D_{68}$ | $D_{69}$ | $D_{6A}$ | $D_{6B}$ |
| 7 | $D_{70}$ | $D_{71}$ | $D_{72}$ | $D_{73}$ | $D_{74}$ | $D_{75}$ | $D_{76}$ | $D_{77}$ | $D_{78}$ | $D_{79}$ | $D_{7A}$ | $D_{7B}$ |
| 8 | $D_{80}$ | $D_{81}$ | $D_{82}$ | $D_{83}$ | $D_{84}$ | $D_{85}$ | $D_{86}$ | $D_{87}$ | $D_{88}$ | $D_{89}$ | $D_{8A}$ | $D_{8B}$ |
| 9 | $D_{90}$ | $D_{91}$ | $D_{92}$ | $D_{93}$ | $D_{94}$ | $D_{95}$ | $D_{96}$ | $D_{97}$ | $D_{98}$ | $D_{99}$ | $D_{9A}$ | $D_{9B}$ |
| A | $D_{A0}$ | $D_{A1}$ | $D_{A2}$ | $D_{A3}$ | $D_{A4}$ | $D_{A5}$ | $D_{A6}$ | $D_{A7}$ | $D_{A8}$ | $D_{A9}$ | $D_{AA}$ | $D_{AB}$ |
| B | $D_{B0}$ | $D_{B1}$ | $D_{B2}$ | $D_{B3}$ | $D_{B4}$ | $D_{B5}$ | $D_{B6}$ | $D_{B7}$ | $D_{B8}$ | $D_{B9}$ | $D_{BA}$ | $D_{BB}$ |

|  ROW \ COLUMN | 0 | 1 | 2 | 3 | 4 | 5 | 6 | 7 | 8 | 9 | A | B |
|---|---|---|---|---|---|---|---|---|---|---|---|---|
| 0 | $HH_{00}$ | $GH_{00}$ | $HH_{01}$ | $GH_{01}$ | $HH_{02}$ | $GH_{02}$ | $HH_{03}$ | $GH_{03}$ | $HH_{04}$ | $GH_{04}$ | $HH_{05}$ | $GH_{05}$ |
| 1 | $HG_{00}$ | $GG_{00}$ | $HG_{01}$ | $GG_{01}$ | $HG_{02}$ | $GG_{02}$ | $HG_{03}$ | $GG_{03}$ | $HG_{04}$ | $GG_{04}$ | $HG_{05}$ | $GG_{05}$ |
| 2 | $HH_{10}$ | $GH_{10}$ | $HH_{11}$ | $GH_{11}$ | $HH_{12}$ | $GH_{12}$ | $HH_{13}$ | $GH_{13}$ | $HH_{14}$ | $GH_{14}$ | $HH_{15}$ | $GH_{15}$ |
| 3 | $HG_{10}$ | $GG_{10}$ | $HG_{11}$ | $GG_{11}$ | $HG_{12}$ | $GG_{12}$ | $HG_{13}$ | $GG_{13}$ | $HG_{14}$ | $GG_{14}$ | $HG_{15}$ | $GG_{15}$ |
| 4 | $HH_{20}$ | $GH_{20}$ | $HH_{21}$ | $GH_{21}$ | $HH_{22}$ | $GH_{22}$ | $HH_{23}$ | $GH_{23}$ | $HH_{24}$ | $GH_{24}$ | $HH_{25}$ | $GH_{25}$ |
| 5 | $HG_{20}$ | $GG_{20}$ | $HG_{21}$ | $GG_{21}$ | $HG_{22}$ | $GG_{22}$ | $HG_{23}$ | $GG_{23}$ | $HG_{24}$ | $GG_{24}$ | $HG_{25}$ | $GG_{25}$ |
| 6 | $HH_{30}$ | $GH_{30}$ | $HH_{31}$ | $GH_{31}$ | $HH_{32}$ | $GH_{32}$ | $HH_{33}$ | $GH_{33}$ | $HH_{34}$ | $GH_{34}$ | $HH_{35}$ | $GH_{35}$ |
| 7 | $HG_{30}$ | $GG_{30}$ | $HG_{31}$ | $GG_{31}$ | $HG_{32}$ | $GG_{32}$ | $HG_{33}$ | $GG_{33}$ | $HG_{34}$ | $GG_{34}$ | $HG_{35}$ | $GG_{35}$ |
| 8 | $HH_{40}$ | $GH_{40}$ | $HH_{41}$ | $GH_{41}$ | $HH_{42}$ | $GH_{42}$ | $HH_{43}$ | $GH_{43}$ | $HH_{44}$ | $GH_{44}$ | $HH_{45}$ | $GH_{45}$ |
| 9 | $HG_{40}$ | $GG_{40}$ | $HG_{41}$ | $GG_{41}$ | $HG_{42}$ | $GG_{42}$ | $HG_{43}$ | $GG_{43}$ | $HG_{44}$ | $GG_{44}$ | $HG_{45}$ | $GG_{45}$ |
| A | $HH_{50}$ | $GH_{50}$ | $HH_{51}$ | $GH_{51}$ | $HH_{52}$ | $GH_{52}$ | $HH_{53}$ | $GH_{53}$ | $HH_{54}$ | $GH_{54}$ | $HH_{55}$ | $GH_{55}$ |
| B | $HG_{50}$ | $GG_{50}$ | $HG_{51}$ | $GG_{51}$ | $HG_{52}$ | $GG_{52}$ | $HG_{53}$ | $GG_{53}$ | $HG_{54}$ | $GG_{54}$ | $HG_{55}$ | $GG_{55}$ |

COLUMN

| ROW | 0 | 1 | 2 | 3 | 4 | 5 | 6 | 7 | 8 | 9 | A | B |
|---|---|---|---|---|---|---|---|---|---|---|---|---|
| 0 | $HHHH_{00}$ | $GH_{00}$ | $HHGH_{00}$ | $GH_{01}$ | $HHHH_{01}$ | $GH_{02}$ | $HHGH_{01}$ | $GH_{03}$ | $HHHH_{02}$ | $GH_{04}$ | $HHGH_{02}$ | $GH_{05}$ |
| 1 | $HG_{00}$ | $GG_{00}$ | $HG_{01}$ | $GG_{01}$ | $HG_{02}$ | $GG_{02}$ | $HG_{03}$ | $GG_{03}$ | $HG_{04}$ | $GG_{04}$ | $HG_{05}$ | $GG_{05}$ |
| 2 | $HHHG_{00}$ | $GH_{10}$ | $HHGG_{00}$ | $GH_{11}$ | $HHHG_{01}$ | $GH_{12}$ | $HHGG_{01}$ | $GH_{13}$ | $HHHG_{02}$ | $GH_{14}$ | $HHGG_{02}$ | $GH_{15}$ |
| 3 | $HG_{10}$ | $GG_{10}$ | $HG_{11}$ | $GG_{11}$ | $HG_{12}$ | $GG_{12}$ | $HG_{13}$ | $GG_{13}$ | $HG_{14}$ | $GG_{14}$ | $HG_{15}$ | $GG_{15}$ |
| 4 | $HHHH_{10}$ | $GH_{20}$ | $HHGH_{10}$ | $GH_{21}$ | $HHHH_{11}$ | $GH_{22}$ | $HHGH_{11}$ | $GH_{23}$ | $HHHH_{12}$ | $GH_{24}$ | $HHGH_{12}$ | $GH_{25}$ |
| 5 | $HG_{20}$ | $GG_{20}$ | $HG_{21}$ | $GG_{21}$ | $HG_{22}$ | $GG_{22}$ | $HG_{23}$ | $GG_{23}$ | $HG_{24}$ | $GG_{24}$ | $HG_{25}$ | $GG_{25}$ |
| 6 | $HHHG_{10}$ | $GH_{30}$ | $HHGG_{10}$ | $GH_{31}$ | $HHHG_{11}$ | $GH_{32}$ | $HHGG_{11}$ | $GH_{33}$ | $HHHG_{12}$ | $GH_{34}$ | $HHGG_{12}$ | $GH_{35}$ |
| 7 | $HG_{30}$ | $GG_{30}$ | $HG_{31}$ | $GG_{31}$ | $HG_{32}$ | $GG_{32}$ | $HG_{33}$ | $GG_{33}$ | $HG_{34}$ | $GG_{34}$ | $HG_{35}$ | $GG_{35}$ |
| 8 | $HHHH_{20}$ | $GH_{40}$ | $HHGH_{20}$ | $GH_{41}$ | $HHHH_{21}$ | $GH_{42}$ | $HHGH_{21}$ | $GH_{43}$ | $HHHH_{22}$ | $GH_{44}$ | $HHGH_{22}$ | $GH_{45}$ |
| 9 | $HG_{40}$ | $GG_{40}$ | $HG_{41}$ | $GG_{41}$ | $HG_{42}$ | $GG_{42}$ | $HG_{43}$ | $GG_{43}$ | $HG_{44}$ | $GG_{44}$ | $HG_{45}$ | $GG_{45}$ |
| A | $HHHG_{20}$ | $GH_{50}$ | $HHGG_{20}$ | $GH_{51}$ | $HHHG_{21}$ | $GH_{52}$ | $HHGG_{21}$ | $GH_{53}$ | $HHHG_{22}$ | $GH_{54}$ | $HHGG_{22}$ | $GH_{55}$ |
| B | $HG_{50}$ | $GG_{50}$ | $HG_{51}$ | $GG_{51}$ | $HG_{52}$ | $GG_{52}$ | $HG_{53}$ | $GG_{53}$ | $HG_{54}$ | $GG_{54}$ | $HG_{55}$ | $GG_{55}$ |

Fig. 18

PICTORIAL REPRESENTATION

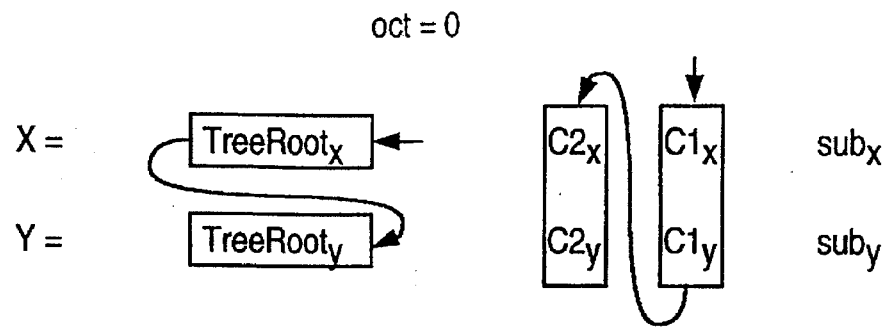
Fig. 27
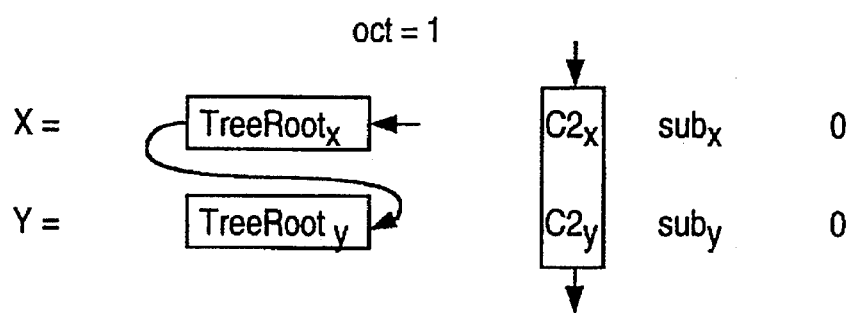
Fig. 28
| sub-band | | $sub_x$ | $sub_y$ |
|---|---|---|---|
| low pass | HH | 0 | 0 |
| high pass | HG | 0 | 1 |
| | GH | 1 | 0 |
| | GG | 1 | 1 |
Fig. 29

DATA COMPRESSION AND DECOMPRESSION

CROSS REFERENCE TO RELATED APPLICATION

This is a continuation of application Ser. No. 08/100,747 filed on Jul. 30, 1993, now abandoned which is a continuation-in-part of U.S. patent application Ser. No. 08/040,301, entitled "Data Compression and Decompression", filed Mar. 30, 1993.

CROSS REFERENCE TO MICROFICHE APPENDICES

Appendix A, which is a part of the present disclosure, is a microfiche appendix of 2 sheets of microfiche having a total of 168 frames. Microfiche Appendix A is a listing of a software implementation written in the programming language C.

Appendix B-1, which is a part of the present disclosure, is a microfiche appendix of 2 sheets of microfiche having a total of 79 frames. Appendix B-2, which is a part of the present disclosure, is a microfiche appendix of 2 sheets of microfiche having a total of 110 frames. Microfiche Appendices B-1 and B-2 together are a description of a hardware implementation in the commonly used hardware description language ELLA.

Appendix C, which is a part of the present disclosure, is a microfiche appendix of 2 sheets of microfiche having a total of 170 frames. Microfiche Appendix A is a listing of a software implementation written in the programming language C and assembly code.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to a method of and apparatus for data compression and decompression. In particular, this invention relates the compression, decompression, transmission and storage of audio, still-image and video data in digital form.

BACKGROUND INFORMATION

An image such as an image displayed on a computer monitor may be represented as a two-dimensional matrix of digital data values. A single frame on a VGA computer monitor may, for example, be represented as three matrixes of pixel values. Each of the three matrixes has a data value which corresponds to a pixel on the monitor.

The images on the monitor can be represented by a 640 by 480 matrix of data values representing the luminance (brightness) values Y of the pixels of the screen and two other 640 by 480 matrixes of data values representing the chrominance (color) values U and V of the pixels on the screen. Although the luminance and chrominance values are analog values, the one luminance value and the two chrominance values for a pixel may be digitized from analog form into discrete digital values. Each luminance and chrominance digital value may be represented by an 8-bit number. One frame of a computer monitor therefore typically requires about 7 megabits of memory to store in an uncompressed form.

In view of the large amount of memory required to store or transmit a single image in uncompressed digital form, it would be desirable to compress the digital image data before storage or transmission in such a way that the compressed digital data could later be decompressed to recover the original image data for viewing. In this way, a smaller amount of compressed digital data could be stored or transmitted. Accordingly, numerous digital image compression and decompression methods have been developed.

According to one method, each individual digital value is converted into a corresponding digital code. Some of the codes have a small number of bits whereas others of the codes have a larger number of bits. In order to take advantage of the fact that some of the codes are short whereas others of the codes are longer, the original digital data values of the original image are filtered using digital filters into a high frequency component and a low frequency component. The high frequency component represents ambiguities in the image and is therefore observed to have a comparatively large number of identical data values for real-world images. By encoding the commonly occurring digital data values in the high frequency component with the short digital codes, the total number of bits required to store the image data can be reduced from the number of bits that would otherwise be required if 8-bits were used to represent all of the data values. Because the total number of bits in the resulting encoded data is less than the total number of bits in the original sequence of data values, the original image is said to have been compressed.

To decompress the compressed encoded data to recover the original image data, the compressed encoded data is decoded using the same digital code. The resulting high and low frequency components are then recombined to form the two-dimensional matrix of original image data values.

Where the data being compressed is two-dimensional data such as image data, separation of the original data into high and low frequency components by the digital filters may be accomplished by filtering in two dimensions such as the horizontal dimension of the image and the vertical dimension of the image. Similarly, undecoded high and low frequency components can be recombined into the original image data values by recombining in two dimensions.

To achieve even greater compression, the low frequency component may itself be filtered into its high and low frequency components before encoding. Similarly, the low frequency component of the low frequency component may also be refiltered. This process of recursive filtering may be repeated a number of times. Whether or not recursive filtering is performed, the filtered image data is said to have been "transformed" into the high and low frequency components. This digital filtering is called a "transform". Similarly, the high and low pass components are said to be "inverse transformed" back into the original data values. This process is known as the "inverse transform".

FIG. 1 is a diagram of a digital gray-scale image of a solid black square 1 on a white background 2 represented by a 640 by 480 matrix of 8-bit data luminance values.

FIG. 2 is a diagram illustrating a first intermediate step in the generation of the high and low frequency components of the original image. A high pass digital filter which outputs a single data value using multiple data values as inputs is first run across the original image values from left to right, row by row, to generate G subblock 3. The number of digital values in G subblock 3 is half of the number of data values in the original image of FIG. 1 because the digital filter is sequentially moved to the right by twos to process two additional data values for each additional one data output generated for G subblock 3. Similarly, a low pass digital filter which outputs a single data value using multiple data values as inputs is first run across the original image values from left to right, row by row, to generate H subblock 4. The number of digital values in H subblock 4 is half of the number of data values in the original image because the digital filter is moved to the right by twos to process two additional data values for each additional one data output generated for H subblock. Each of two vertical bars in high pass G subblock 3 appears where a change occurs spatially in the horizontal dimension in the original image of FIG. 1. Where the G filter encounters a change from white data values to black data values when the filter G is run across the image of FIG. 1 in a horizontal direction, the G digital filter outputs a corresponding block data value into subblock 3. Similarly, when the G digital filter encounters the next change, which is this time a change from black to white data values, the G digital filter again outputs a corresponding black data value into G subblock 3.

FIG. 3 is a diagram illustrating a second intermediate step in the generation of the high and low frequency components of the original image. The high pass digital filter is run down the various columns of the subblocks H and G of FIG. 2 to form the HG subblock 5 and GG subblock 6 shown in FIG. 3. Similarly, the low pass digital filter is run down the various columns of the H and G subblocks 3 and 4 of FIG. 2 to form HH and GH subblocks 7 and 8 shown in FIG. 3. The result is the low pass component in subblock HH and the three high pass component subblocks GH, HG and GG. The total number of high and low pass component data values in FIG. 3 is equal to the number of data values in the original image of FIG. 1. The data values in the high pass component subblocks GH, HG and GG are referred to as the high frequency component data values of octave 0.

The low pass subblock HH is then filtered horizontally and vertically in the same way into its low and high frequency components. FIG. 4 illustrates the resulting subblocks. The data values in HHHG subblock 9, HHGH subblock 10, and HHGG subblock 11 are referred to as the high frequency component data values of octave 1. Subblock HHHH is the low frequency component. Although not illustrated, the low frequency HHHH subblock 12 can be refiltered using the same method. As can be seen from FIG. 3, the high frequency components of octaves 0 and 1 are predominantly white because black in these subblocks denotes changes from white to black or black to white in the data blocks from which to high frequency subblocks are generated. The changes, which are sometimes called edges, from white to black as well as black to white in FIG. 1 result in high frequency data values in the HG, HG and GG quadrants as illustrated in FIG. 3.

Once the image data has been filtered the desired number of times using the above method, the resulting transformed data values are encoded using a digital code such as the Huffman code in Table 1.

TABLE 1

| Corresponding Gray-Scale | Digital Value | Digital Code |
|---|---|---|
| . | | |
| . | | |
| . | | |
| | 5 | 1000001 |
| | 4 | 100001 |

TABLE 1-continued

| Corresponding Gray-Scale | Digital Value | Digital Code |
|---|---|---|
| | 2 | 10001 |
| black | 1 | 101 |
| white | 0 | 0 |
| | −1 | 111 |
| | −2 | 1101 |
| | −3 | 11001 |
| | −4 | 110001 |
| | −5 | 1100001 |
| . | | |
| . | | |
| . | | |

Because the high frequency components of the original image of FIG. 1 are predominantly white as is evident from FIGS. 3 and 4, the gray-scale white is assigned the single bit 0 in the above digital code. The next most common gray-scale color in the transformed image is black. Accordingly, gray-scale black is assigned the next shortest code of 101. The image of FIG. 1 is comprised only of black and white pixels. If the image were to involve other gray-scale shades, then other codes would be used to encode those gray-scale colors, the more predominant gray-scale shades being assigned the relatively shorter codes. The result of the Huffman encoding is that the digital values which predominate in the high frequency components are coded into codes having a few number of bits. Accordingly, the number of bits required to represent the original image data is reduced. The image is therefore said to have been compressed.

Problems occur during compression, however, when the digital filters operate at the boundaries of the data values. For example, when the high pass digital filter generating the high pass component begins generating high pass data values of octave 0 at the left hand side of the original image data, some of the filter inputs required by the filter do not exist.

FIG. 5 illustrates the four data values required by a four coefficient high pass digital filter G in order to generate the first high pass data value $G_0$ of octave 0. As shown in FIG. 5, data values $D_1$, $D_2$, $D_3$ and $D_4$ are required to generate the second high pass data value of octave 0, data value $G_1$. In order to generate the first high pass component output data value $G_0$, on the other hand, data values $D_{-1}$, $D_0$, $D_1$, and $D_2$ are required. Data value $D_{-1}$ does not, however, exist in the original image data.

Several techniques have been developed in an attempt to solve the problem of the digital filter extending beyond the boundaries of the image data being transformed. In one technique, called zero padding, the nonexistent data values outside the image are simply assumed to be zeros. This may result in discontinuities at the boundary, however, where an object in the image would otherwise have extended beyond the image boundary but where the assumed zeros cause an abrupt truncation of the object at the boundary. In another technique, called circular convolution, the two dimensional multi-octave transform can be expressed in terms of one dimensional finite convolutions. Circular convolution joins the ends of the data together. This introduces a false discontinuity at the join but the problem of data values extending beyond the image boundaries no longer exists. In another technique, called symmetric circular convolution, the image data at each data boundary is mirrored. A signal such as a ramp, for example, will become a peak when it is mirrored. In another technique, called doubly symmetric circular convolution, the data is not only mirrored spatially but the values are also mirrored about the boundary value. This method attempts to maintain continuity of both the signal and its first derivative but requires more computation for the extra mirror because the mirrored values must be pre-calculated before convolution.

FIG. 6 illustrates yet another technique which has been developed to solve the boundary problem. According to this technique, the high and low pass digital filters are moved through the data values in a snake-like pattern in order to eliminate image boundaries in the image data. After the initial one dimensional convolution, the image contains alternating columns of low and high pass information. By snaking through the low pass sub-band before the high pass, only two discontinuities are introduced. This snaking technique, however, requires reversing the digital filter coefficients on alternate rows as the filter moves through the image data. This changing of filter coefficients as well as the requirement to change the direction of movement of the digital filters through various blocks of data values makes the snaking technique difficult to implement. Accordingly, an easily implemented method for solving the boundary problem is sought which can be used in data compression and decompression.

Not only does the transformation result in problems at the boundaries of the image data, but the transformation itself typically requires a large number of complex computations and/or data rearrangements. The time required to compress and decompress an image of data values can therefore be significant. Moreover, the cost of associated hardware required to perform the involved computations of the forward transform and the inverse transform may be so high that the transform method cannot be used in cost-sensitive applications. A compression and decompression method is therefore sought that not only successfully handles the boundary problems associated with the forward transform and inverse transform but also is efficiently and inexpensively implementable in hardware and/or software. The computational complexity of the method should therefore be low.

In addition to transformation and encoding, even further compression is possible. A method known as tree encoding may, for example, be employed. Moreover, a method called quantization can be employed to further compress the data. Tree encoding and quantization are described in various texts and articles including "Image Compression using the 2-D Wavelet Transform" by A. S. Lewis and G. Knowles, published in IEEE Transactions on Image Processing, April 1992. Furthermore, video data which comprises sequences of images can be compressed by taking advantage of the similarities between successive images. Where a portion of successive images does not change from one image to the next, the portion of the first image can be used for the next image, thereby reducing the number of bits necessary to represent the sequence of images.

JPEG (Joint Photographics Experts Group) is an international standard for still-images which typically achieves about a 10:1 compression ratios for monochrome images and 15:1 compression ratios for color images. The JPEG standard employs a combination of a type of Fourier transform, known as the discrete-cosine transform, in combination with quantization and a Huffman-like code. MPEG1 (Motion Picture Experts Group) and MPEG2 are two international video compression standards. MPEG2 is a standard which is still evolving which is targeted for broadcast television. MPEG2 allows the picture quality to be adjusted to allow more television information to be transmitted on a given line. H.261 is another video standard based on the discrete-cosine transform. H.261 also varies the amount of compression depending on the data rate required.

Compression standards such as JPEG, MPEG1, MPEG2 and H.261 are optimized to minimize the signal to noise ratio of the error between the original and the reconstructed image. Due to this optimization, these methods are very complex. Chips implementing MPEG1, for example, may be costly and require as many as 1.5 million transistors. These methods only partially take advantage of the fact that the human visual system is quite insensitive to signal to noise ratio. Accordingly, some of the complexity inherent in these standards is wasted on the human eye. Moreover, because these standards encode by areas of the image, they are not particularly sensitive to edge-type information which is of high importance to the human visual system. In view of these maladaptions of current compression standards to the characteristics of the human visual system, a new compression and decompression method is sought which handles the above-described boundary problem and which takes advantage of the fact that the human visual system is more sensitive to edge information than signal to noise ratio so that the complexity and cost of implementing the method can be reduced.

A system is desired for compressing and decompressing video using dedicated digital hardware to compress and using software to decompress. For example, in a video mail application one user uses a hardware compression expansion card for an IBM PC personal computer coupled to a video camera to record a video message in the form of a video message file. This compressed video message file is then transmitted via electronic mail over a network such as a hardwired network of an office building. A recipient user receives the compressed video message file as he/she would receive a normal mail file and then uses the software to decompress the compressed video message file to retrieve the video mail. The video mail may be displayed on the monitor of the recipient's personal computer. It is desirable to be able to decompress in software because decompressing in software frees multiple recipients from purchasing relatively expensive hardware. Software for performing the decompression may, for example, be distributed free of charge to reduce the cost of the composite system.

In one prior art system, the Intel Indeo video compression system, a hardware compression expansion card compresses video and a software package is usable to decompress the compressed video. This system, however, only achieves a small compression ratio. Accordingly, video picture quality will not be able to be improved as standard personal computers increase in computing power and/or video bandwidth.

U.S. patent application Ser. No. 08/040,301 entitled "Data Compression and Decompression" discloses a method and apparatus for compressing and decompressing video. The software decompression implementation written in the programming language C disclosed in U.S. patent application Ser. No. 08/040,301 only decompresses at a few frames per second on a standard personal computer at the present date. A method capable of implementation in software which realizes faster decompression is therefore desirable.

SUMMARY OF THE INVENTION

A compression and decompression method using a wavelet decomposition, frequency based tree encoding, tree based motion encoding, frequency weighted quantization, Huffman encoding, and tree based activity estimation for bit rate control. Forward and inverse quasi-perfect reconstruction transforms are used to generate the wavelet decomposition and to reconstruct data values close to the original data values. The forward and inverse quasi-perfect reconstruction transforms utilize special filters at the boundaries of the data being transformed and/or inverse transformed to solve the above-mentioned boundary problem.

A decompression method uses four coefficient inverse perfect reconstruction digital filters. The coefficients of these inverse perfect reconstruction digital filters require a small number of additions to implement thereby enabling rapid decompression in software executing on a general purpose digital computer having a microprocessor. The method partially inverse transforms a sub-band decomposition to generate a small low frequency component image. This small image is expanded in one dimension by performing interpolation on the rows of the small image and is expanded in a second dimension by replicating rows of the interpolated small image. Transformed chrominance data values are inverse transformed using inverse perfect reconstruction digital filters having a fewer number of coefficients than the inverse perfect reconstruction digital filters used to inverse transform the corresponding transformed luminance data values. In one embodiment, two coefficient Haar digital filters are used as the inverse perfect reconstruction digital filters which inverse transform transformed chrominance data values. Variable-length tokens are used in the compressed data stream to indicate changes in encoding methods used to encode data values in the compressed data stream.

BRIEF DESCRIPTION OF THE DRAWINGS

FIG. 7 is a diagram illustrating a one-dimensional decomposition.

FIG. 8 is a diagram illustrating the separation of an input signal into a high pass component and a low pass component.

FIG. 9 is a graph illustrating the separation of an input signal into a high pass component and a low pass component.

FIG. 16 is a diagram of a two-dimensional matrix of original data values in accordance with one embodiment of the present invention.

FIG. 17 is a diagram of the two-dimensional matrix of FIG. 16 after one octave of forward transform in accordance with one embodiment of the present invention.

FIG. 18 is a diagram of the two-dimensional matrix of FIG. 16 after two octaves of forward transform in accordance with one embodiment of the present invention.

FIGS. 27–29 are diagrams illustrating a method and apparatus for determining the addresses of data values of a tree structure in accordance with one embodiment of the present invention.

DETAILED DESCRIPTION OF THE PREFERRED EMBODIMENTS

Quasi-Perfect Reconstruction Filters

Figure 1:
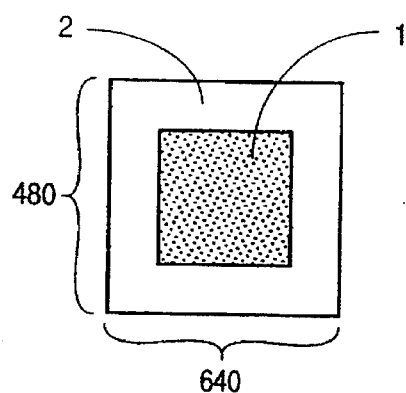
FIGS. 1–4 (Prior Art) are diagrams illustrating a sub-band decomposition of an image.
Figure 2:
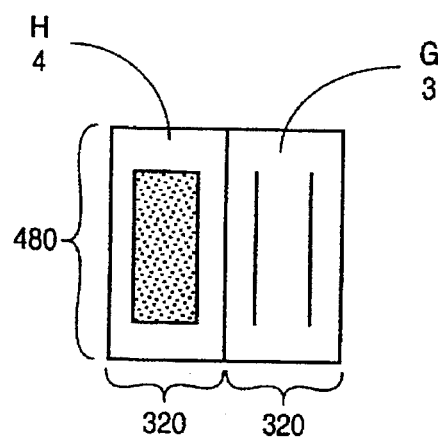
Figure 3:
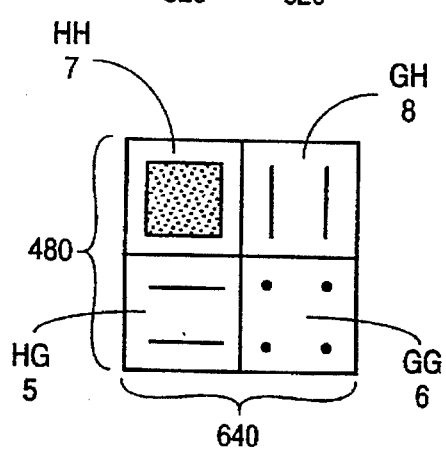
Figure 4:
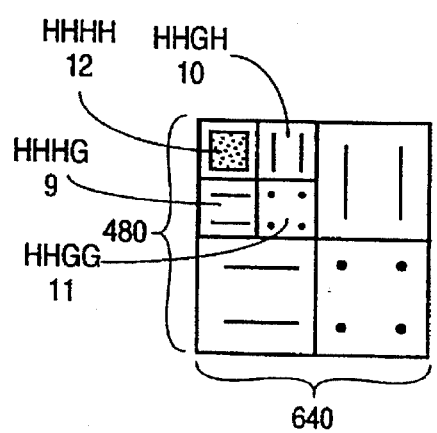
Figure 5:
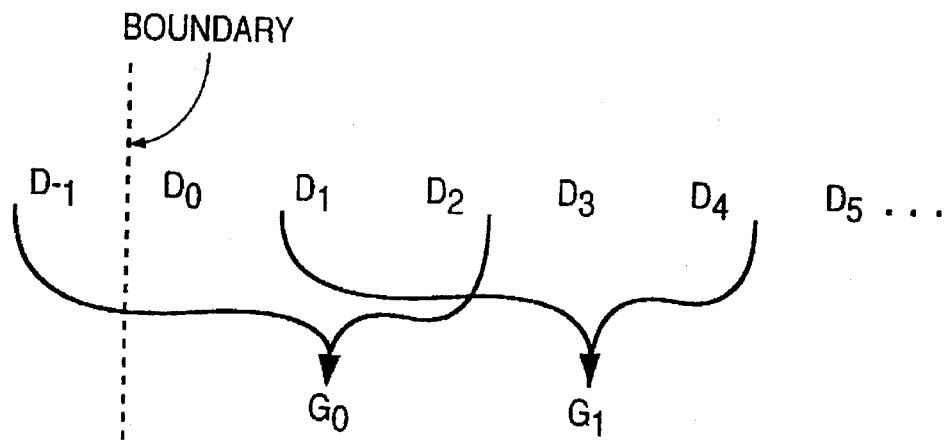
FIG. 5 (Prior Art) is a diagram illustrating a boundary problem associated with the generation of prior art sub-band decompositions.
Figure 6:
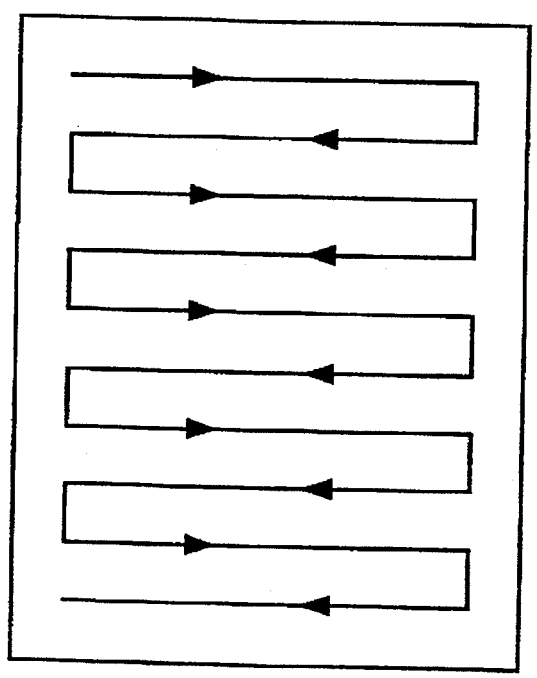
FIG. 6 (Prior Art) is a diagram illustrating a solution to the boundary problem associated with the generation of prior art sub-band decompositions.

The wavelet transform was introduced by Jean Morlet in 1984 to overcome problems encountered in analyzing geological signals. "Cycle-octave and Related Transforms In Seismic Signal Analysis", Goupillaud, Grossman and Morlet, Geoexploration, vol. 23, 1984. Since then, the wavelet transform has been a new and exciting method of analyzing signals and has already been applied to a wide range of tasks such as quantum mechanics and signal processing. The wavelet transform has a number of advantages over more traditional Fourier techniques principally used today in the analysis of signals. The wavelet transform and the high and low pass four coefficient quasi-perfect reconstruction filters of the present invention are therefore described by relating them to the windowed Fourier transform.

The windowed Fourier transform is the principal transform used today to analyze the spectral components of a signal. The Fourier transform decomposes a signal under analysis into a set of complex sinusoidal basis functions. The resulting Fourier series can be interpreted as the frequency spectra of the signal. The continuous Fourier transform is defined as follows:

$$F(\omega) = \int_{-\infty}^{+\infty} e^{-j2\pi\omega t} f(t) dt \quad \text{(equ. 1)}$$

Where f(t) is the time domain signal under analysis and F($\omega$) is the Fourier transform of the signal under analysis. Although many applications require an estimate of the spectral content of an input signal, the above formula is impractical for most systems. In order to calculate the Fourier transform, the input signal f(t) must be defined for all values of time t, whereas in most practical systems, f(t) is only defined over a finite range of time.

Several methods have therefore been devised to transform the finite input signal into an infinite signal so that the Fourier transform can be applied. The windowed Fourier transform is one such solution. The windowed Fourier transform is defined as follows:

$$F_w(\omega,\tau) = \int_{-\infty}^{+\infty} \omega(t-\tau) e^{-j2\pi\omega t} f(t) dt \quad \text{(equ. 2)}$$

where f(t) is the time domain signal under analysis, $F_w(\omega\tau)$ is the windowed Fourier transform of the time domain signal under analysis, and w(t) is the windowing function. The windowing function is usually chosen to be zero outside an interval of finite length. Alternatively, as the spectral content of the input f(t) varies with time, the input signal can be examined by performing the transform at time $\tau$ using a more local window function. In either case, the output transform is the convolution of the window function and the signal under analysis so that the spectra of the window itself is present in the transform results. Consequently, the windowing function is chosen to minimize this effect. Looking at this technique from another viewpoint, the basis functions of a windowed Fourier transform are not complex sinusoids but rather are windowed complex sinusoids. Gabor used a real Gaussian function in conjunction with sinusoids of varying frequencies to produce a complete set of basis functions (known as Gabor functions) with which to analyze a signal. For a locality given by the effective width of the Gaussian function, the sinusoidal frequency is varied such that the entire spectrum is covered.

The wavelet transform decomposes a signal into a set of basis functions that can be nearly local in both frequency and time. This is achieved by translating and dilating a function $\psi(t)$ that has spatial and spectral locality to form a set of basis functions:

$$\sqrt{s}\ \psi(s(t-1u)) \quad \text{(equ. 3)}$$

wherein s and u are real numbers and are the variables of the transform. The function $\psi(t)$ is called the wavelet.

The continuous wavelet transform of a signal under analysis is defined as follows:

$$w(s,u) = \sqrt{s}\int_{-\infty}^{+\infty} \psi(s(t-u)) f(t) dt \quad \text{(equ. 4)}$$

Where f(t) is the time domain signal under analysis, W(s,u) is its wavelet transform, $\psi$ is the wavelet, s is the positive dilation factor and u is the scaled translation distance. The spatial and spectral locality of the wavelet transform is dependent on the characteristics of the wavelet.

Because the signal under analysis in the compression of digitally sampled images has finite length, the discrete counterpart of the continuous wavelet transform is used. The wavelet transform performs a multiresolution decomposition based on a sequence of resolutions often referred to as "octaves". The frequencies of consecutive octaves vary uniformly on a logarithmic frequency scale. This logarithmic scale can be selected so that consecutive octaves differ by factor of two in frequency. The basis functions are:

$$\{\psi^j(x-2^{-j}n)\} \text{ for } (j,n)\in Z^2 \quad \text{(equ.5)}$$

where Z is the set of all integers, $Z^2=\{(j,n):j,n \in 2\}$, and $\psi^j(x)=\sqrt{2^j}\ \psi\ (2^j x)$.

In a sampled system, a resolution r signifies that the signal under analysis has been sampled at r samples per unit length. A multiresolution analysis studies an input signal at a number of resolutions, which in the case of the present invention is the sequence $r=2^j$ where $j \in Z$. The difference in frequency between consecutive octaves therefore varies by factor of two.

Stephane Mallat formalized the relationship between wavelet transforms and multiresolution analysis by first defining a multiresolution space sequence $\{V_j\}j\in z$, where $V_j$ is the set of all possible approximated signals at resolution $2^j$. He then showed that an orthonormal basis for $V_j$ can be constructed by $\{(\phi^j(x-2^{-j}n)\}n\in z$. $\phi(\underline{x})$ is called the scaling function where for any $j\in Z$, $\phi^j(x)=\sqrt{2^j}\phi 2^j x$. He then showed that a signal f(x) can be approximated at a resolution $2^j$ by the set of samples:

$$S_j = \{\sqrt{2^j}\ <f,\phi_n>\}_{n\in z} \quad \text{(equ. 6)}$$

where $<f,g>=<f,g>=\int_{-\infty}^{\infty} f(x)g(x)dx$, where $f,g\in L^2(R)$, the set of square integrable functions on R. This is equivalent to convolving the signal f(x) with the scaling function $\phi^j(-x)$ at a sampling rate of $2^j$. However, this representation is highly redundant because $V_j \subset V_{j+1}$, $j\in Z$. It would be more efficient to generate a sequence of multiresolution detail signals $O_j$ which represents the different information between successive resolutions $O_j \oplus V_j = V_{j+1}$ where $O_j$ is orthogonal to $V_j$. Mallat proved that there exists a function $\psi(x)$ called the wavelet where:

$$\psi^j(x) = \sqrt{2^j}\ \psi(2^j x) \quad \text{(equ. 7)}$$

such that $\{\psi^j (x-2^{-j}n)\}n\in z$ is an orthonormal basis of $O_j$ and $\{\psi^j (x-2^{-j}n)\}$, $(j,n) \in Z^2$, is an orthonormal basis of $L^2(R)$. The detail signal at resolution $2^{j+1}$ is represented by the set of data values:

$$N_j = \{\sqrt{2^j}\ <f,\psi_n>\}_{n\in z} \quad \text{(equ. 8)}$$

which is equivalent to convolving the signal f(x) with the wavelet $\psi^j(-x)$ at a sampling rate of $2^j$.

Hence, the original signal f(x) can be completely represented by the sets of data values $(S_j, (N_j) J \leq j \leq -1)$, where J<0 gives the number of octaves. This representation in the form of data values is known as the discrete wavelet decomposition. The $S_j$ notation used by Mallat refers to recursively low pass filter values of the original signal. $S_0$ corresponds to the original data values D. $S_{-1}$ corresponds to the H data values from the low pass filter. $N_{-1}$ corresponds to the G data values from the high pass filter. $S_{-2}$ corresponds to the next low pass filtered values from the previous H sub-band. $N_{-2}$ corresponds to the next high pass filtered values from the previous H sub-band.

If the sampling patterns of the discrete windowed Fourier transform and the discrete wavelet transform are compared while maintaining the spatial locality of the highest frequency sample for both transforms, then the efficiency of the discrete wavelet decomposition is revealed. The window Fourier transform produces a linear sampling grid, each data value being a constant spatial distance or a constant frequency away from its neighbor. The result is a heavy over-sampling of the lower frequencies. The wavelet transform, in contrast, samples each of its octave wide frequency bands at the minimum rate such that no redundant information is introduced into the discrete wavelet decomposition. The wavelet transform is able to achieve highly local spatial sampling at high frequencies by the use of octave wide frequency bands. At low frequencies, spectral locality takes precedence over spatial locality.

FIG. 7 illustrates the spatial and spectral locality of a sequence of sampled data values. The box surrounding a data value represents the spatial and spectral locality of the data value. The regions of FIG. 7 are presented for explanation purposes. In reality there is some overlap and aliasing between adjacent data values, the characteristics of which are determined by the particular wavelet function used.

Mallat showed the wavelet transform can be computed with a pyramid technique, where only two filters are used. Using this technique, $S_j$ and $N_j$ are calculated from $S_{j+1}$, $S_j$ being used as the input for the next octave of decomposition. A low pass filter H:

$$h(n) = \frac{1}{\sqrt{2}} <\phi_0^{-1}, \phi_n^0> \qquad \text{(equ. 9)}$$

Mallat shows that $S_j$ can be calculated by convolving from $S_{j+1}$ with H and keeping every other output (i.e. sub-sampling by a factor of 2).

A method for calculating $N_j$ from $S_{j+1}$ can also be derived. This method involves convolving $S_{j+1}$ with a high pass filter G and sub-sampling by a factor of 2. The high pass filter G is defined by the following coefficients:

$$g(n) = (-1)^{1-n} h(1-n) \qquad \text{(equ.10)}$$

The relationship between the H and G filters results in a large saving when the filters are implemented in hardware.

FIG. 8 illustrates that these two filters H and G form a complementary pair that split an input signal into two half band output signals. Both the high and the low pass outputs can be subsampled by a factor of two without corrupting the high frequency information because any aliasing introduced by the sub-sampling will be corrected in the reconstruction. There are the same number of filtered data values as there are original image data values.

The particular wavelet which is best in analyzing a signal under analysis is heavily dependent on the characteristics of the signal under analysis. The closer the wavelet resembles the features of the signal, the more efficient the wavelet representation of the signal will be. In addition, reconstruction errors introduced by quantization resemble the wavelet. Typically, the amount of aliasing varies with spatial support (the number of coefficients of the wavelet filters). Long wavelets can be constructed such that aliasing between adjacent octave bands is minimized. However, the spatial equivalent of aliasing, overlap, increases with filter length. Conversely, short wavelets have little or no overlap spatially but exhibit large amounts of aliasing in the frequency domain. To properly determine the suitability of a wavelet for a particular application, these factors of size and shape must be considered.

To apply the wavelet transform to image processing, the present invention employs a particular wavelet called the four coefficient Daubechies wavelet. Because the four coefficient Daubechies wavelet has only four coefficients, it is very short. This is well-suited for analyzing important image features such as object edges. Edges by definition are spatially local discontinuities. Edges often consist of a wide spectral range which, when filtered through a high pass filter, give rise to relatively larger filtered outputs only when the analysis filter coincides with the edge. When the analysis filter does not coincide with the edge, relatively smaller filtered outputs are output by the filter. The shorter the analysis filter used, the more finely the spatial position of the edge is resolved. Longer filters produce more of the relatively larger data values to represent an edge. The shortness of the filter also makes the transform calculation relatively inexpensive to implement compared with that of longer filters or image transformations such as the Fourier or discrete cosine transforms. The four coefficient Daubechies wavelet was selected for use only after a careful analysis of both its spatial and aliasing characteristics. Longer wavelets such as the six coefficient Daubechies wavelet could, however, also be used if a more complex implementation were acceptable. Short filters such as the two coefficients Haar wavelet could also be used if the attendant high levels of noise were acceptable.

The true coefficients of the four coefficient Daubechies wavelet are:

$$a = \frac{1+\sqrt{3}}{8}, b = \frac{3+\sqrt{3}}{8}, c = \frac{3-\sqrt{3}}{8}, \qquad \text{(equ. 11)}$$

$$d = \frac{-1+\sqrt{3}}{8}$$

The low pass four coefficient Daubechies digital filter is given by:

$$H(x/2) = aD(x-1) + bD(x) + cD(x+1) - dD(x+2) \qquad \text{(equ.12)}$$

The high pass four coefficient Daubechies digital filter is given by:

$$G(x/2) = dD(x-1) + cD(x) - bD(x+1) + aD(x+2) \qquad \text{(equ.13)}$$

In equations 12 and 13, D(x−1), D(x), D(x+1) and D(x+2) are four consecutive data values. H(x/2) and G(x/2) are true perfect reconstruction filters, i.e. the inverse transform perfectly reconstructs the original data. For example, when the filters operate on data values D(1), D(2), D(3) and D(4), outputs H(1) and G(1) are generated. Index x in this case would be 2. Due to the presence of the x/2 as the index for the filters H and G, the values of x can only be even integers.

To simplify the computational complexity involved in performing the transformation on real data, the coefficients of the four coefficient Daubechies filter which are repeating numbers are converted into non-repeating numbers which can be efficiently implemented in software or hardware. Floating point coefficients are not used because performing floating point arithmetic is time consuming and expensive when implemented in software or hardware.

To convert the four Daubechies coefficients for implementation, three relationships of the coefficients a, b, c and d are important. In order for the H filter to have unity gain, the following equation must hold:

$$a+b+c-d=1 \quad \text{(equ.14)}$$

In order for the G filter to reject all zero frequency components in the input data values, the following equation must hold:

$$a-b+c+d=0 \quad \text{(equ.15)}$$

In order for the resulting H and G filters to be able to generate a decomposition which is perfectly reconstructible into the original image data the following equation must hold:

$$ac-bd=0 \quad \text{(equ.16)}$$

True four coefficient Daubechies filters satisfy the above three equations 14, 15, and 16. However, when the coefficients of the true low and high pass four coefficient Daubechies filters are converted for implementation, at least one of the three relationships must be broken. In the preferred embodiment, unity gain and the rejection of all zero frequency components are maintained. It is the third relationship of equation 16 that is compromised. Perfect reconstruction is compromised because the process of compressing image data itself inherently introduces some noise due to the tree coding and quantization of the present invention. The reconstructed data values therefore necessarily involve noise when a real-world image is compressed and then reconstructed. We define filters which satisfy equations 14, and 15 and approximately satisfy equation 16, quasi-perfect reconstruction filters.

Table 2 illustrates a process of converting the coefficients a, b, c and d for implementation.

TABLE 2

$$a = \frac{1+\sqrt{3}}{8} \approx .3415(32) = 10.92 \approx \frac{11}{32}$$

$$b = \frac{3+\sqrt{3}}{8} \approx .5915(32) = 18.92 \approx \frac{19}{32}$$

$$c = \frac{3-\sqrt{3}}{8} \approx .1585(32) = 5.072 \approx \frac{5}{32}$$

$$d = \frac{-1+\sqrt{3}}{8} \approx .0915(32) = 2.928 \approx \frac{3}{32}$$

The true four coefficient Daubechies filter coefficients are listed in the left hand column of Table 2. In the next column to the right, the true coefficients are shown rounded to four places beyond the decimal point. The rounded coefficients are scaled by a factor of 32 to achieve the values in the next column to the right. From each value in the third column, an integer value is selected. Which integers are selected has a dramatic effect on the complexity of the software or hardware which compresses the image data. The selected integers are divided by 32 so that the scaling by 32 shown in the second column does not change the values of the resulting converted coefficients.

In selecting the integers for the fourth column, the relationship of the three equations 14, 15 and 16 are observed. In the case of a=11/32, b=19/32, c=5/32 and d=3/32, the relationships a+b+c−d=1 and a−b+c+d=0 both are maintained. Because the converted coefficients in the rightmost column of Table 2 are quite close to the true coefficient values in the leftmost column, the resulting four coefficient filters based on coefficients a, b, c and d allow near perfect reconstruction. On a typical 640 by 480 image, the error between the original and reconstructed data values after forward and then inverse transformation has been experimentally verified to exceed 50 dB.

The resulting high pass four coefficient quasi-Daubechies filter is:

$$H\left(\frac{x}{2}\right) = -\frac{11}{32} D(x-1) + \frac{19}{32} D(x) + \quad \text{(equ. 17)}$$

$$-\frac{5}{32} D(x+1) + \frac{3}{32} D(x+2)$$

The resulting low pass four coefficient quasi-Daubechies filter is:

$$G\left(\frac{x}{2}\right) = \frac{3}{32} D(x-1) + \frac{5}{32} D(x) - \quad \text{(equ. 18)}$$

$$\frac{19}{32} D(x+1) + \frac{11}{32} D(x+2)$$

Because the high and low pass four coefficient quasi-Daubechies filters satisfy equations 14 and 15 and approximately satisfy equation 16, the high and low pass four coefficient quasi-Daubechies filters are quasi-perfect reconstruction filters.

Note that the particular converted coefficients of the quasi-Daubechies filters of equations 17 and 18 result in significant computational simplicity when implementation is either software and/or hardware. Multiplications and divisions by factors of two such as multiplications and divisions by 32 are relatively simple to perform. In either hardware or software, a multiplication by 2 or a division by 2 can be realized by a shift. Because the data values being operated on by the digital filter already exist in storage when the filter is implemented in a typical system, the shifting of this data after the data has been read from storage requires little additional computational overhead. Similarly, changing the sign of a quantity involves little additional overhead. In contrast, multiplication and divisions by numbers that are not a power of 2 requires significant overhead to implement in both software and hardware. The selection of the coefficients in equations 17 and 18 allows H(x) and G(x) to be calculated with only additions and shifts. In other words, all multiplications and divisions are performed without multiplying by a number which is not a power of 2. Due to the digital filter sequencing through the data values, pipelining techniques can also be employed to reduce the number of adds further by using the sums or differences computed when the filters were operating on prior data values.

Moreover, the magnitudes of the inverse transform filter coefficients are the same as those of the transform filter itself. As described further below, only the order and signs of the coefficients are changed. This reduces the effective number of multiplications which must be performed by a factor of two when the same hardware or software implementation is to be used for both the forward and inverse transform. The fact that the signal being analyzed is being sub-sampled reduces the number of additions by a factor of two because summations are required only on the reading of every other sample. The effective number of filters is therefore only one to both transform the data into the decomposition and to inverse transform the decomposition back into the image data.

Image Compression and Decompression Using the Quasi-Perfect Reconstruction Transform Color images can be decomposed by treating each Green-Blue or more usually Luminance-Chrominance-Chrominance channels as separate images. In the case of Luminance-Chrominance-Chrominance (YUV or YIQ) images the chrominance components may already have been sub-sampled. It may be desirable therefore, to transform the chrominance channels through a different number of octaves than the luminance channel. The eye is less sensitive to chrominance at high spatial frequency and therefore these channels can be sub-sampled without loss of perceived quality in the output image. Typically these chrominance channels are sub-sampled by a factor of two in each dimension so that they together take only 50 percent of the bandwidth of the luminance channel. When implementing an image compression technique, the chrominance channels are usually treated the same way as the luminance channel. The compression technique is applied to the three channels independently. This approach is reasonable except in the special cases where very high compression ratios and very high quality output is required. To squeeze the last remaining bits from a compression technique or to achieve more exacting quality criteria, knowledge of how the chrominance rather than luminance values are perceived by the human visual system can be applied to improve the performance of the compression technique by better matching it with the human visual system.

Figure 10:
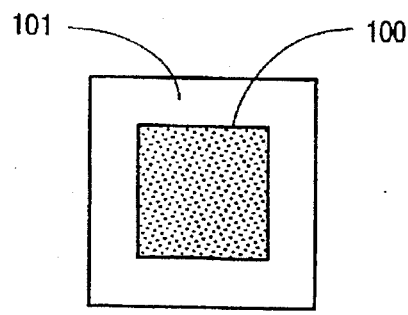
FIGS. 10, 11, 14 and 15 are diagrams illustrating a transformation in accordance with one embodiment of the present invention.

FIG. 10 is an illustration of a two dimensional matrix of data values. There are rows of data values extending in the horizontal dimension and there are columns of data values extending in the vertical dimension. Each of the data values may, for example, be an 8-bit binary number of image pixel information such as the luminance value of a pixel. The data values of FIG. 10 represent an image of a black box 100 on a white background 101.

Figure 11:
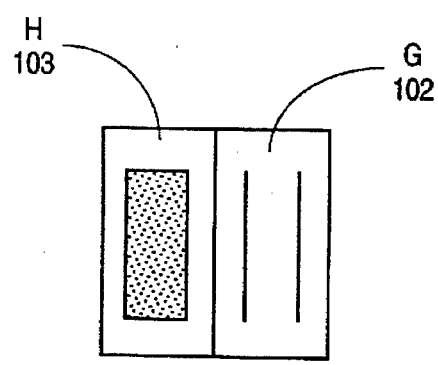

To transform the data values of the image of FIG. 10 in accordance with one aspect of the present invention, a high pass four coefficient quasi-Daubechies digital filter is run across the data values horizontally, row by row, to result in a block 102 of high pass output values G shown in FIG. 11. The width of the block 102 of high pass output values in FIG. 11 is half the width of the original matrix of data values in FIG. 10 because the high pass four coefficient quasi-Daubechies digital filter is moved across the rows of the data values by twos. Because only one additional digital filter output is generated for each additional two data values processed by the digital filter, the data values of FIG. 10 are said to have been subsampled by a factor of two.

Figure 12:
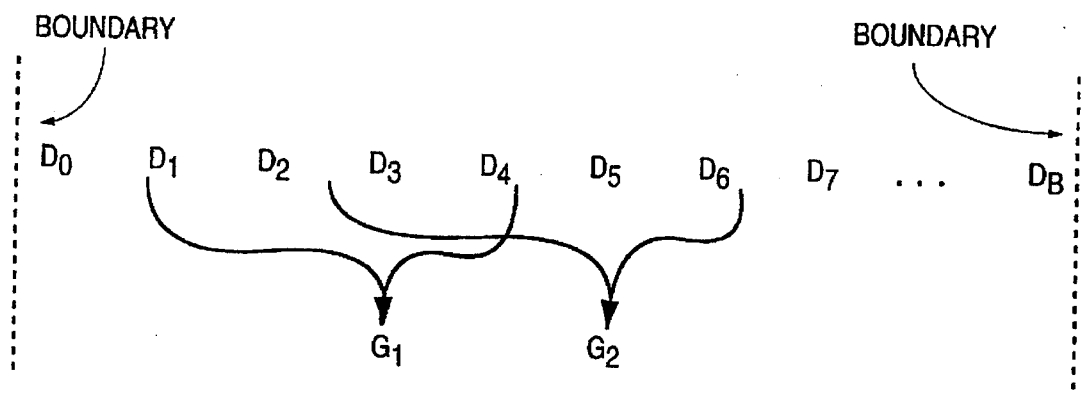
FIGS. 12 and 13 are diagrams illustrating the operation of high pass and low pass forward transform digital filters in accordance with one embodiment of the present invention.

FIG. 12 illustrates the subsampling performed by the high pass digital filter. High pass output $G_1$ is generated by the high pass digital filter from data values $D_1$, $D_2$, $D_3$ and $D_4$. The next high pass output generated, output $G_2$, is generated by the high pass digital filter from data values $D_3$, $D_4$, $D_5$ and $D_6$. The high pass digital filter therefore moves two data values to the right for each additional high pass output generated.

A low pass four coefficient quasi-Daubechies digital filter is also run across the data values horizontally, row by row, to generate H block 103 of the low pass outputs shown in FIG. 11. This block 103 is generated by subsampling the data values of FIG. 10 in the same way the block 102 was generated. The H and G notation for the low and high pass filter outputs respectively is used as opposed to the $S_j$ and $O_j$ notation used by Mallat to simplify the description of the two-dimensional wavelet transform.

Figure 13:
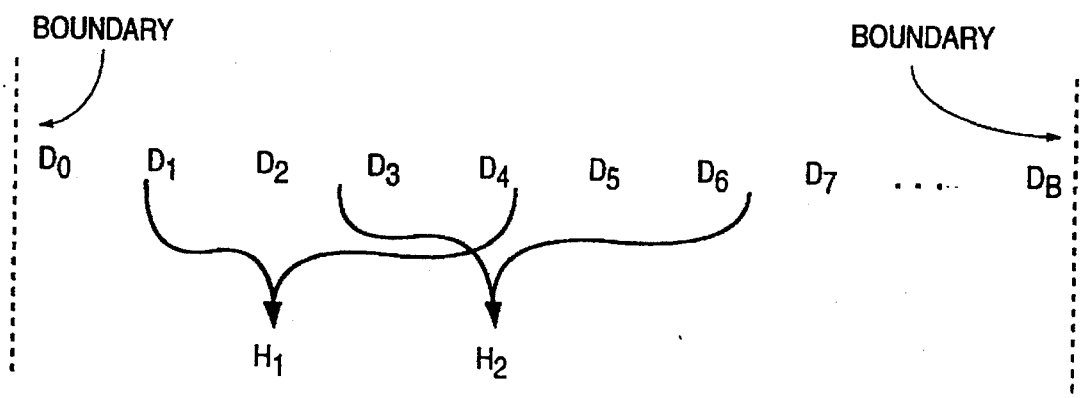

FIG. 13 illustrates the subsampling of the low pass digital filter. Low pass output $H_1$ is generated by the low pass digital filter from data values $D_1$, $D_2$, $D_3$ and $D_4$. The next low pass output generated, output $H_2$, is generated by the low pass digital filter from data values $D_3$, $D_4$, $D_5$ and $D_6$. The low pass digital filter therefore moves two data values to the right for each additional low pass output generated.

Figure 14:
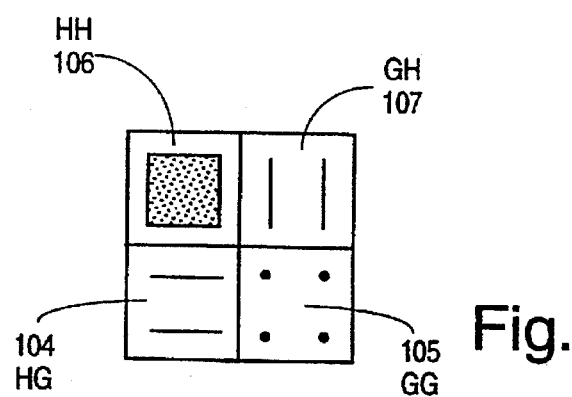

After the high and low pass four coefficient quasi-Daubechies digital filters have generated blocks 102 and 103, the high and low pass four coefficient quasi-Daubechies digital filters are run down the columns of blocks 102 and 103. The values in blocks 102 and 103 are therefore sub-sampled again. The high pass four coefficient quasi-Daubechies digital filter generates blocks 104 and 105. The low pass four coefficient quasi-Daubechies digital filter generates blocks 106 and 107. The resulting four blocks 104–107 are shown in FIG. 14. Block 106 is the low frequency component of the original image data. Blocks 107, 104 and 105 comprise the high frequency component of the original image data. Block 106 is denoted block HH. Block 107 is denoted block GH. Block 104 is denoted block HG. Block 105 is denoted block GG.

Figure 15:
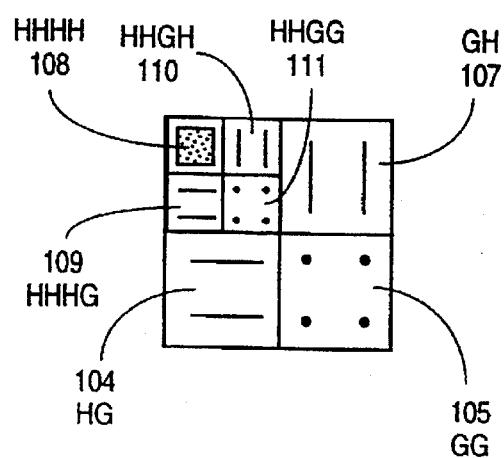

This process of running the high and low pass four coefficient quasi-Daubechies digital filters across data values both horizontally and vertically to decompose data values into high and low frequency components is then repeated using the data values of the HH block 106 as input data values. The result is shown in FIG. 15. Block 108 is the low frequency component and is denoted block HHHH. Blocks 109, 110 and 111 comprise octave 1 of the high frequency component and are denoted HHHG, HHGH, HHGG, respectively. Blocks HG, GH and GG comprise octave 0 of the high frequency component.

Although this recursive decomposition process is only repeated twice to produce high pass component octaves 0 and 1 in the example illustrated in connection with FIGS. 10–15, other numbers of recursive decomposition steps are possible. Recursively decomposing the original data values into octaves 0, 1, 2 and 3 has been found to result in satisfactory results for most still image data additional low pass output and recursively decomposing the original data into octaves 0, 1, and 2 has been found to result in satisfactory results for most video image data.

Moreover, the horizontal and subsequent vertical operation of the high and low pass filters can also be reversed. The horizontal and subsequent vertical sequence is explained in connection with this example merely for instructional purposes. The filters can be moved in the vertical direction and then in the horizontal direction. Alternatively, other sequences and dimensions of moving the digital filters through the data values to be processed is possible.

It is also to be understood that if the original image data values are initially arrayed in a two dimensional block as shown in FIG. 10, then the processing of the original image data values by the high and low pass filters would not necessarily result in the HH values being located all in an upper right hand quadrant as is shown in FIG. 14. To the contrary, depending on where the generated HH values are written, the HH data values can be spread throughout a block. The locations of the HE values are, however, determinable. The HH values are merely illustrated in FIG. 14 as being located all in the upper lefthand quadrant for ease of illustration and explanation.

FIG. 16 is an illustration showing one possible twelve-by-twelve organization of original image data values in a two dimensional array. FIG. 16 corresponds with FIG. 10. The location in the array of each data value is determined by a row number and column number. A row number and column number of a data value may, for example, correspond with a row address and column address in an addressed storage medium including a semiconductor memory, a magnetic storage medium, or an optical storage medium. The row and column may, for example, also correspond with a pixel location including a location of a pixel on a cathode-ray tube or on a flat panel display.

FIG. 17 is an illustration showing the state of the two dimensional array after a one octave decomposition. The HH low frequency components are dispersed throughout the two dimensional array as are the HG values, the GH values, and the GG values. The subscripts attached to the various data values in FIG. 17 denote the row and column location of the particular data value as represented in the arrangement illustrated in FIG. 14. $HH_{00}$, $HH_{01}$, $HH_{02}$, $HH_{03}$, $HH_{04}$ and $HH_{05}$, for example, are six data values which correspond with the top row of data values in HH block 106 of FIG. 14. $HH_{00}$, $HH_{10}$, $HH_{20}$, $HH_{30}$, $HH_{40}$ and $HH_{50}$, for example, are six data values which correspond with the leftmost column of data values in HH block 106 of FIG. 14.

When the high and the low pass forward transform digital filters operate on the four data values $D_{01}$, $D_{02}$, $D_{03}$ and $D_{04}$ of FIG. 16, the output of the low pass forward transform digital filter is written to location row 0 column 2 and the output of the high pass forward transform digital filter is written to location row 0 column 3. Next, the high and low pass forward transform digital filters are moved two locations to the right to operate on the data values $D_{03}$, $D_{04}$, $D_{05}$ and $D_{06}$. The outputs of the low and high pass forward transform digital filters are written to locations row 0 column 4 and row 0 column 5, respectively. Accordingly, the outputs of the low and high frequency forward transform digital filters are output from the filters to form an interleaved sequence of low and high frequency component data values which overwrite the rows of data values in the two dimensional array.

Similarly, when the low and high pass forward transform digital filters operate on the four data values at locations column 0, rows 1 through 4, the output of the low pass forward transform digital filter is written to location column 0 row 2. The output of the high pass forward transform digital filter is written to location column 0 row 3. Next the low and high pass forward transform digital filters are moved two locations downward to operate on the data values at locations column 0, rows 3 through 6. The outputs of the low and high pass forward transform digital filters are written to locations column 0 row 4 and column 0 row 5, respectively. Again, the outputs of the low and high pass forward transform digital filters are output from the filters in an interleaved fashion to overwrite the columns of the two dimensional array.

FIG. 18 is an illustration showing the state of the two dimensional array after a second octave decomposition. The HHHH low frequency components corresponding which block 108 of FIG. 15 as well as the octave 1 high frequency components HHGH, HHHG and HHGG are dispersed throughout the two dimensional array. When the HH values $HH_{01}$, $HH_{02}$, $HH_{03}$ and $HH_{04}$ of FIG. 17 are processed by the low and high pass forward transform digital filters, the outputs are written to locations row 0 column 4 and row 0 column 6, respectively. Similarly, when the values at locations column 0, rows 2, 4, 6 and 8 are processed by the low and high pass forward transform digital filters, the results are written to locations column 0 row 4 and column 0 row 6, respectively. The data values in FIG. 18 are referred to as transformed data values. The transformed data values are said to comprise the decomposition of the original image values.

This method of reading data values, transforming the data values, and writing back the output of the filters is easily expanded to a two dimensional array of a very large size. Only a relatively small number of locations is shown in the two dimensional array of FIGS. 10–18 for ease of explanation and clarity of illustration.

The transformed data values are reconverted back into image data values substantially equal to the original image data by carrying out a reverse process. This reverse process is called the inverse transform. Due to the interleaved nature of the decomposition data in FIG. 18, the two digital filters used to perform the inverse transform are called interleaved inverse transform digital filters. Odd data values are determined by an odd interleaved inverse digital filter O. Even data values are determined by the even interleaved inverse transform digital filter E.

The odd and even interleaved inverse digital filters can be determined from the low and high pass forward transform digital filters used in the forward transform because the coefficients of the odd interleaved inverse transform digital filters are related to the coefficients of the low and high pass forward transform filters. To determine the coefficients of the odd and even interleaved inverse transform digital filters, the coefficients of the low and high pass forward transform digital filters are reversed. Where the first, second, third and fourth coefficients of the low pass forward transform digital filter H of equation 17 are denoted a, b, c and −d, the first, second, third and fourth coefficients of a reversed filter H* are denoted −d, c, b and a. Similarly, where the first, second, third and fourth coefficients of the high pass forward transform digital filter G of equation 18 are denoted d, c, −b and a, the first, second, third and fourth coefficients of a reverse filter G* are denoted a, −b, c and d.

The first through the fourth coefficients of the even interleaved inverse transform digital filter E are the first coefficient of H*, the first coefficient of G*, the third coefficient of H*, and the third coefficient of G*. The coefficients of the even interleaved inverse transform digital filter E therefore are −d, a, b and c. In the case of the low and high pass four coefficient quasi-Daubechies filters used in the transform where a=11/32, b=19/32, c=5/32 and d=3/32, the even interleaved inverse transform digital filter is:

$$D(2x) = -\frac{3}{32} H(x-1) + \frac{11}{32} G(x-1) + \frac{19}{32} H(x) + \frac{5}{32} G(x) \quad \text{(equ. 19)}$$

where H(x−1), G(x−2), H(x) and G(x) are transformed data values of a decomposition to be inverse transformed.

The first through the fourth coefficients of the odd interleaved inverse transform digital filter O are the second coefficient of H*, the second coefficient of G*, the fourth coefficient of H*, and the fourth coefficient of G*. The coefficients of the odd interleaved inverse transform digital filter O therefore are c, −b, a and d. In the case of the low and high pass four coefficient quasi-Daubechies filters used in the transform where a=11/32, b=19/32, c=5/32 and d=3/32, the odd interleaved inverse transform digital filter is:

$$D(2x-1) = \frac{5}{32} H(x-1) - \frac{19}{32} G(x-1) + \frac{11}{32} H(x) + \frac{3}{32} G(x) \quad \text{(equ. 20)}$$

where H(x−1, G(x−1), H(x) and G(x) are data values of a decomposition to be inverse transformed.

To inverse transform the transformed data values of FIG. 18 into the data values of FIG. 17, the HHHG, HHGG, HHGH and data values are inverse transformed with the HHHH data values to create the HH data values of FIG. 17. This process corresponds with the inverse transformation of HHHG block 109, HHGH block 110, HHGG block 111, and HHHH block 108 of FIG. 15 back into the HH data values of block 106 of FIG. 14. The HG, GH and GG data values of FIG. 18 are therefore not processed by the odd and even interleaved inverse transform digital filters in this step of the inverse transform.

In FIG. 18, the odd interleaved inverse transform digital filter processes the values in locations column 0, rows 0, 2, 4 and 6 to generate the even data value at location column 0 row 2. The even interleaved inverse transform digital filter data also processes the values in the same locations to generate the odd data value at location column 0 row 4. The odd and even interleaved inverse transform digital filters then process the values in locations column 0, rows 4, 6, 8 and A to generate the values at locations column 0 row 6 and column 0 row 8, respectively. Each of the six columns 0, 2, 6, 4, 8, and A of the values of FIG. 18 are processed by the odd and even interleaved inverse transform digital filters in accordance with this process.

The various locations are then processed again by the odd and even interleaved inverse transform digital filters, this time in the horizontal direction. The odd and even interleaved inverse transform digital filters process the values at locations row 0 columns 0, 2, 4 and 6 to generate the values at locations row 0 column 2 and row 0 column 4, respectively. The odd and even interleaved inverse transform digital digital filters process the values at locations row 0 columns 4, 6, 8 and A to generate the values at locations row 0 column 6 and row 0 column 8, respectively. Each of the six rows 0, 2, 4, 8 and of values are processed by the even and odd interleaved inverse transform digital filters in accordance with this process. The result is the reconstruction shown in FIG. 17.

The even and odd interleaved inverse transform digital filters then process the values shown in FIG. 17 into the data values shown in FIG. 16. This inverse transformation corresponds with the transformation of the HH block 106, the HG block 104, the GH block 107 and the GG block 105 of FIG. 14 into the single block of data value of FIG. 10. The resulting reconstructed data values of FIG. 16 are substantially equal to the original image data values.

Note, however, that in the forward transform of the data values of FIG. 16 into the data values of FIG. 17 that the low and high pass four coefficient quasi-Daubechies digital filters cannot generate all the data values of FIG. 17 due to the digital filters requiring data values which are not in the twelve by twelve matrix of data values of FIG. 16. These additional data values are said to be beyond the "boundary" of the data values to be transformed.

Figure 19:
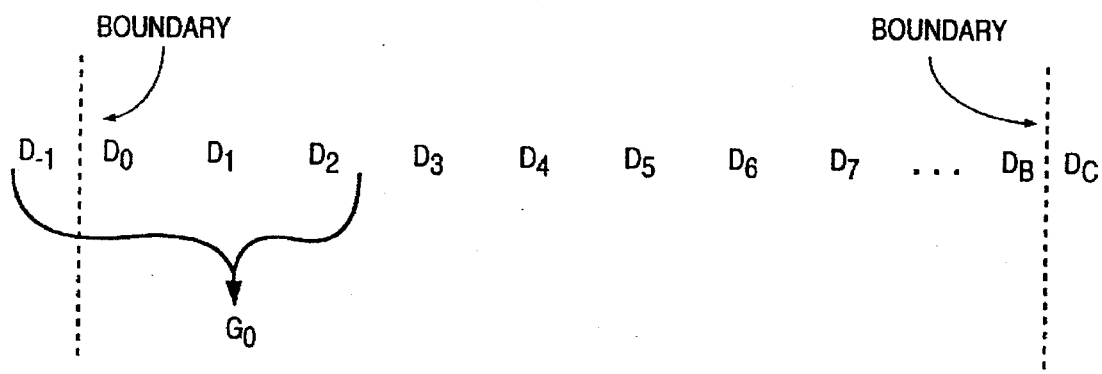
FIGS. 19 and 20 are diagrams illustrating a boundary problem solved in accordance with one embodiment of the present invention.
Figure 20:
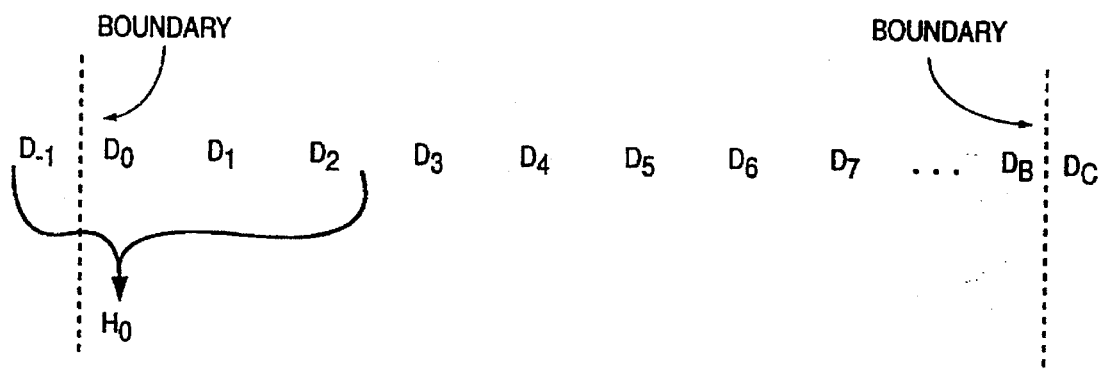

FIG. 19 illustrates the high pass four coefficient quasi-Daubechies digital filter operating over the boundary to generate the $G_0$ data value. In order to generate the $G_0$ data value in the same fashion that the other high frequency G data values are generated, the high pass digital filter would require data values $D_{-1}$, $D_0$, $D_1$ and $D_2$ as inputs. Data value $D_{-1}$, however, does not exist. Similarly, FIG. 20 illustrates the low pass four coefficient quasi-Daubechies digital filter operating over the boundary to generate the $H_0$ data value. In order to generate the $H_0$ data value in the same fashion that the other low frequency H data values are generated, the low pass digital filter would require data values $D_{-1}$, $D_0$, $D_1$ and $D_2$ as inputs. Data value $D_{-1}$, however, does not exist.

The present invention solves this boundary problem by using additional quasi-Daubechies digital filters to generate the data values adjacent the boundary that would otherwise require the use of data values outside the boundary. There is a high pass "start" quasi-Daubechies forward transform digital filter $G_S$ which is used to generate the first high pass output $G_0$. There is a low pass "start" quasi-Daubechies forward transform digital filter $H_S$ which is used to generate the first low pass output $H_0$. These start quasi-Daubechies forward transform digital filters are three coefficient filters rather than four coefficient filters and therefore require only three data values in order to generate an output. This allows the start quasi-Daubechies forward transform digital filters to operate at the boundary and to generate the first forward transform data values without extending over the boundary.

Figure 21:
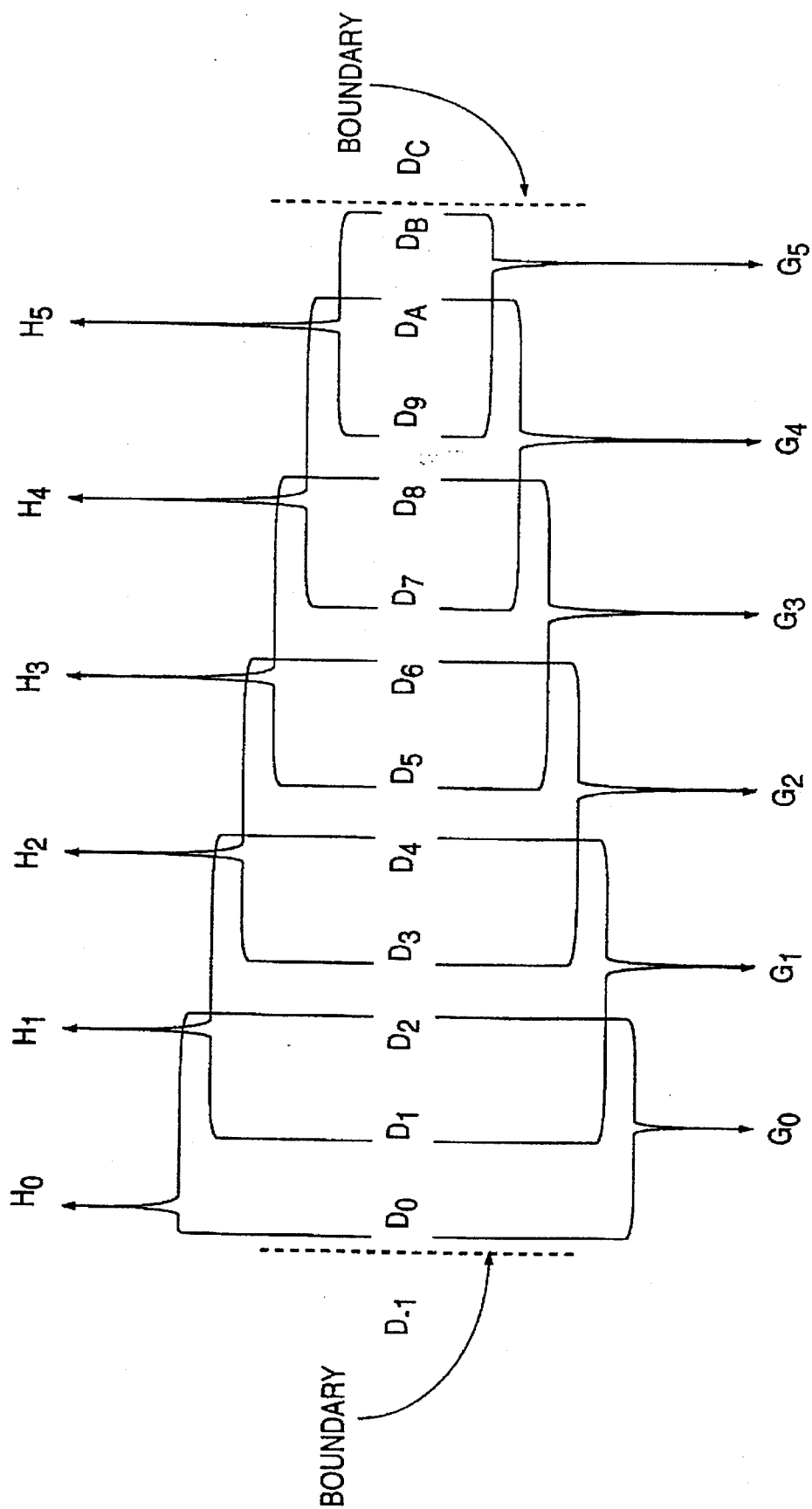
FIG. 21 is a diagram illustrating the operation of boundary forward transform digital filters in accordance with one embodiment of the present invention.

FIG. 21 illustrates the low and high pass start quasi-Daubechies forward transform digital filters operating at the starting boundary of image data values $D_0$ through $D_B$. The three coefficient low and high pass start quasi-Daubechies forward transform digital filters operate on data values $D_0$, $D_1$ and $D_2$ to generate outputs $H_0$ and $G_0$, respectively. $H_1$, $H_2$, $H_3$ and $H_4$, on the other hand, are generated by the low pass four coefficient quasi-Daubechies forward transform digital filter and $G_1$, $G_2$, $G_3$ and $G_4$ are generated by the high pass four coefficient quasi-Daubechies forward transform digital filter.

A similar boundary problem is encountered at the end of the data values such as at the end of the data values of a row or a column of a two-dimensional array. If the low and high pass four coefficient quasi-Daubechies filters G and H are used at the boundary in the same fashion that they are in the middle of the data values, then the four coefficient quasi-Daubechies forward transform digital filters would have to extend over the end boundary to generate the last low and high pass outputs, respectively.

The present invention solves this boundary problem by using additional quasi-Daubechies forward transform digital filters in order to generate the transformed data values adjacent the end boundary that would otherwise require the use of data outside the boundary. There is a low pass "end" quasi-Daubechies forward transform digital filter $H_e$ which is used to generate the last low pass output. There is a high pass "end" quasi-Daubechies forward transform digital filter $G_e$ which is used to generate the last high pass output. These two end quasi-Daubechies forward transform digital filters are three coefficient filters rather than four coefficient filters and therefore require only three data values in order to generate an output. This allows the end quasi-Daubechies forward transform digital filters to operate at the boundary and to generate the last transform data values without extending over the boundary.

FIG. 21 illustrates two low and high pass end quasi-Daubechies forward transform digital filters operating at the end boundary of the image data. These three coefficient low and high pass end quasi-Daubechies forward transform digital filters operate on data values $D_9$, $D_A$ and $D_B$ to generate outputs $H_5$ and $G_5$, respectively. This process of using the appropriate start or end low or high pass filter is used in performing the transformation at the beginning and at the end of each row and column of the data values to be transformed.

The form of the low pass start quasi-Daubechies forward transform digital filter $H_S$ is determined by selecting a value of a hypothetical data value $D_{-1}$ which would be outside the boundary and then determining the value of the four coefficient low pass quasi-Daubechies forward transform filter if that four coefficient forward transform filter were to extend beyond the boundary to the hypothetical data value in such a way as would be necessary to generate the first low pass output $H_0$. This hypothetical data value $D_{-1}$ outside the boundary can be chosen to have one of multiple different values. In some embodiments, the hypothetical data value $D_{-1}$ has a value equal to the data value $D_0$ at the boundary. In some embodiments, the hypothetical data value $D_{-1}$ is set to zero regardless of the data value $D_0$. The three coefficient low pass start quasi-Daubechies forward transform digital filter $H_S$ therefore has the form:

$$H_0 = K1 + bD_0 + cD_1 - dD_2 \qquad \text{(equ.21)}$$

where K1 is equal to the product $aD_{-1}$, where $D_0$ is the first data value at the start boundary at the start of a sequence of data values, and where a, b, c and d are the four coefficients of the four coefficient low pass quasi-Daubechies forward transform digital filter. If, for example, hypothetical data value $D_{-1}$ is chosen to be equal to the data value $D_0$ adjacent but within the boundary, then $K1=aD_0$ where $a=\frac{11}{32}$ and $D_0$ is the data value adjacent the boundary, equation 21 then becomes:

$$H_0=(a+b)D_0+cD_1-dD_2 \qquad (\text{equ.}22)$$

The form of the high pass start quasi-Daubechies forward transform digital filter $G_S$ is determined by the same process using the same hypothetical data value $D_{-1}$. The high pass start quasi-Daubechies forward transform digital filter $G_S$ therefore has the form:

$$G_0=K2+cD_0-bD_1+aD_2 \qquad (\text{equ.}23)$$

where K2 is equal to the product $dD_{-1}$, where $D_0$ is the first data value at the boundary at the start of a sequence of data values, and where a, b, c and d are the four coefficients of the four coefficient high pass quasi-Daubechies forward transform digital filter. If hypothetical data value $D_{-1}$ is chosen to be equal to $D_0$, then equation 23 becomes.

$$G_0=(d+c)D_0-bD_1+aD_2 \qquad (\text{equ.}24)$$

The form of the low pass end quasi-Daubechies forward transform digital filter $H_e$ is determined in a similar way to the way the low pass start quasi-Daubechies forward transform digital filter is determined. A value of a data value $D_C$ is selected which would be outside the boundary. The value of the four coefficient low pass quasi-Daubechies forward transform digital filter is then determined as if that four coefficient filter were to extend beyond the boundary to data value $D_C$ in such a way as to generate the last low pass output $H_5$. The three coefficient low pass end quasi-Daubechies forward transform digital filter therefore has the form:

$$H_5=aD_9+bD_A+cD_B-K3 \qquad (\text{equ.}25)$$

where K3 is equal to the product $dD_C$, where $D_B$ is the last data value of a sequence of data values to be transformed, and where a, b, c and d are the four coefficients of the four coefficient low pass quasi-Daubechies filter. $D_B$ is the last data value in the particular sequence of data values of this example and is adjacent the end boundary. In the case where the hypothetical data value $D_C$ is chosen to be equal to the data value $D_B$ adjacent but within the end boundary, then $K3=dD_B$ and equation 25 becomes:

$$H_5=aD_9+bD_A+(c-d)D_B \qquad (\text{equ.}26)$$

The form of the high pass end quasi-Daubechies forward transform digital filter $G_e$ is determined by the same process using the same data value $D_C$. The three coefficient high pass end quasi-Daubechies forward transform digital filter therefore has the form:

$$G_5=dD_9+cD_A-bD_B+K4 \qquad (\text{equ.}27)$$

where K4 is equal to the product $aD_C$, where $D_B$ is the data value in this particular sequence of data values be transformed, and where a, b, c and d are the four coefficients of the four coefficient high pass quasi-Daubechies forward transform digital filter. $D_B$ is adjacent the end boundary. If hypothetical data value $D_C$ is chosen to be equal to $D_B$, then equation 27 becomes:

$$G_5=dD_9+cD_A+(-b+a)D_B \qquad (\text{equ.}28)$$

It is to be understood that the specific low and high pass end quasi-Daubechies forward transform digital filters are given above for the case of data values $D_0$ through $D_B$ of FIG. 21 and are presented merely to illustrate one way in which the start and end digital filters may be determined. In the event quasi-Daubechies filters are not used for the low and high pass forward transform digital filters, the same process of selecting a hypothetical data value or values outside the boundary and then determining the value of a filter as if the filter were to extend beyond the boundary can be used. In some embodiments, multiple hypothetical data values may be selected which would all be required by the digital filters operating on the inside area of the data values in order to produce an output at the boundary. This boundary technique is therefore extendable to various types of digital filters and to digital filters having numbers of coefficients other than four.

Figure 22:
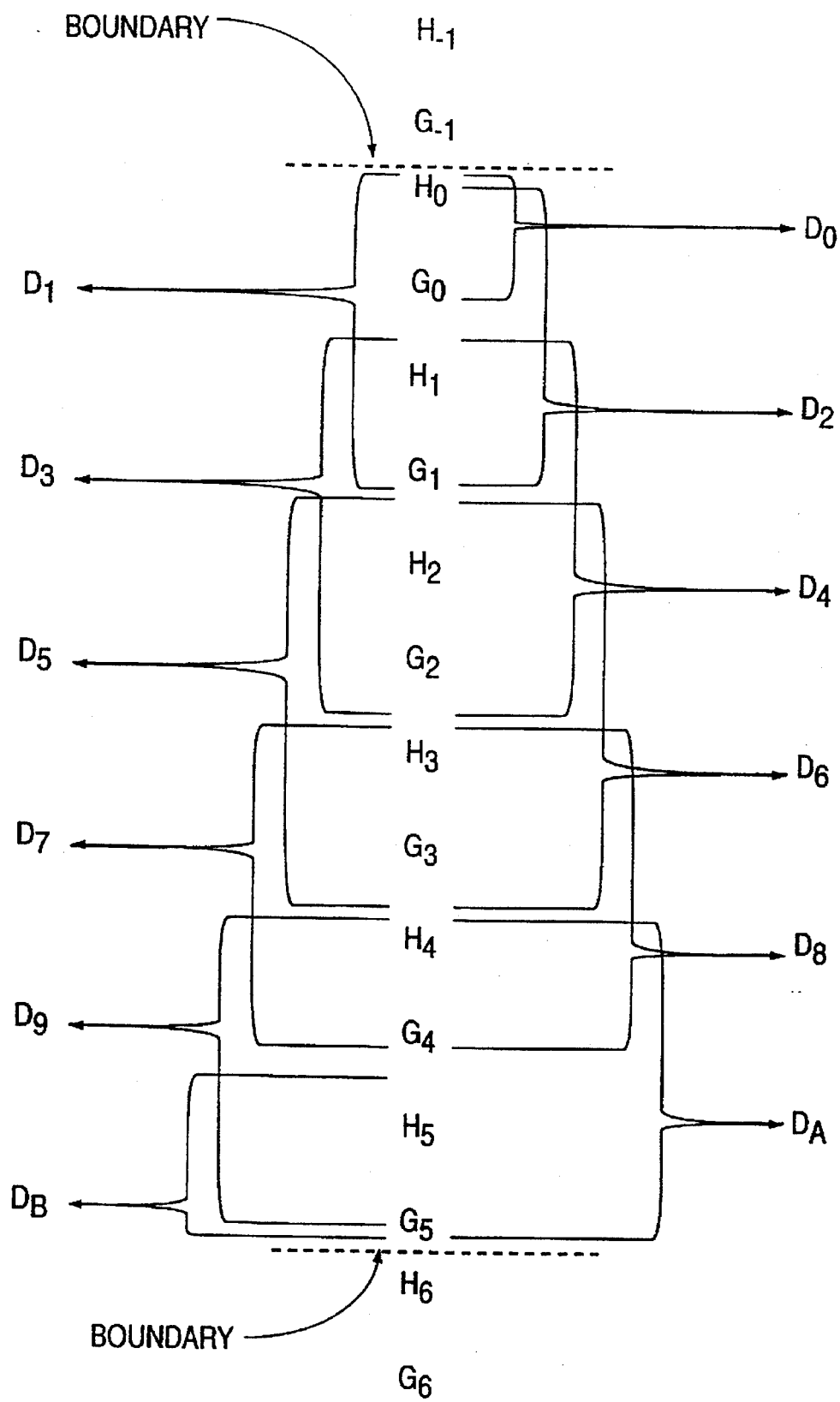
FIG. 22 is a diagram illustrating the operation of start and end inverse transform digital filters in accordance with one embodiment of the present invention.

As revealed by FIG. 22, not only does the forward transformation of data values at the boundary involve a boundary problem, but the inverse transformation of the transformed data values back into original image data values also involves a boundary problem. In the present example where four coefficient quasi-Daubechies filters are used to forward transform non-boundary data values, the inverse transform involves an odd inverse transform digital filter as well as an even inverse transform digital filter. Each of the odd and even filters has four coefficients. The even and odd reconstruction filters alternatingly generate a sequence of inverse transformed data values.

In FIG. 22, the data values to be transformed are denoted $H_0$, $G_0$ ... $H_4$, $G_4$, $H_5$, $G_5$. Where the forward transform processes the rows first and then the columns, the inverse transform processes the columns first and then the rows. FIG. 22 therefore shows a column of transferred data values being processed in a first step of the inverse transform. Both the forward and the inverse transforms in the described example, however, process the columns in a downward direction and process the rows in a left-right direction.

In FIG. 22, the inverse transformed data values reconstructed by the inverse transform digital filters are denoted $D_0$, $D_1$, $D_2$, $D_3$ ... $D_B$. The odd inverse transform digital filter outputs are shown on the left and the even inverse transform digital filter outputs are shown on the right.

At the beginning of the sequence of data values $H_0$, $G_0$, $H_1$, $G_1$ ... $H_5$ and $G_5$ to be inverse transformed, the four coefficient odd and even inverse transform digital filters determine the values of reconstructed data values $D_1$ and $D_2$ using values $H_0$, $G_0$, $H_1$ and $G_1$, respectively. Reconstructed data value $D_0$, however, cannot be reconstructed from the four coefficient even inverse transform digital filter without the four coefficient even inverse transform digital filter extending beyond the boundary. If the four coefficient even inverse transform filter were to be shifted two data values upward so that it could generate data value $D_0$, then the even four coefficient inverse transform digital filter would require two additional data values to be transformed, data values $G_{-1}$ and $H_{-1}$. $H_0$ is, however, the first data value within the boundary and is located adjacent the boundary.

To avoid the even four coefficient inverse transform digital filter extending beyond the boundary, a two coefficient inverse transform digital filter is used:

$$D_0=4[(b-a)H_0+(c-d)G_0] \qquad (\text{equ.}29)$$

in the case where $K1=aD_0$ and $K2=dD_0$. $D_0$ is the first data value and $H_0$ is the data value to be inverse transformed adjacent the start boundary. This even start inverse transform digital filter has the form of the four coefficient even inverse transform digital filter except that the $G_{-1}$ data value outside the boundary is chosen to be equal to $G_0$, and the $H_{-1}$ data value outside the boundary is chosen to be equal to $H_0$. The even start inverse transform digital filter therefore determines $D_0$ as a function of only $H_0$ and $G_0$ rather than as a function of $H_{-1}$, $G_{-1}$, $H_0$ and $G_0$.

Similarly, a two coefficient odd end inverse transform digital filter is used to avoid the four coefficient odd inverse transform digital filter from extending beyond the end boundary at the other boundary of a sequence of data values to be inverse transformed. The two coefficient odd end inverse transform digital filter used is:

$$D_B = 4[(c+d)H_5 - (a+b)G_5] \quad \text{(equ.30)}$$

in the case where $K4 = aD_B$ and $K3 = dD_B$. $D_B$ is the data value to be determined and $G_5$ is the data value to be inverse transformed adjacent the end boundary. This odd end inverse transform digital filter has the form of the four coefficient odd inverse transform digital filter except that the $H_6$ data value outside the boundary is chosen to be equal to $H_5$ and the $G_6$ data value outside the boundary is chosen to be equal to $G_5$. The odd end inverse transform digital filter therefore determines $D_B$ as a function of only $H_5$ and $G_5$ rather than as a function of $H_5$, $G_5$, $H_6$ and $G_6$.

It is to be understood that the particular even start and odd end inverse transform digital filters used in this embodiment are presented for illustrative purposes only. Where there is a different number of data values to be inverse transformed in a sequence of data values, an even end inverse transform digital filter may be used at the boundary rather than the odd end inverse transform digital filter. The even end inverse transform digital filter is an even inverse transform digital filter modified in accordance with the above process to have fewer coefficients than the even inverse transform digital filter operating on the inner data values. Where filters other than quasi-Daubechies inverse transform digital filters are used, start and end inverse transform digital filters can be generated from the actual even and odd inverse transform digital filters used to inverse transform data values which are not adjacent to a boundary. In the inverse transform, the start inverse transform digital filter processes the start of the transformed data values at the start boundary, then the four coefficient inverse transform digital filters process the non-boundary transformed data values, and then the end inverse transform digital filter processes the end of the transformed data values.

The true Daubechies filter coefficients a, b, c and d fulfil some simple relationships which show that the inverse transform digital filters correctly reconstruct non-boundary original image data values.

$$a + c = \tfrac{1}{2},\ b - d = \tfrac{1}{2},\ c + d = \tfrac{1}{4},\ b - a = \tfrac{1}{4} \quad \text{(equ.31)}$$

and the second order equations:

$$ac - bd = 0,\ a^2 + b^2 + c^2 + d^2 = \tfrac{1}{2} \quad \text{(equ.32)}$$

Take two consecutive H, G pairs:

$$H\left(\frac{x}{2}\right) = aD(x-1) + bD(x) + cD(x+1) - dD(x+2) \quad \text{(equ. 33)}$$

$$G\left(\frac{x}{2}\right) = dD(x-1) + cD(x) - bD(x+1) + aD(x+2) \quad \text{(equ. 34)}$$

$$H\left(\frac{x}{2} + 1\right) = aD(x+1) + bD(x+2) + cD(x+3) - dD(x+4) \quad \text{(equ. 35)}$$

$$G\left(\frac{x}{2} + 1\right) = dD(x+1) + cD(x+2) - bD(x+3) + aD(x+4) \quad \text{(equ. 36)}$$

Multiplying Equations 33 to 36 using the inverse transform digital filters gives:

$$cH\left(\frac{x}{2}\right) = acD(x-1) + bcD(x) + c^2D(x+1) - cdD(x+2) \quad \text{(equ. 37)}$$

$$-bG\left(\frac{x}{2}\right) = -bdD(x-1) - bcD(x) + b^2D(x+1) - abD(x+2) \quad \text{(equ. 38)}$$

$$aH\left(\frac{x}{2} + 1\right) = \quad \text{(equ. 39)}$$
$$a^2D(x+1) + abD(x+2) + acD(x+3) - adD(x+4)$$

$$dG\left(\frac{x}{2} + 1\right) = \quad \text{(equ. 40)}$$
$$d^2D(x+1) + cdD(x+2) + bdD(x+3) + adD(x+4)$$

$$-dH\left(\frac{x}{2}\right) = -adD(x-1) - bdD(x) - cdD(x+1) + d^2D(x+2) \quad \text{(equ. 41)}$$

$$aG\left(\frac{x}{2}\right) = adD(x-1) + acD(x) - abD(x+1) + a^2D(x+2) \quad \text{(equ. 42)}$$

$$bH\left(\frac{x}{2} + 1\right) = \quad \text{(equ. 43)}$$
$$abD(x+1) + b^2D(x+2) + bcD(x+3) - bdD(x+4)$$

$$cG\left(\frac{x}{2} + 1\right) = \quad \text{(equ. 44)}$$
$$cdD(x+1) + c^2D(x+2) - bcD(x+3) + acD(x+4)$$

Summing equations 37–40 and 41–44 yields:

$$cH\left(\frac{x}{2}\right) - bG\left(\frac{x}{2}\right) + aH\left(\frac{x}{2} + 1\right) + dG\left(\frac{x}{2} + 1\right) = \quad \text{(equ. 45)}$$
$$(ac - bd)D(x-1) + (a^2 + b^2 + c^2 + d^2)D(x+1) + (ac - bd)D(x+3) =$$
$$D(x+1)/2$$

$$-dH\left(\frac{x}{2}\right) + aG\left(\frac{x}{2}\right) + bH\left(\frac{x}{2} + 1\right) + cG\left(\frac{x}{2} + 1\right) = \quad \text{(equ. 46)}$$
$$(ac - bd)D(x) + (a^2 + b^2 + c^2 + d^2)D(x+2) + (ac - bd)D(x+4) =$$
$$D(x+2)/2$$

Using the coefficients of the four coefficient true Daubechies filter, the relationships of equations 31 and 32 hold. Equations 45 and 46 therefore show that with a one bit shift at the output, the original sequence of data values is reconstructed.

Similarly, that the even start reconstruction filter of equation 29 and the odd end reconstruction filter of equation 30 correctly reconstruct the original image data adjacent the boundaries is shown as follows.

For the even start filter, with the choice of $K1 = aD_0$ and $K2 = dD_0$ in equations 29 and 30, we have:

$$H_0 = (a+b)D_0 + cD_1 - dD_2 \quad \text{(equ.47)}$$

$$G_0 = (c+d)D_0 - bD_1 + aD_0 \quad \text{(equ.48)}$$

so $$bH_0 = b(a+b)D_0 + cbD_1 - dbD_2 \quad \text{(equ.49)}$$

$$cG_0 = c(c+d)D_0 - cbD_1 + acD_2 \quad \text{(equ.50)}$$

$$aH_0=a(a+b)D_0+acD_1-adD_2 \quad \text{(equ.51)}$$

$$dG_0=d(c+d)D_0-bdD_1+adD_2 \quad \text{(equ.51')}$$

and hence: from equation 29:

$$bH_0+cG_0-aH_0-dG_0=(b^2-a^2+c^2-d^2)D_0=D_0/4 \quad \text{(equ.52)}$$

For the odd end filter, with the choice of $K_3=dD_B$ and $K_4=aD_B$, we have:

$$H_5=aD_9+bD_A+(c-d)D_b \quad \text{(equ.53)}$$

$$G_5=dD_9+cD_A+(a-b)D_B \quad \text{(equ.54)}$$

$$cH_5=acD_9+bcD_A+c(c-d)D_B \quad \text{(equ.55)}$$

$$-bG_5=-bdD_9-bcD_A-b(a-d)D_B \quad \text{(equ.56)}$$

$$dH_5=daD_9+bdD_A+d(c-d)D_B \quad \text{(equ.57)}$$

$$-aG_5=-adD_9-caD_A-a(a-b)D_B \quad \text{(equ.58)}$$

and hence from equation 30:

$$(c+d)H_5-(a+b)G_5=(c^2-d^2+b^2-a^2)D_B=D_B/4 \quad \text{(equ.59)}$$

This reveals that the start and end boundary inverse transform digital filters can reconstruct the boundary data values of the original image when low pass and high pass start and end digital filters are used in the forward transform.

Tree Encoding and Decoding

As described above, performing the forward quasi-perfect inverse transform does not reduce the number of data values carrying the image information. Accordingly, the decomposed data values are encoded such that not all of the data values need be stored or transmitted. The present invention takes advantage of characteristics of the Human Visual System to encode more visually important information with a relatively larger number of bits while encoding less visually important information with a relatively smaller number of bits.

By applying the forward quasi-perfect inverse transform to a two-dimensional array of image data values, a number of sub-band images of varying dimensions and spectral contents is obtained. If traditional sub-band coding were used, then the sub-band images would be encoded separately without reference to each other except perhaps for a weighting factor for each band. This traditional sub-band encoding method is the most readily-recognized encoding method because only the spectral response is accurately localized in each band.

In accordance with the present invention, however, a finite support wavelet is used in the analysis of an image, so that the sub-bands of the decomposition include spatially local information which indicate the spatial locations in which the band frequency band occurs. Whereas most sub-band encoding methods use long filters in order to achieve superior frequency separation and maximal stop band rejection, the filter used in the present invention has compromised frequency characteristics in order to maintain good spatial locality.

Images can be thought of as comprising three components: background intensities, edges and textures. The forward quasi-perfect inverse transform separates the background intensities (the low pass luminance and chrominance bands) from the edge and texture information contained in the high frequency bands. Ideally, enough bandwidth would be available to encode both the edges and the textures so that the image would reconstruct perfectly. The compression due to the encoding would then be entirely due to removal of redundancy within the picture. If, however, the compressed data is to be transmitted and/or stored at low data transmission rates, some visual information of complex images must be lost. Because edges are a visually important image feature, the encoding method of the present invention locates and encodes information about edges or edge-like features for transmission or storage and places less importance on encoding textural information.

There are no exact definitions of what constitutes an edge and what constitutes texture. The present invention uses a definition of an edge that includes many types of textures. An edge or an edge-like feature is defined as a spatially local phenomenon giving rise to a sharp discontinuity in intensity, the edge or edge-like feature having non-zero spectral components at all frequencies. Accordingly, the present invention uses a frequency decomposition which incorporates spatial locality and which is invertible. The wavelet transform realized with quasi-perfect inverse transform digital filters meets these requirements.

Because an edge has non-zero components at all frequencies of the decomposition in the same locality, an edge can be located by searching through the wavelet decomposition for non-zero data values that represent edges. The method begins searching for edges by examining the low frequency sub-bands of the decomposition. These bands have only a small number of data values because of the subsampling used in the wavelet transform and because the spatial support of each low frequency data value is large. After a quick search of the lowest frequency sub-bands, the positions of potential edges are determined. Once the locations of the edges are determined in the lowest frequency sub-bands, these locations can be examined at a higher frequency resolutions to confirm that the edges exist and to more accurately determine their spatial locations.

Figure 23:
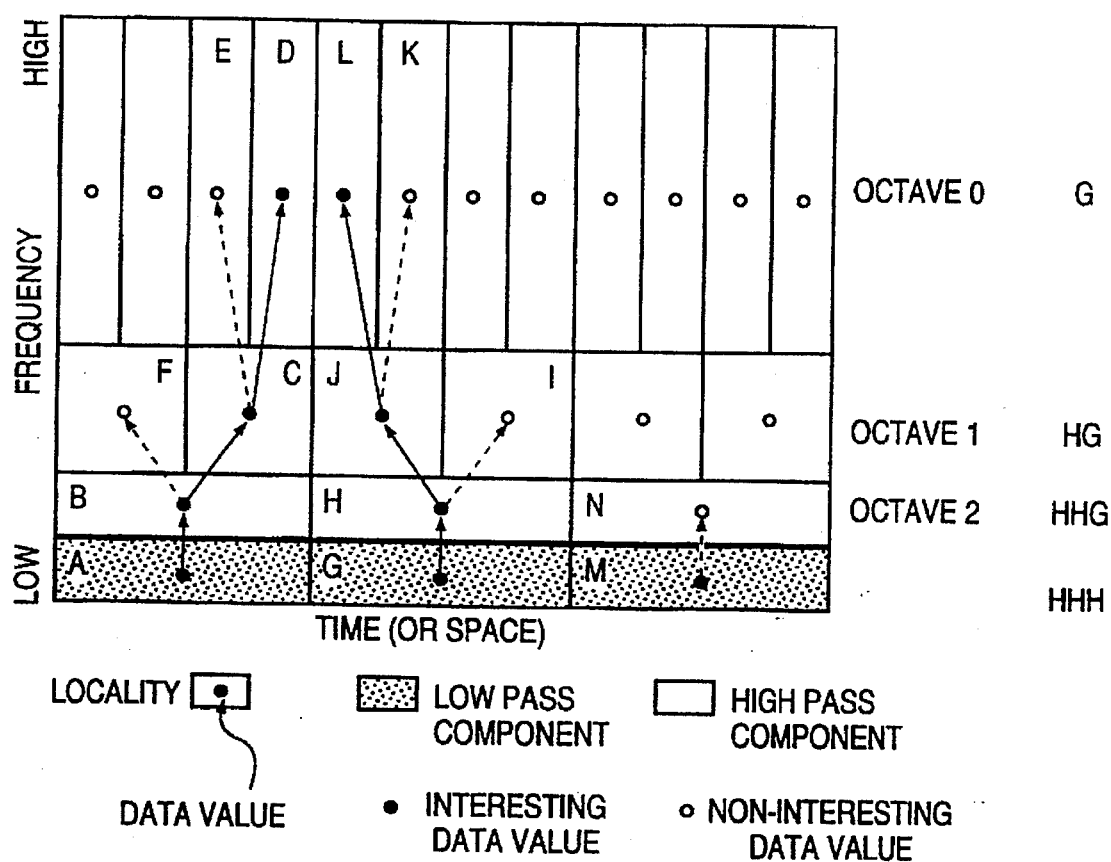
FIG. 23 is a diagram illustrating a one-dimensional tree structure in accordance one embodiment of the present invention.
Figure 24A:
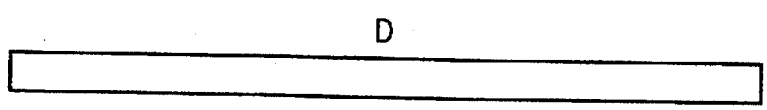
FIGS. 24A–D are diagrams illustrating the recursive filtering of data values to generate a one-dimensional decomposition corresponding with the one-dimensional tree structure of FIG. 23.
Figure 24B:
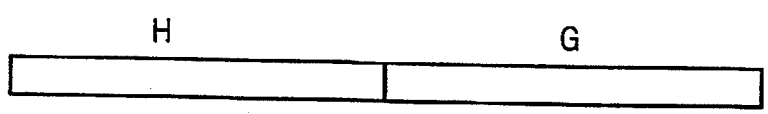
Figure 24C:
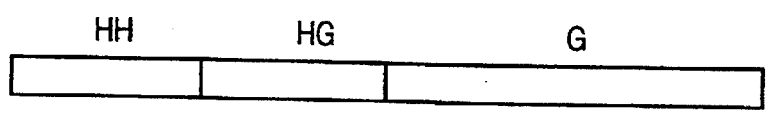
Figure 24D:
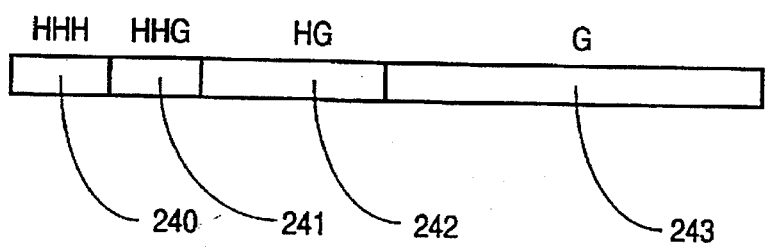

FIG. 23 illustrates an example of a one-dimensional binary search. There are three binary trees arranged from left to right in the decomposition of FIG. 23. There are three octaves, octaves 0, 1 and 2, of decomposed data values in FIG. 23. The low pass component is not considered to be an octave of the decomposition because most of the edge information has been filtered out. FIGS. 24A–24D illustrate the forward transformation of a one-dimensional sequence of data values D into a sequence of transformed data values such as the tree structure of FIG. 23. The data values of the sequence of FIG. 24A are filtered into low and high frequency components H and G of FIG. 24B. The low frequency component of FIG. 24B is then filtered into low and high frequency components HE and HG of FIG. 24C. The low frequency component HH of FIG. 24C is then filtered into low and high frequency components HHH and HHG. The transformed data values of HHH block 240 of FIG. 24D correspond with the low frequency component data values A, G and M of FIG. 23. The transformed data values of HHG block 241 of FIG. 24D correspond with the octave 2 data values B, H and N of FIG. 23. The transformed data values of HG block 242 of FIG. 24D correspond with the octave 1 data values of FIG. 23. Similarly, the transformed data values of G block 243 correspond with the octave 0 data values of FIG. 23. Although only three trees are shown in FIG. 23, the number of HHH data values in block 240 can be large and the size of the tree structure of FIG. 23 can extend in the horizontal dimension in a corresponding manner.

The encoding of a one dimensional wavelet decomposition such as the decomposition of FIG. 23 is performed in similar fashion to a binary tree search. The spatial support of a given data value in a given frequency band is the same as two data values in the octave above it in frequency. Thus the wavelet decomposition is visualized as an array of binary trees such as is illustrated in FIG. 23, each tree representing a spatial locality. The greater the number of transform octaves, the higher the trees extend upward and the fewer their number.

As illustrated in FIG. 23, each of the data values of the decomposition represents a feature which is either "interesting" to the human visual system, or it represents a feature that is "non-interesting" to the human visual system. A data value representing an edge of an object in an image or an edge-like feature is an example of an "interesting" data value. The encoding method is a depth first search, which starts at the trunk of a tree, ascends up the branches of the tree that are interesting, and terminates at the non-interesting branches. After all the branches of a tree have been ascended until a non-interesting data value is encountered or until the top of the branch is reached, the encoding of another tree is begun. Accordingly, as the encoding method follows the interesting data values of FIG. 23 from octave 2 to octave 1 to octave 0, the edge is followed from low to high frequency resolution and an increasingly better approximation to the spatial position and shape of the edge is made. Conversely, if at any stage, a non-interesting data value is found, the search is terminated for data values above that non-interesting data value. The higher frequency data values of the tree above a non-interesting data value are assumed to be non-interesting because the corresponding low frequency data values did not indicate the presence of an edge at this location. Any interesting data values that do exist in the higher frequency bands above a non-interesting data value in a low frequency band are rejected as noise.

The one-dimensional tree structure of FIG. 23 is encoded as follows. The low frequency components carry visually important information and are therefore always considered to be "interesting". The method of encoding therefore starts with low frequency component A. This data value is encoded. Next, the octave 2 data value B is tested to determine if it represents an edge or an edge-like feature which is "interesting" to the human visual system. Because data value B is interesting, a token is generated representing that the bits to follow will represent an encoded data value. Interesting data value B is then encoded. Because this tree has not yet terminated, the method continues upward in frequency. Data value C of octave 1 is then tested. For purposes of this example, data value C is considered to be interesting as are data values A, B, C, D, G, H, J, L and M as illustrated in FIG. 23. A token is therefore generated indicating an encoded data value will follow. After the token is sent, data value C is encoded. Because this branch has still not terminated in a non-interesting data value, the method continues upward in frequency. Data value D is tested to determine whether or not it is interesting. Because data value D is interesting, a token is generated and data value D is encoded. Because octave 0 is the highest octave in the decomposition, the encoding method tests the other branch originating from previous interesting data value C. Data value E however tests to be non-interesting. A non-interesting token is therefore generated. Data value E is not encoded and does not appear in the compressed data. With both branches originating at data value C terminated, the method proceeds down in frequency to test the remaining branches originating from the previous interesting data value B. Data value F is, however, determined to be non-interesting. A non-interesting token is therefore generated and data value F is not encoded and does not appear in the encoded data. Because this branch has terminated, all data values higher in frequency above data value F are considered to be non-interesting. A decoding device receiving the sequence of encoded data values and tokens can determine from the non-interesting token that all corresponding higher frequency data values were considered to be non-interesting by the encoding device. The decoding device can therefore write the appropriate data values as non-interesting and write zeroes to these locations obviating the need for the encoding device to transmit each non-interesting data value above F. With the first tree encoded, the method proceeds to the next low frequency component, data value G. This is a low frequency component and therefore is always considered to be interesting. Data value G is therefore encoded. The method then proceeds to the next tree through blocks H, I, J, K and L in that order generating interesting and non-interesting tokens and encoding interesting data values. Similarly, after the second tree is terminated, low frequency component data value M is encoded. Data value N is determined to be non-interesting so a non-interesting token is sent and the encoding of the third tree is terminated. In accordance with another embodiment of the present invention, a two-dimensional extension of the one-dimensional case is used. Rather than using binary trees, four branch trees are used. However, to create a practical image encoding method there are also real world factors to take into account. Using a single data value to predict whether the remainder of the tree is zero, is unreliable when dealing with noisy image data. A small two-by-two block of data values is therefore used as the node element in the tree structure of the two-dimensional embodiment. A decision as to whether or not an edge is present is based on four data values which is more reliable than a decision based on single data value.

Figure 25:
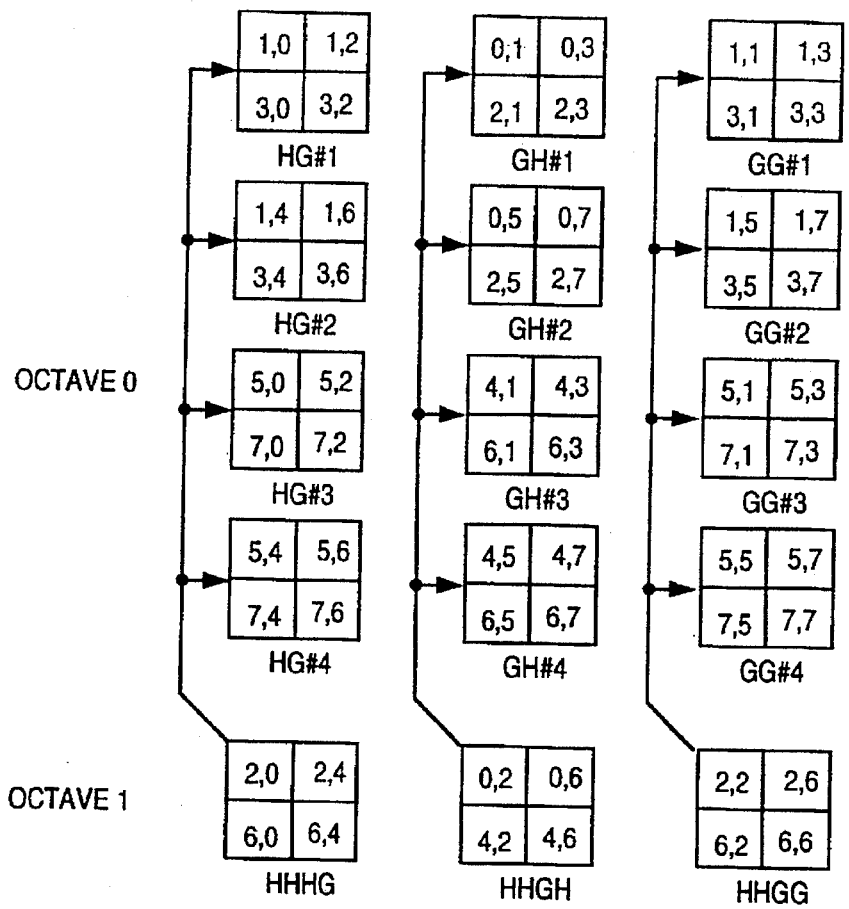
FIG. 25 is a diagram of a two-dimensional tree structure of two-by-two blocks of data values in accordance with one embodiment of the present invention.

FIG. 25 illustrates a tree structure representing a portion of the decomposition of FIG. 18. The decomposition of FIG. 18 may extend farther to the right and farther in a downward direction for larger two-dimensional arrays of image data values. Similarly, the tree structure of FIG. 25 may extend farther to the right for larger arrays of data values. FIG. 25 represents a decomposition only having octave 0 and 1 high frequency components. In the event that the decomposition had additional octaves of high frequency components, the tree structure would extend further upward. In contrast to the binary tree structure of FIG. 23, the tree structure of FIG. 25 is a four branch tree. The two-by-two block of four octave 1 data values HHHG is the root of a tree which extends upward in frequency to four HG two-by-two blocks. If another octave of decomposition were performed, another level of octave 2 high frequency two-by-two blocks would be inserted into the tree structure. Four HHHG octave 1 two-by-two blocks would, for example, have a single octave 2 HHHHHG block beneath them. The low frequency component would be denoted HHHHHH.

Figure 26:
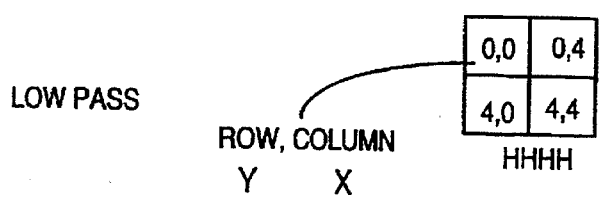
FIG. 26 is a pictorial representation of the data values of the two-dimension tree structure of FIG. 25.

FIG. 26 is a pictorial representation of the decomposition of the tree structure of FIG. 25. As explained above with respect to FIG. 15, the actual data values of the various denoted blocks are distributed throughout the two-dimensional array of data values. The two numbers separated by a comma in each of the boxes of FIG. 25 denote the row and column of a data value of the two-dimensional array of FIG. 18, respectively. Using this tree structure, it is possible to search through the transformed data values of FIG. 18 encoding interesting two-by-two blocks of data values and ignoring non-interesting two-by-two blocks.

To describe how the two dimensional encoding method uses the tree structure to search through a decomposition, some useful definitions are introduced. First an image decomp is defined with dimensions WIDTH by HEIGHT decomposed to number OCTS of octaves. A function Access is defined such that given some arguments, the function Access outputs the memory address of the specified data value in the wavelet decomposition decomp:

address=Access (oct, sub, x, y);

oct is the octave of the data value sought and is an integer value between 0 (the highest octave) and OCTS-1 (the number of octaves of transformation OCTS minus one). sub indicates which of the HH, HG, GH or GG bands of the decomposition it is that the data value sought is found. The use of sub=HH to access the low pass data values is only valid when the value of oct is set to that of the lowest octave. The co-ordinates x and y indicate the spatial location from the top left hand corner of the sub-band specified by oct and sub. The range of valid values of x and y are dependent an the octave being accessed. x has a range of $\{0 \ldots \text{WIDTH}/2^{oct+1}\}$. y has a range of $\{0 \ldots \text{HEIGHT}/P^{oct+1}\}$.

Given the function Access and a wavelet decomposition, a two-by-two block of data values can be read by the function ReadBlock.

```
block = (ReadBlock (decomp, oct, sub, x, y)  {
    block [0] [0] = decomp [Access (oct, sub, x, y)];
    block [0] [1] = decomp [Access (oct, sub, x+1, y)];
    block [1] [0] = decomp [Access (oct, sub, x, y+1)];
    block [1] [1] = decomp [Access (oct, sub, x+1, y+1)];
```

The wavelet decomposition is passed to the function ReadBlock via the variable decomp. The two-by-two block of data values is returned through the variable block.

Once a two-by-two block of data values is read, a decision is made as to whether the two-by-two block is visually "interesting" and should therefore be encoded or whether it is not and hence should be discarded. The decision is made by a function called Threshold. The arguments of the function Threshold are block, oct and sub. Threshold returns a boolean value True if the block is "interesting" and False if the block is "non-interesting".

If the block is determined to be interesting by the function threshold, it is encoded using a function called EncodeBlock. A function SendToken inserts a token before the encoded block to inform a decoding device which will later decode the compressed data whether the block to follow the token has been encoded (i.e. BlockNotEmpty) or has not been encoded (i.e. BlockEmpty). If a block is determined to be interesting, then a BlockNotEmpty token is sent, and the block is encoded; next the tree structure above the encoded block is ascended to better determine the location of the edge. The tree encoding procedure SendTree is therefore defined recursively as follows:

```
SendTreee (decomp, oct, sub, x, y, Q)  {
    block = ReadBlock (decomp, oct, sub, x, y,);
    If Threshold (block, oct, sub, Q)   {
    SendToken (BlockNotEmpty);
    EncodedBlock (block, oct, sub, Q);
    If (oct >0)  {
        SendTree (decomp, oct-1, sub, 2*x, 2*y, Q);
        SendTree (decomp, oct-1, sub, 2*(x+1), 2*y, Q);
        SendTree (decomp, oct-1, sub, 2*x, 2*(y+1), Q);
        SendTree (decomp, oct-1, sub, 2*(x+1), 2*(y+1), Q);
        }
    } else SendToken (BlockEmpty) ;
}
```

The procedure SendTree is only used to encode high-pass component data values. In procedure SendTree (decomp, oct, sub, x, y, Q), if the two-by-two block accessed by ReadBlock is determined to pass the threshold test, then SendTree (decomp, oct-1, sub 2*X, 2*y, Q) is used to test one of the next higher two-by-two blocks in the decomposition tree.

The low-pass data values are not considered to form part of the tree structure. The low-pass data values are encoded using another procedure SendLPF. In addition, the low-pass values are encoded using a different technique than that used in EncodeBlock, so a new procedure EncodeBlockLPF is required.

SendLPF (decomp, x, y, Q) { block=Readblock (decomp, OCTS-1, HH, x, y);

EncodeBlockLPF (block, OCTS-1, Q);

Accordingly, to encode the entire image, SendLPF is applied to all the block locations within the low pass band and SendTree is applied to the all the block locations in the HG, GH and GG bands, within the lowest octave. A procedure SendDecomp is therefore defined that encodes the entire image decomposition:

```
SendDecomp (decomp, Q)   {
    For (y+o; y<HEIGHT/2^OCTS; y=y+2)
    For (x=o; x<WIDTH/2^OCTS; x=x+2)   {
        SendLPF (decomp, x, y, Q);
        SendTree (decomp, OCTS-1, HG, x, y, Q);
        SendTree (decomp, OCTS-1, GH, x, y, Q);
        SendTree (decomp, OCTS-1, GG, x, y, Q);
        }
}
```

Accordingly, the above functions define a method for encoding wavelet decomposed images. In terms of speed of encoding for real-world images, many of the trees are terminated within the initial octaves so much of the decomposition is not examined. Due to this termination of many trees in the initial octaves, many data values need not be encoded which results in reducing the memory bandwidth and block processing required to implement the compression/decompression method. Provided the functions Threshold, EncodeBlockLPF and Access require only simple calculations, the decomposed data values are rapidly encoded.

To implement the function Access, a table containing all the addresses of the data values of the two-dimensional tree decomposition may be accessed using the variables x, y, sub and oct. For a small image having a small number of data values, this table lookup approach is reasonable. For images having, for example, approximately 80 different values of x, 60 different values of y, four different values of sub, and 3 or 4 values for oct, this table would contain approximately 150,000 10-bit locations. A less memory intensive way of determining the same X and Y addresses from the same variables is desirable.

In accordance with one embodiment of the present invention, a function is used to determine the X and Y addresses from the variables x, y, sub and oct. Address X, for example, may be determined as follows:

$$X=((x<<1)+(sub>>1))<<oct$$

where << denotes one shift to the right of value x and where >> denotes one shift to the left.

Address Y, for example, may be determined as follows:

$$Y=((y<<1)+(1 \text{ \& } sub))<<oct$$

where & denotes a bit-wise AND function.

In a high performance system, the function Access may be implemented according to the following method. The recursive function call and the table lookup methods described above are often too slow to implement in real time software or in hardware. FIGS. 27 and 28 illustrate how the tree decomposition of FIG. 25 is traversed in order to generate tokens and encode two-by-two blocks of data values. The X and the Y in FIGS. 27 and 28 denote coordinate addresses in the two-dimensional matrix of FIG. 18. In order to traverse the tree of the decomposition of FIG. 25, it is necessary to be able to determine the X and Y addresses of the data values represented in FIG. 25. FIG. 27 illustrates how the X and Y address of a two-by-two block of data values are determined for those two-by-two blocks of data values located in octave 0 of the decomposition of FIG. 25. Similarly, FIG. 28 illustrates how the X and Y addresses of the three two-by-two blocks of data values in octave 1 of the decomposition as well as the one two-by-two block of data values of the low pass component of the decomposition of FIG. 25 are determined. X as well as Y are each functions of oct, TreeRoot, and sub. The values of $sub_x$ and $sub_y$ are determined by the sub-band of the two-by-two block of data values sought.

FIG. 29 is a chart illustrating the values of $sub_x$ and $sub_y$ for each sub-band of the decomposition. If, for example, a two-by-two block of data values is sought in the HH band, then the values of $sub_x$ and $sub_y$ are 0 and 0, respectively. The values $TreeRoot_x$ and $TreeRoot_y$ together denote the particular tree of a decomposition containing the particular two-by-two block of the data values sought.

In FIGS. 27 and 28, the rectangles represent digital counters. The arrows interconnecting the rectangles indicate a sequence of incrementing the counters. For example, the right most rectangle in FIG. 27, which is called counter C1, has a least significant bit represented in FIG. 27 as bit $C1_x$ and a most significant bit represented as bit $C1_y$. Similarly, the next rectangle to the left in FIG. 27 represents a digital counter C2 having two bits, a least significant bit $C2_x$ and a most significant bit $C2_y$. The structure of the X, Y address depends on the octave in which the two-by-two block of data values being sought resides. To generate the X, Y address in octave oct=1, the counter C1 is not included, the $sub_x$ and $sub_y$ bits indicating the sub-band bits are shifted one place to the left, and the least significant bits are filled with zeros. The incrementing of the counters in FIG. 28 proceeds as illustrated by the arrows.

To determine the X and Y addresses of the four data values of the low pass component HHHH of FIG. 25, FIG. 28 is used. Because the two-by-two block of data values being sought is a two-by-two block of the low pass component, the values of $sub_x$ and $sub_y$ are 0, 0 as required by the table of FIG. 29. The C2 counter of FIG. 28 increments through the four possible values of $C2_x$ and $C2_y$ to generate the four addresses in the two-by-two block of data values of the HHHH in the low pass component of FIG. 25. The value of $TreeRoot_x$ and $TreeRoot_y$ are zeroes because this is the first tree of the decomposition. For subsequent trees of the decomposition, $TreeRoot_x$ and $TreeRoot_y$ are incremented as illustrated by the arrows in FIG. 28 so that the X and Y addresses of the other two-by-two blocks of data values in the low pass component of the tree decomposition can be determined. After this HHHH two-by-two block of data values is located, the four data values are encoded and the search through the tree structure proceeds to the two-by-two block of data values in octave 1 denoted HHHG in FIG. 25. To determine the X and Y addresses of the four data values of this two-by-two block, the value of bits $sub_x$ and $sub_y$ are changed in accordance with FIG. 29. Because this two-by-two block is in the HG sub-band, the values of $sub_x$ and $sub_y$ are 0 and 1, respectively. The C2 counter is then incremented through its four values to generate the four addresses of the four data values in that block. Supposing, that this two-by-two block is determined to be "interesting" then an interesting token is sent, each of the four data values of the block are encoded, and the tree is then ascended to the two-by-two block of data values in octave 0 denoted HG#1. These four addresses are determined in accordance with FIG. 27. Because the sub-band is sub-band HG, the values of the bits $sub_x$ and $sub_y$ are 0 and 1, respectively. Counter C1 is then incremented so that the four addresses illustrated in the two-by-two block octave 0 HG#1 of FIG. 25 are generated. If the two-by-two block is interesting, then the interesting token is sent and the four data values are encoded. If the two-by-two block is determined not to be interesting, then a non-interesting token is sent and the four data values are not encoded. The search through the tree structure of the decomposition then proceeds to octave 0 block HG#2. After the four addresses of the octave 0 block HG#1 are generated, the $C2_x$ bit of the C2 counter is incremented in accordance with the arrows shown in FIG. 26A. Accordingly, the octave 0 block HG#2 is addressed when once again the C1 counter increments through its four states. If the data values of this two-by-two block are determined to be "interesting", an interesting token is sent followed by the encoded data values. If the data values of the two-by-two block are determined to be non-interesting, then a non-interesting token is sent. After all of the four two-by-two blocks of the octave 0 HG sub-band are searched, then that HG tree is terminated and the search proceeds to determine the four addresses of the four data values of the octave 1 HHGH two-by-two block. In accordance with this technique, it is possible to traverse the structure of the decomposition and determine the addresses of any two-by-two block in any octave or any sub-band with minimum overhead. Moving between consecutive addresses or descending trees is a simple operation when compared to the snaking address path used by other compression methods such as JPEG.

When implemented in software, this technique enables real time compression and decompression whereas other techniques may be too slow. If implemented in hardware, this technique provides for a reduced gate count and an efficient implementation. Although this example shows one way of traversing the tree structure of wavelet transform decomposition, it is possible to traverse the tree structure in other ways simply by changing the control structure represented in FIGS. 27 and 28 to allow for a different traversal of the tree structure. For example, all of the low pass HHHH blocks can be located and encoded first followed by all of the HHHG tree of the decomposition, and then all of the HHGH trees, and then all of the HHGG trees.

QUANTIZATION

Figure 30:
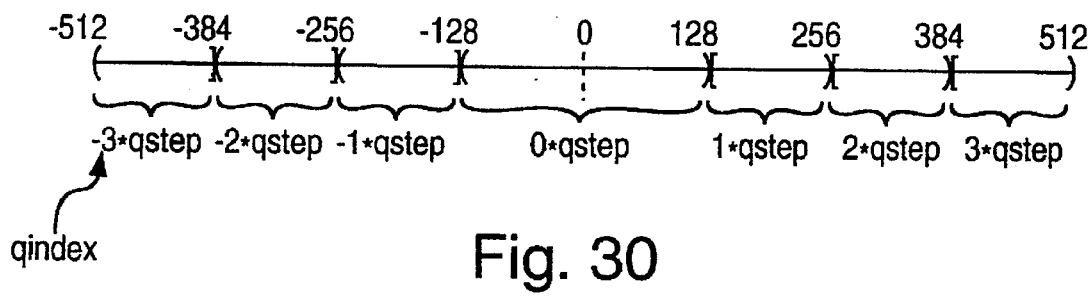
FIGS. 30 and 31 are diagrams illustrating a quantization of transformed data values in accordance with one embodiment of the present invention.
Figure 31:
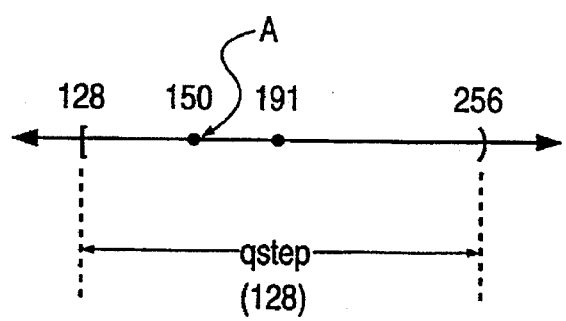

Each data value of each two-by-two block of the tree decomposition which is determined to be "interesting" is quantized and then Huffman encoded. A linear mid-step quantizer with double-width-0 step is used to quantize each of the data values. FIG. 30 is an illustration of the quantization of a 10-bit twos complement data value. The range of the 10-bit data value to be quantized ranges from −512 to 511 as illustrated by the numbers above the horizontal line in FIG. 30. This range is broken up into a plurality of steps. FIG. 31 represents one such step of data values which extends from 128 to 256 in FIG. 30. All incoming data values having values between 128 and 255 inclusive are quantized by dividing the data value by the value qstep. Accordingly, the data value A having a value of 150 as illustrated in FIG. 31 is divided by the qstep value 128 and results in a qindex number of 1. Integer division is used to generate qindex and the fractional part of the remainder is discarded. Once the qindex number is determined, the qindex number is Huffman encoded. An overall Q value is sent once per frame of compressed data values. The value qstep is determined from the overall Q value as described below.

To inverse quantize the qindex number and the qstep value to determine the value of the transformed data values before inverse transformation, the device decoding the incoming quantized values calculates the value of qstep using the value of Q according to a method described below. Once the value of qstep is determined, qindex for a given data value is multiplied by qstep.

In the example of FIG. 31, qindex value 1 times qstep 128 results in an inverse quantized value of 128. If this inverse quantized value of 128 were used, however, all the data values in the step 128 through 255 would be inverse quantized to the value of 128 at the left end of the step. This would result in unacceptably large errors. On the other hand, if all the data values in the range of FIG. 31 were inverse quantized to the mid-step value 191, then less error would result. Accordingly, an inverse quantized value qvalue can be calculated from qindex and qstep as follows:

$$qvalue(qindex, qstep) = \begin{cases} qindex*qstep - \left(\frac{qstep}{2} - 1\right) & \text{if } qindex < 0 \\ 0 & \text{if } qindex = 0 \\ qindex*qstep + \left(\frac{qstep}{2} - 1\right) & \text{if } qindex > 0 \end{cases}$$

The human visual system, however, has different sensitivities to quantization errors depending upon the particular sub-band containing the quantized data values. The human visual system performs complex non-linear processing. Although the way the human visual system relates image intensities to recognizable structures is not well understood, it is nevertheless important to take advantage of as much information about the human visual system as possible in order to maximize compression ratio versus picture quality. The wavelet transform approximates the initial image processing performed by the human brain. Factors such as spatial frequency response and Weber's Law can therefore be applied directly to the wavelet transformed data values because the transformed data values are in a convenient representation.

Figure 32:
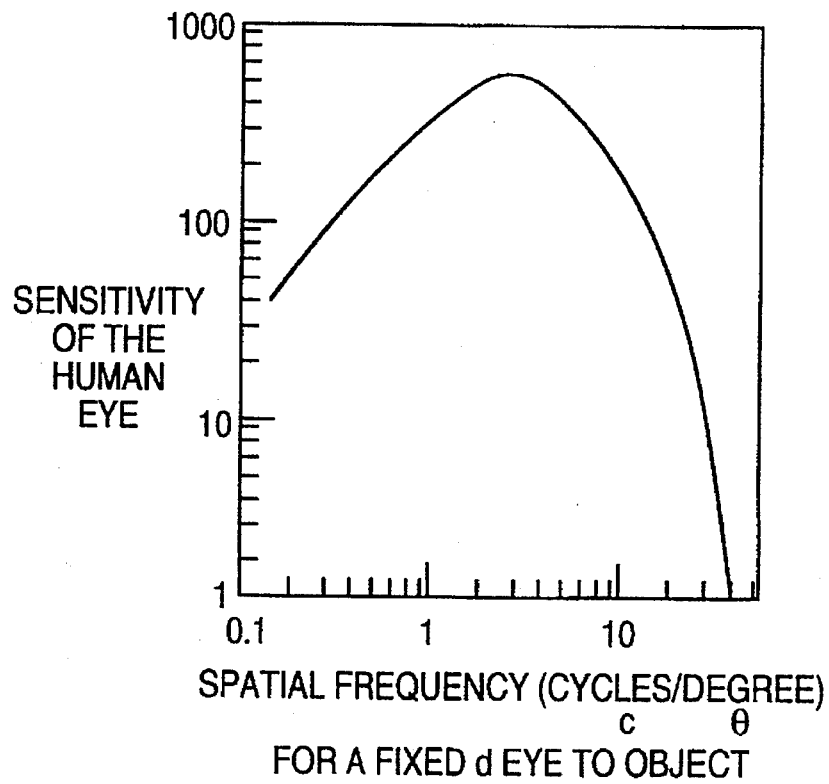
FIGS. 32 and 33 are diagrams illustrating the sensitivity of the human eye to spatial frequency.
Figure 33:
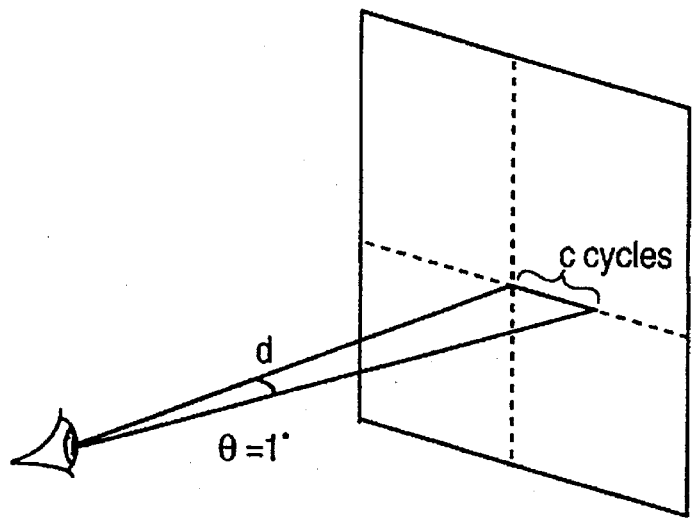

FIG. 32 shows the sensitivity of the human eye to spatial frequency. Spatial frequency is measured in cycles c per visual angle θ. A screen is positioned at a distance d from an observer as illustrated in FIG. 33. A light of sinusoidally varying luminance is projected onto the screen. The spatial frequency is the number of luminance cycles c per visual degree θ at distance d. Note from FIG. 32 that the sensitivity of the human eye varies with spatial frequency. Accordingly, the value of qstep is varied depending on the octave and sub-band of the data value being quantized. The qstep at which a data value is quantized is determined from the variables oct, sub and Q for that data value as follows:

$$qstep(oct, sub, Q) = Q * hvs\_factor(oct, sub)$$

$$hvs\_factor(oct, sub) = \begin{Bmatrix} \sqrt{2} & \text{if } sub = GG \\ 1 & \text{otherwise} \end{Bmatrix} * \begin{Bmatrix} 1.00 & \text{if } oct = 0 \\ 0.32 & \text{if } oct = 1 \\ 0.16 & \text{if } oct = 2 \\ 0.10 & \text{if } oct = 3 \end{Bmatrix}$$

The scaling factors 1.00, 0.32, 0.16 and 0.10 relate to the spatial frequency scale of FIG. 32 to take into account the frequency dependent sensitivity of the human eye.

It is to be understood that scaling factors other than 1.00, 0.32, 0.16 and 0.10 could be used. For example, other scaling factors can be used where the quantizer is used to compress audio data which is received by the human ear rather than by the human eye. Moreover, note that the sub-band GG is quantized more heavily than the other sub-bands because the sub-band GG contains diagonal information which is less important to the human eye than horizontal and vertical information. This method can also be extended down to the level of two-by-two blocks of data values to further tailor the degree of quantization to the human visual system. The function hvs_factor which has only two parameters in the presently described embodiment is only one embodiment of the present invention. The function hvs_factor, for example, can take into account other characteristics of the human visual system other than oct and sub, such as the luminance of the background and texture masking.

THRESHOLDING

For each new two-by-two block of data values in the tree decomposition, a decision must be made as to whether the block is "interesting" or "non-interesting". This can be done by the function threshold:

$$threshold(block, limit) = limit > \sum_{y=0}^{1} \sum_{x=0}^{1} |block[y][x]| \qquad (equ. 60)$$

The sum of the absolute values of the data values of the block block is determined as is represented by the double summation to the right of the less than sign and this value is compared to a threshold value limit. "Interesting" blocks are those blocks, for which the sum of the absolute values of the four data values exceeds the value limit, whereas "non-interesting" blocks are those blocks for which the sum is less than or equal to the value limit.

The value limit takes into account the variable quantizer step size qstep which varies with octave. For example, a two-by-two block of data values could be determined to pass the test threshold, but after quantizing by qstep could result in four zero quantized values. For example, all data values between −128 and 127 are quantized to have a quantized qindex of zero as is shown in FIG. 30 even if some of those data values are determined to correspond with an "interesting" two-by-two block. For this reason, the value limit is calculated according to the equation:

$$limit = 4 * Bthreshold * qstep \qquad (equ.61)$$

In this equation "Bthreshold" is base threshold image factor. In the presently described example, this base threshold is equal to 1.0. The value of 1.0 for the base threshold Bthreshold was determined through extensive experimentation on test images. The factor 4 in equation 61 is included to account for the fact that there are four data values in the block under consideration. In this way blocks are not determined to be interesting, the data values for which the quantizer will later reduce to zeros. This weighted threshold factor limit also reduces the number of operations performed in the quantizer because a fewer number of data values are quantized.

HUFFMAN CODING

The wavelet transform produces transformed data values whose statistics are vastly different from the data values of the original image. The transformed data values of the high-pass sub-bands have a probability distribution that is similar to an exponential or Laplacian characteristic with mean zero.

Figure 34:
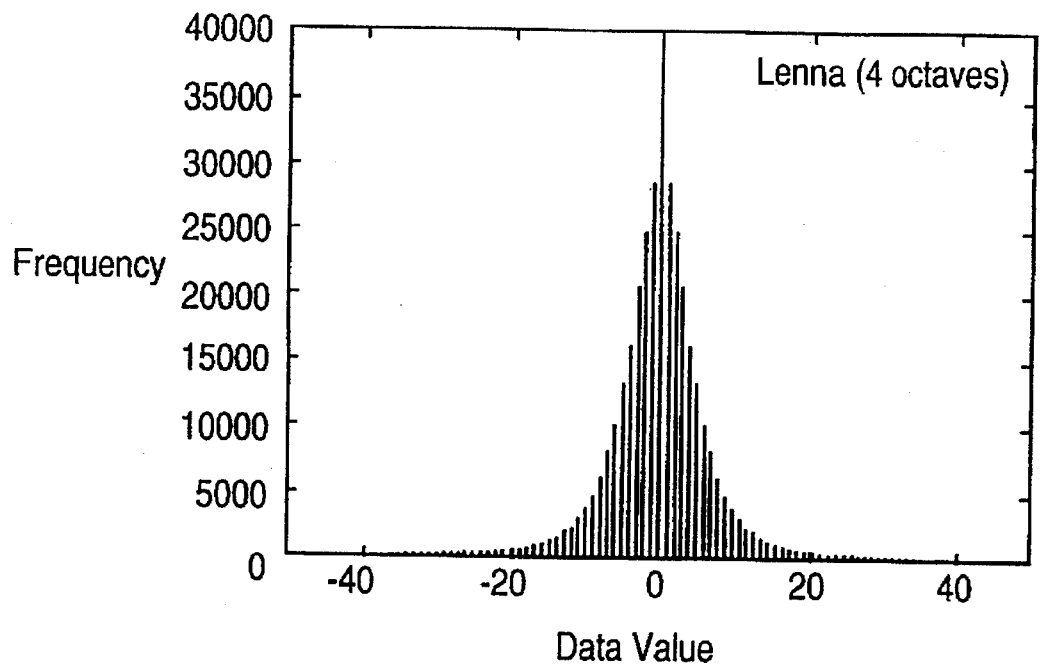
FIG. 34 is a diagram illustrating the distribution of high pass component data values in a four octave wavelet decomposition of the test image Lenna.
Figure 35:
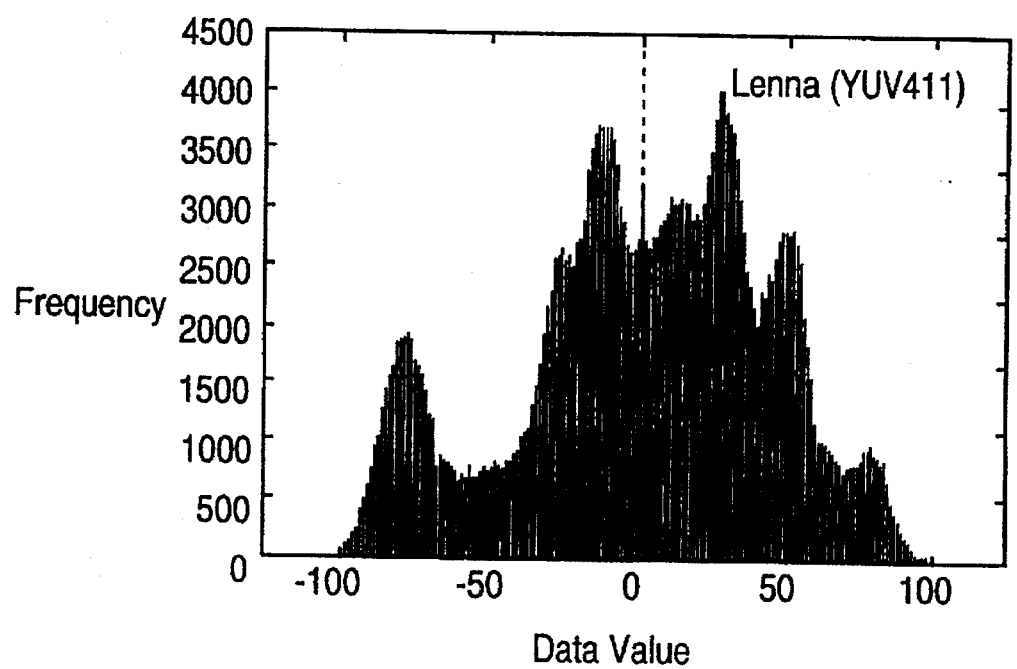
FIG. 35 is a diagram illustrating the distribution of data values of the test image Lenna before wavelet transformation.

FIG. 34 shows the distribution of high pass data values in a four octave wavelet decomposition of the test image Lenna. FIG. 35 shows the distribution of the data values of the test image Lenna before wavelet transformation. The low-pass component data values have a flat distribution that approximates the distribution of luminance and chrominance values in the original image. The high and low pass data values are encoded differently for this reason.

The low pass component data values are encoded by the function Encode LPF as follows:

EncodeBlockLPF (block, OCT-1, Q) {

Output (block[0][0]/qstep (OCT-1, HH, Q));

Output (block [0][1]/qstep (OCT-1, HH, Q));

Output (block[1][0]/qstep (OCT-1, HH, Q));

Output (block[1][1]/qstep (OCT-1, HH, Q));}

After encoding, the low-pass data values are quantized and output into the compressed data stream. The low pass data values are not Huffman encoded.

The high frequency component data values which pass the threshold test are quantized and Huffman encoded to take advantage of their Laplacian distribution. Function Encode-Block performs the quantization and the Huffman encoding for each of the four data values of an interesting high frequency component block block. In the function EncodeBlock, the variable sub is provided so that when function qstep is called, different quantization qstep values can be used for different high frequency component sub-bands. The function huffman performs a table lookup to a fixed Huffman code table such as the table of Table 3. The function EncodeBlock is defined as follows:

TABLE 3

EncodeBlock (block, oct, sub, Q) {
  Output (huffman (block [0] [0]/qstep (oct, sub, Q)));
  Output (huffman (block [0] [1]/qstep (oct, sub, Q)));
  Output (huffman (block [1] [0]/qstep (oct, sub, Q)));
  Output (huffman (block [1] [1]/qstep (oct, sub, Q)));
}

| qindex | Huffman code |
|---|---|
| −38 ... −512 | 1 1 0 0 0 0 0 0 1 1 1 1 1 1 1 1 |
| −22 ... −37 | 1 1 0 0 0 0 0 0 1 1 1 1 (l qindexl −22) |
| −7 ... −21 | 1 1 0 0 0 0 0 0 (l qindexl −7) |
| −6 | 1 1 0 0 0 0 0 1 |
| . | . |
| . | . |
| −2 | 1 1 0 1 |
| −1 | 1 1 1 |
| 0 | 0 |
| 1 | 1 0 1 |
| 2 | 1 0 0 1 |
| . | . |
| . | . |

TABLE 3-continued

| 6 | 1 0 0 0 0 0 0 1 |
| 7 ... 21 | 1 0 0 0 0 0 0 0 (l qindexl −7) |
| 22 ... 37 | 1 0 0 0 0 0 0 0 1 1 1 1 (l qindexl −22) |
| 38 ... 511 | 1 0 0 0 0 0 0 0 1 1 1 1 1 1 1 1 |

The second bit from the left in the Huffman code of Table 3 is a sign bit. The value lqindexl-7 is represented with 4 bits in the case 7≦lqindexl≦21. The value lqindexl-22 is represented with 4 bits in the case 22≦lqindexl≦37).

ENCODING OF TOKENS

At high compression ratios the number of bits in the compressed data stream used by tokens may be reduced by amalgamating groups of "non-interesting" tokens. This can be achieved by introducing new tokens. In accordance with one embodiment of the present invention, two new tokens, OctEmpty and OctNotEmpty are used. For a high pass component block in a tree above octave zero, there are four branches. The additional pair of tokens indicate whether all four are non-interesting. If all four are non-interesting, only a single OctEmpty token need be sent. Otherwise, an Oct-NotEmpty token is generated before the four branches are encoded. The particular token scheme described above was selected more to simplify the hardware and software implementations than it was to achieve in the best compression ratio possible. Other methods of representing relatively long sequences of token bits in the compressed data stream using other tokens having a relatively fewer number of bits may be used in place of the tokens OctEmpty and OctNotEmpty to achieve higher compression ratios.

VIDEO ENCODING AND DECODING

In comparison with the coding of a still image, the successive images of a video sequence typically contain much redundant information. The redundancy of this information is used to reduce the bit rate. If a location in a new frame of the video contains the same or substantially the same information as a corresponding location in the previous old frame of video, that portion of the new frame need not be encoded and introduced into the compressed data. This results in a reduction in the total number of bits in the encoded bit stream.

Figure 36:
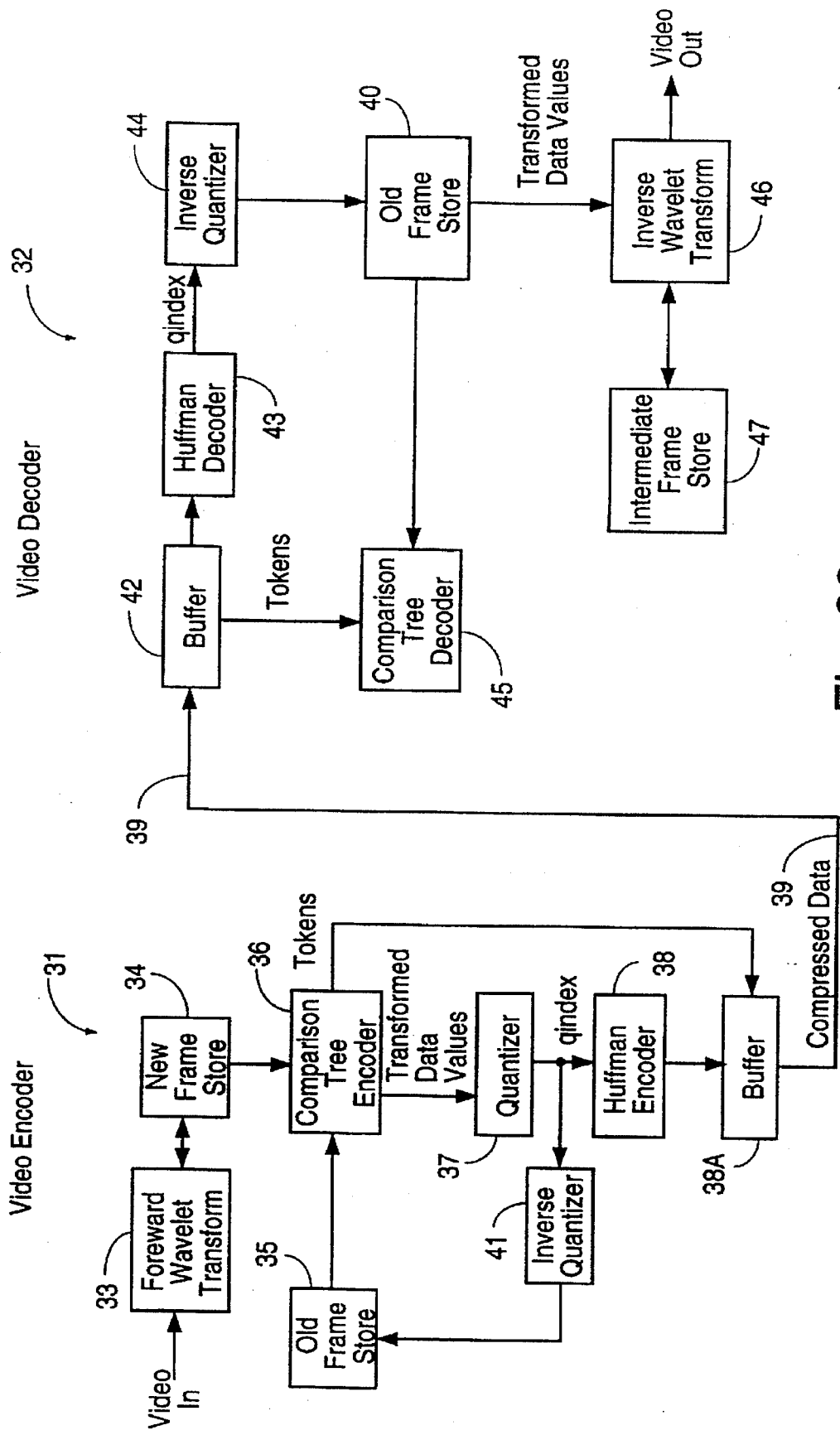
FIG. 36 is a block diagram illustrating a video encoder and a video decoder in accordance with one embodiment of the present invention.

FIG. 36 illustrates a video encoder 31 and a video decoder 32. A video input signal is transformed by a forward wavelet transform block 33, the output of which is written to a new frame store 34. The first frame of video information in the new frame store 34 is referred to as the new frame because no previous frame exists in the old frame store 35 for containing an old frame. A comparison tree encoder 36 therefore generates tokens and transformed data values as described above from the data values output from new frame store 34. The transformed data values are quantized by quantizer 37 into qindex levels. These qindex levels are then Huffman coded by the Huffman encoder 38. The resulting encoded data values are then combined with the tokens in buffer 38A to form a decompressed data bit stream 39.

An essential part of this method is that the old frame present in the video encoder 31 is exactly the same as the old frame 40 present in the video decoder 32. This allows the decoder 32 to be able to correctly decode the encoded bit stream 39 due to the fact that the encoded bit stream contains differences between new and old images and due to the fact that parts of the new frame are not sent due to compression. An inverse quantizer 41 is therefore provided in the video encoder 31 to inverse quantize the qindex levels and to store the old frame as sent into old frame store 35 for future comparison with the next frame of the video input signal.

In the video decoder 32, the compressed data stream 39 is received by a buffer 42. The tokens are separated from the Huffman encoded qindex levels. The Huffman encoded qindex levels are supplied to a Huffman decoder 43, the output of which is supplied to an inverse quantizer 44. The output of the inverse quantizer 44 is written into old frame store 40 under the control of the comparison tree decoder 45. Comparison tree decoder 45 determines what is written into the old frame store 40, depending in part on the tokens received from buffer 42. Once a new frame of transformed data values is present in old frame store 40, an inverse wavelet transform 46 inverse transforms that frame of transformed data values into a corresponding video output signal. To prevent the inverse wavelet transform 46 from overwriting and therefore corrupting the contents of old frame store 40 when it reconstructs data values corresponding to the original new frame data values, an intermediate frame store 47 is maintained.

The octave one HHHG, HHGH, HHGG, and HHHH from FIG. 25 are read from the old frame store 40 by the inverse wavelet transform 46 to perform the octave 1 inverse transform as described above. However, the resulting octave 0 HH sub-band, output from the inverse wavelet transform 46 is now written to the intermediate frame store 47, so as not to corrupt the old frame store 40. For the octave 0 inverse wavelet transform, the HG, GH, and GG sub-bands are read from the old frame store 40, and the HH sub-band is read from the intermediate frame store 47, to complete the inverse wavelet transform.

When the second frame of compressed video data 39 is received by the video decoder 32, the tokens received by the comparison tree coder 45 are related to the contents of the previous frame of video information contained in old frame store 40. Accordingly, the video decoder 32 can reconstruct the latest frame of video data using the contents of the frame store 40 and the contents and the data values encoded in the compressed data stream 39. This is possible because the compressed data stream contains all the information necessary for the video decoder 32 to follow the same traversal of the tree of the decomposition that the encoder used to traverse the tree in the generation of the compressed data stream. The video decoder 32 therefore works in lock step with the video encoder 31. Both the encoder 31 and the decoder 32 maintain the same mode at a corresponding location in the tree. When the encoder 31 determines a new mode, it incorporates into the compressed data stream 39 a corresponding token, which the video decoder 32 uses to assume that new mode.

Figure 37:
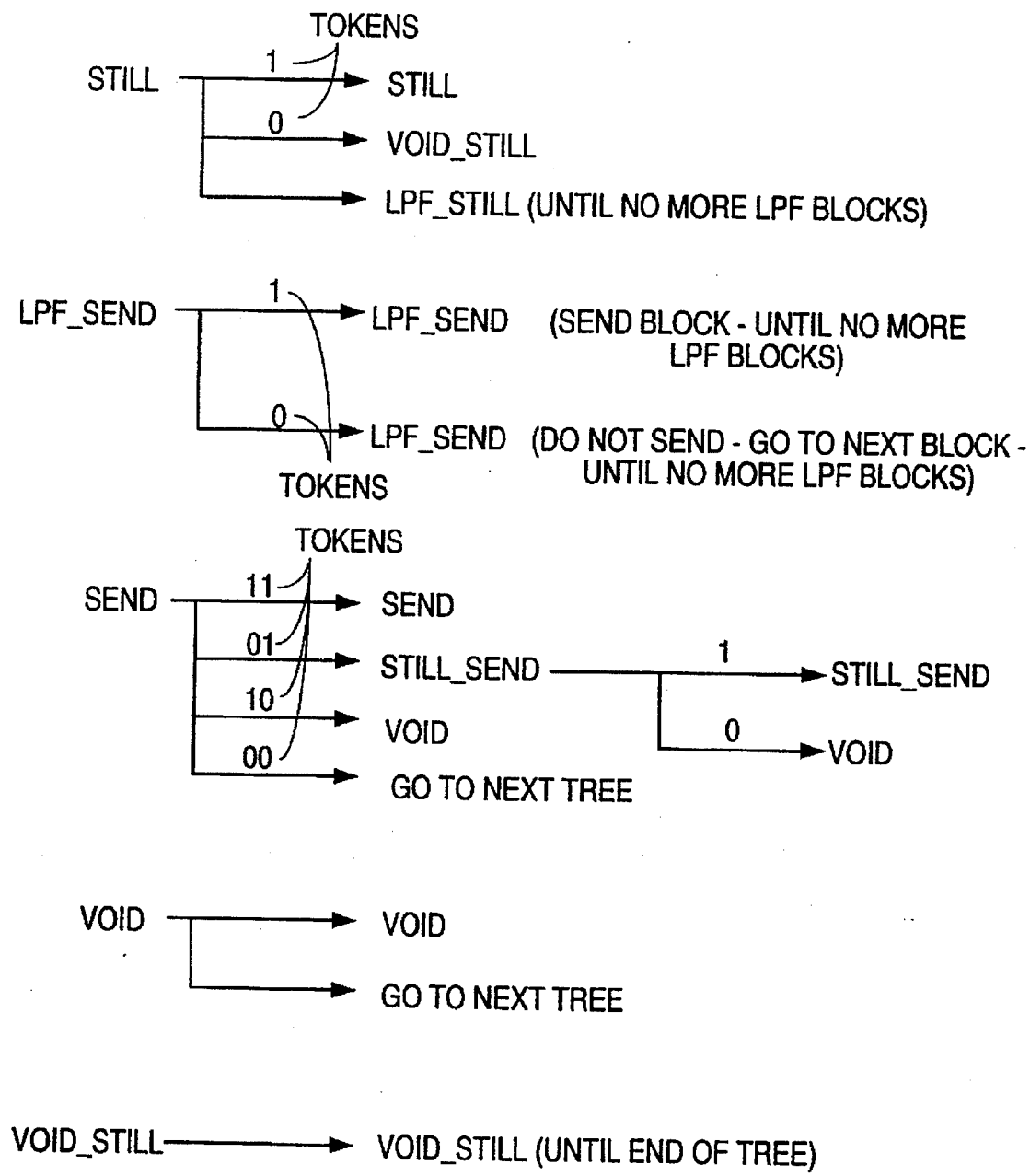
FIG. 37 is a diagram illustrating modes of the video encoder and video decoder of FIG. 36 and the corresponding token values.

FIG. 37 illustrates the modes of operation of one possible embodiment of the present invention. To explain the operation of the video encoder 31 and the video decoder 32, an example is provided. The initial frame of the video sequence is processed by the video encoder 31 in still mode. Still mode has three sub-modes: STILL, VOID_STILL, and LPF_STILL. The low pass two-by-two blocks of data values of the decomposition cause the comparison tree encoder 36 of video encoder 31 to enter the LPF_STILL sub-mode. In this sub-mode, the four data values of the two-by-two block are quantized but are not Huffman encoded. Similarly, no token is generated. The successive low pass component two-by-two blocks of data values are successively quantized and output into the compressed data stream 39.

Next, the lowest frequency octave of one of the sub-bands is processed by the comparison tree encoder 36. This two-by-two block of data values corresponds with block HHHG illustrated in FIG. 25. The four data values of this two-by-two block are tested against the threshold limit to determine if it is "interesting". If the two-by-two block HHHG is interesting, then a single bit token 1 is generated, as illustrated in FIG. 37, the mode of the comparison tree encoder remains in STILL mode, and the four data values of the two-by-two block HHHG are successively quantized and encoded and output into the compressed data stream 39.

For the purposes of this example, block HHHG is assumed to be interesting. The tree structure of FIG. 25 is therefore ascended to octave 0 two-by-two block HG#1. Because the comparison tree encoder 31 remains in the STILL mode, this block is encoded in the STILL mode. The four data values of block HG#1 are tested to determine whether or not they are interesting. This sequence of testing the successive blocks of the tree structure is repeated as described above.

After the traversal of the four octave 0 sub-blocks HG#1, HG#2, HG#3 and HG#4, the comparison tree encoder 36 proceeds in the tree structure to the two-by-two block of data values in octave 1, block HHGH. For purposes of this example, this two-by-two is non-interesting. After the comparison tree encoder 36 reads the four data values, the result of the threshold test indicates a non-interesting two-by-two block. As illustrated in FIG. 37, the encoder 31 which is in the STILL mode now generates a single bit token 0 and the comparison tree encoder 36 enters the VOID_STILL sub-mode. Although no additional information is output into the compressed data stream 39, the comparison tree encoder 36 proceeds to write 0's into the four locations of the two-by-two block HHGH, as well as all the locations of the two-by-two blocks in the tree above the non-interesting two-by-two block HHGH. In the example of FIG. 25, the comparison tree encoder 36 writes 0's into all the addresses of blocks HHGH, GH#1, GH#2, GH#3 and GH#4. This zeroing is performed because the video decoder 32 will not be receiving the data values corresponding to that tree. Rather, the video decoder 32 will be receiving only a non-interesting token, a single bit 0. The video decoder 32 will therefore write zeros into frame store 40 in the remainder of the corresponding tree. In order to make sure that both the video encoder 31 and the video decoder 32 have exactly the same old frame 35 and 40, the video encoder too must zero out those non-interesting blocks.

After the first frame of video data has been encoded and sent in STILL mode, the next frame of video data is processed by the video encoder 31. By default, the encoder now enters SEND mode. For lowpass frequency component two-by-two blocks, the video encoder 31 enters the LPF_SEND mode as illustrated in FIG. 37. The encoding of such a lowpass component two-by-two block corresponds with the encoding of two-by-two block HHHH in FIG. 25. However, now the comparison tree encoder 36 has both a new frame in frame store 34 as well as an old frame in frame store 35. Accordingly, the comparison tree encoder 36 determines the arithmetic difference of the respective four data values in the new frame from the four data values in the old frame at the corresponding position and compares the sum of those differences with a compare threshold. The compare threshold, compare, is calculated from a base compare threshold "Bcompare" as in the case of the previous threshold which determines which blocks are interesting, similar to equations 60 and 61. If the sum of the differences is less than the compare threshold, then the video encoder 31 sends a single bit token 0 and remains in the LPF_SEND mode, as illustrated in FIG. 37. The video encoder 31 does not transmit any data values corresponding to the lowpass frequency component two-by-two block.

If, on the other hand, the sum of the arithmetic differences exceeds the compare threshold, then a single bit token 1 is generated, as illustrated in FIG. 37. In this case, the video encoder 31 sends the arithmetic differences of each of the successive four data values of the new frame versus the old frame to the quantizer 37 and then to the Huffman encoder 38. The arithmetic differences are encoded and sent rather than sending the actual data values because this results in fewer bits due to the fact that the two blocks in the new and old frames are quite similar under normal circumstances.

Figure 38:
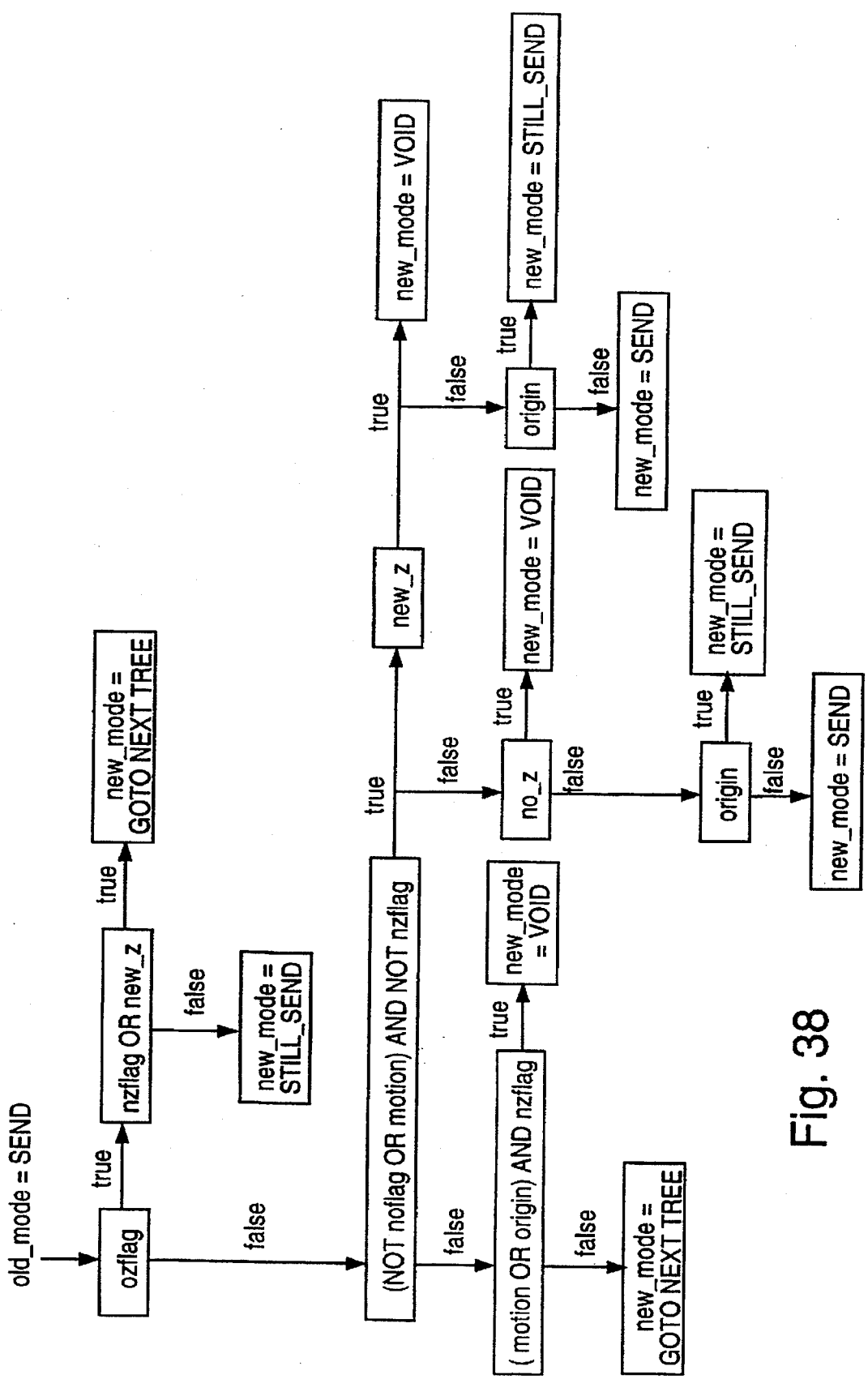
FIG. 38 is a diagram illustrating how various flags combine to generate a new mode when the inherited mode is sent in accordance with one embodiment of the present invention.

When the video encoder 31 proceeds to encode the octave 1 sub-band HHHG, as illustrated in FIG. 25, the video encoder 31 enters the SEND mode, as illustrated in FIG. 37. In this mode, the comparison tree encoder 36 compares the data values of the new two-by-two block with the data values of the old two-by-two block and performs a series of arithmetic operations to generate a series of flags, as illustrated in FIG. 38. Based on these flags, the video encoder 31 generates a 2-bit token and enters one of four new modes for that two-by-two block. If, for example, the two-by-two block HHHG in FIG. 25 is received by the video encoder 31, then flags ozflag, nzflag, new_z, noflag, motion, origin, and no_z are determined. The values of these flags are determined as:

$$nz = \sum_{y=0}^{1} \sum_{x=0}^{1} |new[x][y]| \quad (equ. 62)$$

$$no = \sum_{y=0}^{1} \sum_{x=0}^{1} |new[x][y] - old[x][y]| \quad (equ. 63)$$

$$oz = \sum_{y=0}^{1} \sum_{x=0}^{1} |old[x][y]| \quad (equ. 64)$$

nzflag=nz<limit (equ.65)

noflag=no<compare (equ.66)

origin=nz≦no (equ.67)

motion=((nz+oz)<<oct)≦no (equ.68)

new-z=|new[x][y]|<qstep, 0<x, y, ≦1 (equ.69)

no-z=|new[x][y]–old [x][y]|<qstep, 0<x,y≦1 (equ.70)

ozflag={old[x][y]=0; for all 0≦x, y≦1} (equ.71)

Based on the values of these flags, the new mode for the two-by-two block HHHG is determined, from FIG. 38.

If the new mode is determined to be the SEND mode, the 2-bit token 11 is sent as indicated in FIG. 37. The arithmetic differences of the corresponding four data values are determined, quantized, Huffman encoded, and sent into the compressed data stream 39.

In the case that the flags indicate the new mode is STILL_SEND, then the 2-bit token 01 is sent and the new four data values of the two-by-two block are quantized, Huffman encoded, and sent. Once having entered the STILL_SEND mode, the video encoder 31 remains in the STILL_SEND mode until the end of the tree has been reached. In this STILL_SEND mode, a single bit token of either 1 or 0 precedes the encoding of each block of data values. When the VOID mode is entered from STILL_SEND mode, the video encoder 31 generates a single bit 0 token, then places zeros in the corresponding addresses for that two-by-two block, and then proceeds to place zeros in the addresses of data values of the two-by-two blocks in the tree above.

In the event that the flags indicate that the video encoder 31 enters the VOID mode from SEND mode, a 2-bit token 10 is generated and the four data values of that two-by-two block are replaced with zeros. The VOID mode also results in the video encoder 31 placing zeros in all addresses of all data values of two-by-two blocks in the tree above.

In the case that the flags indicate that there is no additional information in the tree being presently encoded, namely, the new and the old trees are substantially the same, then a 2-bit token of 00 is generated and the video encoder 31 proceeds to the next tree in the decomposition.

In general, when the video encoder 31 enters VOID mode, the video encoder will remain in VOID mode until it determines that the old block already contains four zero data values. In this case, there is no reason to continue in VOID mode writing zeros into that two-by-two block or the remainder of the blocks in the tree above because it is guaranteed that the old tree already contains zeros in these blocks. This is true because the old tree in frame store 35 has previously been encoded through the inverse quantizer 41.

Because the video decoder 32 is aware of the tree structure of the decomposition, and because the video encoder 31 communicates with the video decoder 32 using tokens, the video decoder 32 is directed through the tree structure in the same manner that the video encoder 31 traverses the tree structure in generating the compressed data stream 39. In this way the video decoder 32 writes the appropriate data values from the decompressed data stream 39 into the corresponding positions of the old data frame 40. The only flag needed by the video decoder 32 is the ozflag, which the video decoder obtains by reading the contents of old frame store 40.

RATE CONTROL

All transmission media and storage media have a maximum bandwidth at which they can accept data. This bandwidth can be denoted in terms of bits per second. A standard rate ISDN channel digital telephone line has, for example, a bandwidth of 64 kbits/sec. When compressing a sequence of images in a video sequence, depending upon the amount of compression used to compress the images, there may be a relatively high number of bits per second generated. This number of bits per second may in some instances exceed the maximum bandwidth of the transmission media or storage device. It is therefore necessary to reduce the bits per second generated to insure that the maximum bandwidth of the transmission media or storage device is not exceeded.

One way of regulating the number of bits per second introduced into the transmission media or storage device involves the use of a buffer. Frames having a high number of bits are stored in the frame buffer, along with frames having a low number of bits, whereas the number of bits per second passing out of the buffer and into the transmission media or storage device is maintained at a relatively constant number. If the buffer is sufficiently large, then it is possible to always achieve the desired bit rate as long as the overall average of bits per second being input into the buffer over time is the same or less than the maximum bit rate being output from the buffer to the transmission media or storage device.

There is, however, a problem associated with large buffers in video telephony. For a large buffer, there is a significant time delay between the time a frame of video data is input into the buffer and time when this frame is output from the video buffer and into the transmission media or storage device. In the case of video telephony, large buffers may result in large time delays between the time when one user begins to speak and the time when another user begins to hear that speech. This time delay, called latency, is undesirable. For this reason, buffer size is specified in the standard H.261 for video telephony.

In accordance with one embodiment of the present invention, a rate control mechanism is provided which varies the number of bits generated per frame, on a frame by frame basis. Due to the tree encoding structure described above, the number of bits output for a given frame is dependent upon the number of trees ascended in the tree encoding process. The decisions of whether or not to ascend a tree are made in the lowest high frequency octaves of the tree structure. As can be seen from FIG. 25, there are relatively few number of blocks in the lowest frequency of the sub-bands, as compared to the number of blocks higher up in the sub-band trees. Given a particular two-by-two block in the tree structure, it is possible to decrease the value of Q in the equation for the threshold limit until that particular block is determined to be "interesting". Accordingly, a particular Q is determined at which that particular block becomes interesting. This process can be done for each block in the lowest frequency HG, GH and GG sub-bands. In this way, a histogram is generated indicating a number of two-by-two blocks in the lowest frequency of the three sub-bands which become interesting at each particular value of Q.

From this histogram, a relationship is developed of the total number of two-by-two blocks in the lowest frequency of the three sub-bands which are interesting for a given value of Q. Assuming that the number of blocks in the lowest frequency octave of the three sub-bands which are interesting for a given value of Q is representative of the number of bits which will be generated when the tree is ascended using that given value of Q, it is possible to determine the value of Q at which a desired number of bits will be generated when that frame is coded with that value of Q. Furthermore, the greater the threshold is exceeded, the more bits may be needed to encode that tree. It is therefore possible to weight by Q the number of blocks which are interesting for a given value of Q. Finally, the Q values so derived should be averaged between frames to smooth out fluctuations.

The encoder model RM8 of the CCITT Recommendation H.261 is based on the DCT and have the following disadvantages. The rate control method used by RM8 is a linear feedback technique. Buffer fullness is proportional to Q. The value of Q must be adjusted after every group of blocks (GOB) to avoid overflow or underflow effects. This means that parts of the image are transmitted at a different level quality from other parts. During parts of the image where little change occurs, Q drops which can result in uninteresting areas being coded very accurately. The objects of interest are, however, usually the moving ones. Conversely, during the coding of areas of high activity, Q rises creating large errors in moving areas. When this is combined with a block based transform, the errors can be come visually annoying.

The method of rate control described in connection with one embodiment of the present invention uses one value of Q for the whole frame. The value of Q is only adjusted between frames. All parts of an image are therefore encoded with the same value of Q. Moreover, because the tree structure allows a relatively few number of blocks to be tested to determine an estimate of the number of bits generated for a given frame, more intelligent methods of varying Q to achieve an overall desired bit rate are possible than are possible with conventional compression/decompression techniques.

TREE BASED MOTION ESTIMATION

Figure 39:
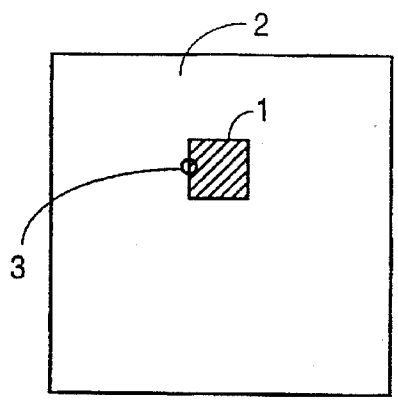
FIGS. 39–40 are diagrams of a black box on a white background illustrating motion.
Figure 40:
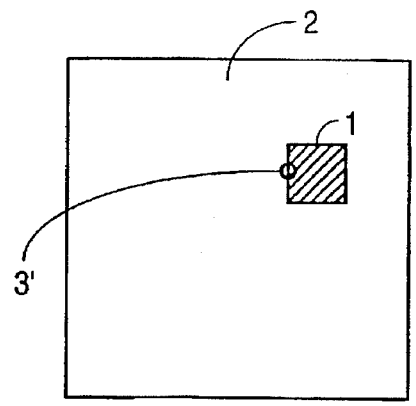

FIG. 39 represents a black box 1 on a white background 2. FIG. 40 represents the same black box 1 on the same white background 2 moved to the right so that it occupies a different location. If these two frames of FIGS. 39 and 40 are encoded according to the above described method, there will be a tree in the wavelet decomposition which corresponds with the white-to-black edge denoted 3 in FIG. 39. Similarly, there will be another tree in the wavelet decomposition of the image of FIG. 40 which represents the white-to-black edge 3' the wavelet decomposition of the image of FIG. 40. All of the data values corresponding to these two trees will be determined to be "interesting" because edges result in interesting data values in all octaves of the decomposition. Moreover, due to the movement of the corresponding edge of black box 1, all the data values of the edges of both of these two trees will be encoded as interesting data values in the resulting compressed data stream. The method described above therefore does not take into account that it is the same data values representing the same white-to-black edge which is present in both images but which is just located at a different location.

Figure 41:
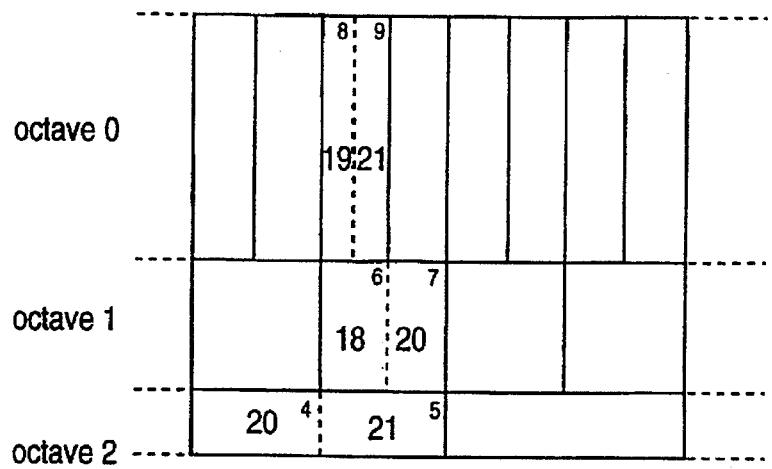
FIGS. 41–43 are one-dimensional tree structures corresponding to the motion of an edge illustrated in FIGS. 39–40.

FIG. 41 is a one dimensional representation of an edge. The corresponding low path component data values are not illustrated in FIG. 41. Data values 4, 5, 6, 7, 8, and 9 represent the interesting data values of FIG. 41 whereas the other data values have low data values which makes those blocks "non-interesting". In the representation of FIG. 41, data values 4 and 5 are considered a single two data value block. Similarly, blocks 6 and 7 are considered a single block and blocks 8 and 9 are considered a single block. FIG. 41, although it is a one dimensional representation for ease of illustration, represents the edge 3 of the frame of. FIG. 39.

Figure 42:
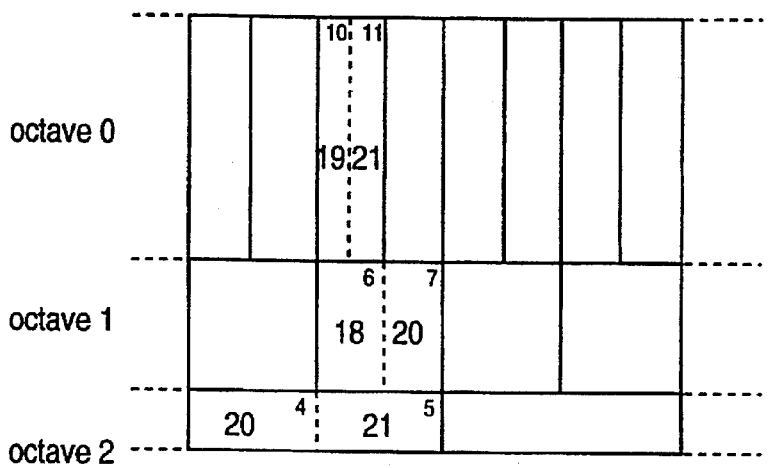

FIG. 42 represents the edge 3' shown in FIG. 40. FIG. 42 indicates that the edge of black box 1 has moved in location due to the fact that the values 19 and 21 which in FIG. 41 were in the two data value block 8 and 9 are located in FIG. 42 in the two data value block 10 and 11. In the encoding of FIG. 42, rather than encoding and sending into the compressed data stream the values 19 and 21, a control code is generated which indicates new location of the two values. Although numerous control codes are possible, only one embodiment is described here.

When the two data value block 10 and 11 is tested to determine whether it is interesting or not, the block tests to be interesting. The neighboring blocks are, however, also tested to determine whether the same values are present. In this case, the values 19 and 21 are determined to have moved one two data value block to the right. An "interesting with motion" token is therefore generated rather than a simple "interesting" token. A single bit 1 is then sent indicating that the edge represented by values 19 and 21 has moved to the right. Had the edge moved to the left, a control code of 0 would have been sent indicating that the edge represented by values 19 and 21 moved one location to the left. Accordingly, in the encoding of FIG. 42, an "interesting with motion" token is generated followed by a single control code 1. The interesting values 19 and 21 therefore need not be included in the compressed data stream. The video decoder receiving this "interesting with motion" token and this control code 1 can simply copy the interesting values 19 and 21 from the old frame into the indicated new location for these values in the new frame obviating the need for the video encoder to encode and transmit the actual interesting data values themselves. The same token and control codes can be sent for the two data values corresponding to a block in any one of the octaves 0, 1 or 2.

Figure 43:
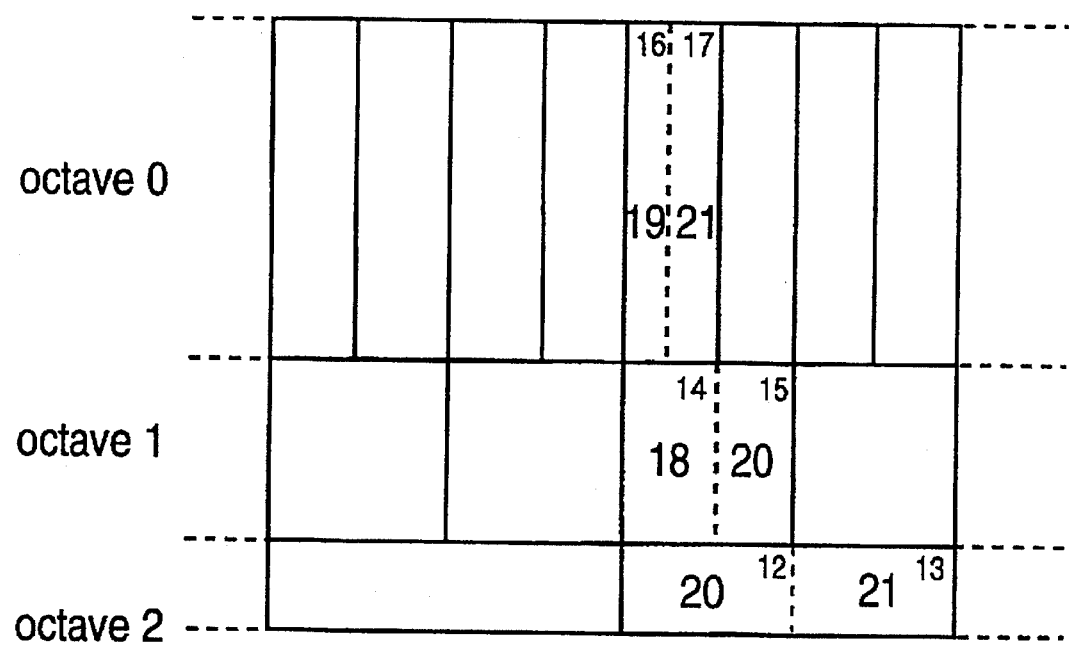

FIG. 43 represents the motion of the edge 3 of FIG. 39 to a new location which is farther removed than is the new location of black box 1 shown in FIG. 40. Accordingly, it is seen that the values 20 and 21 are located to the right at the two data value block 12 and 13. In the encoding of this two data value block 12 and 13 a token indicating "interesting with motion" is generated. Following that token, a control code 1 is generated indicating motion to the right. The video encoder therefore need not encode the data values 20 and 21 but merely needs to generate the interesting with motion token followed by the motion to the right control code. When the video encoder proceeds to the two data values block 14 and 15, the video encoder need not send the "interesting with motion" token but rather only sends the left control code 0. Similarly, when the video encoder proceeds to encode the two data value block 16 and 17, the video encoder only sends the left control code 0. The control codes for octaves 0 and 1 do not denote motion per se but rather denote left or right location above a lower frequency interesting block of the moving edge. This results in the video encoder not having to encode any of the actual data values representing the moved edge in the decomposition of FIG. 43.

The one dimensional illustration of FIGS. 41, 42 and 43 is presented for ease of illustration and explanation. It is to be understood, however, that this method of indicating edge motion is used in conjunction with the above described two dimensional wavelet decomposition such as the two dimensional wavelet decomposition illustrated in FIG. 25. The video encoder searches for movement of the data values representing an edge only by searching the nearest neighboring blocks of data values. This method can be used to search many neighbors or a few neighbors depending on the application. The counter scheme described in connection with FIGS. 26A and 26B can be used to determine the locations of those neighboring blocks. Although the edge motion illustrated in connection with FIGS. 41, 42, and 43 shows the very same data values being moved in the tree structure of the decomposition, it is to be understood that in practice the values of the data values representing the same edge may change slightly with the movement of the edge. The video encoder takes this into account by judging corresponding data values using a motion data value threshold to determine if corresponding data values in fact do represent the same edge. By indicating edge motion and not sending the edge data values themselves it is possible to both increase the compression and also improve the quality of the decompressed image.

SIX COEFFICIENT QUASI-DAUBECHIES FILTERS

The Daubechies six coefficient filters are defined by the six low pass filter coefficients, listed in the table below to 8 decimal places. The coefficients are also defined in terms of four constants, $\alpha$, $\beta$, $\gamma$ and $\epsilon$, where $\alpha=0.10588942$, $\beta=-0.54609641$, $\gamma=2.4254972$ and $\epsilon=3.0059769$.

TABLE 4

| | Daubechies coefficients | Alternative representation | Normalized coefficients | Converte Coefficients |
|---|---|---|---|---|
| a | 0.33267055 | $1/\epsilon$ | 0.2352336 | $\frac{30}{128}$ |
| b | 0.80689151 | $\gamma/\epsilon$ | 0.57055846 | $\frac{73}{128}$ |
| c | 0.45987750 | $-\beta(\alpha+\gamma)/\epsilon$ | 0.3251825 | $\frac{41}{128}$ |
| -d | -0.13501102 | $\beta(1-\alpha\gamma)/\epsilon$ | -0.095467208 | $\frac{-12}{128}$ |
| -e | -0.08544127 | $-\alpha\gamma/\epsilon$ | -0.060416101 | $\frac{-7}{128}$ |
| f | 0.03522629 | $\alpha/\epsilon$ | 0.024908749 | $\frac{3}{128}$ |

The coefficients (a, b, c, -d, -e, f) sum to $\sqrt{2}$. The normalized coefficients sum to 1, which gives the filter the property of unity gain, which in terms of the alternative representation is equivalent to a change in the value of $\epsilon$ to 4.2510934. These values can be approximated to any given precision by a set of fractions. In the example shown above, each of the normalized values has been multiplied by 128 and rounded appropriately, thus the coefficient has been converted to $30/128$. Filtering is therefore possible using integer multiplications rather than floating point arithmetic. This greatly reduces implementation cost in terms of digital hardware gate count and computer software speed. The following equations show a single step in the filtering process, the outputs H and G being the low and high pass outputs, respectively.

$$H_1 = aD_0 + bD_1 + cD_2 - dD_3 - eD_4 + fD_5 \qquad \text{(equ.72)}$$

$$G_1 = -fD_0 - eD_1 + dD_2 + cD_3 - bD_4 + aD_5 \qquad \text{(equ.73)}$$

$H_1$ and $G_1$ are calculated as follows. Each data value D is multiplied by the relevant integer numerator (30, 73, 41, 12, 7, 3) and summed as shown. The values of H and G are found by dividing the summations by the constant 128. Because 128 is an integer power of 2, the division operation requires little digital hardware to implement and only simple arithmetic shift operations to implement in software. The filters H and G are quasi-perfect reconstruction filters:

$$a+b+c-d-e+f=1 \qquad \text{(equ.74)}$$

$$-f-e+d+c-b+a=0 \qquad \text{(equ.75)}$$

$$a+c-e=\tfrac{1}{2} \qquad \text{(equ.76)}$$

$$f-d+b=\tfrac{1}{2} \qquad \text{(equ.77)}$$

Equation 74 guarantees unity gain. Equation 75 guarantees that the high pass filter will generate zero for a constant input signal. Equations 76 and 77 guarantee that an original signal once transferred can be reconstructed exactly.

The following equations show a single step in the inverse transformation:

$$D_2 = 2(-eH_0 - bG_0 + cH_1 + dG_1 + aH_2 - fG_2) \qquad \text{(equ.78)}$$

$$D_3 = 2(fH_0 + aG_0 - dH_1 + cG_1 + bH_2 - eG_2) \qquad \text{(equ.79)}$$

As for the forward filtering process, the interleaved H and G data stream is multiplied by the relevant integer numerator and summed as shown. The output D data values are found by dividing the summations by the constant 64, which is also an integer power of 2.

To calculate the first and last H and G values, the filter equations must be altered such that values outside the boundaries of the data stream are not required. For example, if $H_0$ is to be calculated using the six coefficient filter, the values $D_{-1}$ and $D_{-2}$ would be required. Because these values are not defined, a different filter is used at the beginning and end of the data stream. The new filters are determined such that the reconstruction process for the first and last two data values is possible. The following pair of equations show the filter used to calculate the first H and G values:

$$H_0 = cD_0 - dD_1 - eD_2 + fD_3 \qquad (equ. 80)$$

$$G_0 = dD_0 + cD_1 - bD_2 + aD_3 \qquad (equ. 81)$$

The last H and G values are calculated with:

$$H_5 = aD_8 + bD_9 + cD_A - dD_B \qquad (equ. 82)$$

$$G_5 = fD_8 - eD_9 + dD_A + cD_B \qquad (equ. 83)$$

In this case, these equations are equivalent to using the non-boundary equations with data values outside the data stream being equal to zero. The following inverse transform boundary filters are used to reconstruct the first two and last two data values:

$$D_0 = 2\left(\left(c - \frac{b}{\beta}\right)H_0 + \left(d + \frac{e}{\beta}\right)G_0 + aH_1 - fg_1\right) \qquad (equ.\ 84)$$

$$D_1 = 2\left(\left(\frac{a}{\beta} - d\right)H_0 + \left(c - \frac{f}{\beta}\right)G_0 + bH_1 - eg_1\right) \qquad (equ.\ 85)$$

$$D_A = 2\left(-eH_4 - bG_4 + \left(c - \frac{f}{\beta}\right)H_5 + \left(d - \frac{a}{\beta}\right)G_5\right) \qquad (equ.\ 86)$$

$$D_B = 2\left(fH_4 + aG_4 - \left(d + \frac{e}{\beta}\right)H_5 + \left(c - \frac{b}{\beta}\right)G_5\right) \qquad (equ.\ 87)$$

Although the present invention has been described by way of the above described specific embodiments, it will be understood that certain adaptations, modifications, rearrangements or combinations of various features of the specific embodiments may be practiced without departing from the scope of the invention. Filters other than the four coefficient quasi-Daubechies filters can be used. In some embodiments, six coefficient quasi-Daubechies filters are used. Embodiments of this invention may, for example, be practiced using a one-dimensional tree structure, a two-dimensional tree structure, or a three-dimensional tree structure. Rather than testing whether or not a two-by-two block of data values is interesting, blocks of other sizes may be used. Three-by-three blocks of data values may, for example, be tested. Blocks of different sizes may be used in different octaves of a decomposition. In certain embodiments, there are different types of interesting blocks. The use of tokens in combination with use of a tree structure of a decomposition to reduce the number of data values encoded may be extended to include other tokens having other meanings. The "interesting with motion" token is but one example. Tree structures may be used in numerous ways to estimate the activity of a frame for rate control purposes. Numerous boundary filters, thresholds, encoder and decoder modes, token schemes, tree traversing address generators, quantization schemes, Huffman-like codes, and rate control schemes will be apparent from the specific embodiments. The above-described specific embodiments are therefore described for instructional purposes only and are not intended to limit the invention as set forth in the appended claims. The method for decompressing video disclosed in U.S. patent application Ser. No. 08/040,301 entitled "Data Compression and Decompression" is modified to increase execution speed. Although the b=19/32, a=11/32, c=5/32 and d=3/32 coefficients used to realize the high and low pass forward transform perfect reconstruction digital filters are used by dedicated hardware to compress in accordance with the present invention as set forth in U.S. patent application Ser. No. 08/040,301, the coefficients b=5/8, a=3/8, c=1/8 and d=1/8 are used to decompress in software on a digital computer. The coefficients are determined as shown in the table below.

TABLE 5

$$a = \frac{1 + \sqrt{3}}{8} \approx .3415(8) = 2.732 \approx \frac{3}{8}$$

$$b = \frac{3 + \sqrt{3}}{8} \approx .5915(8) = 4.732 \approx \frac{5}{8}$$

$$c = \frac{3 - \sqrt{3}}{8} \approx .1585(8) = 1.268 \approx \frac{1}{8}$$

$$d = \frac{-1 + \sqrt{3}}{8} \approx .0915(8) = 0.732 \approx \frac{1}{8}$$

An even start inverse transform digital filter in accordance with the present invention is:

$$D_0 = 4[(b-a) H_0 + (c-d) G_0] \qquad (equ.\ 87)$$

where, for example, $D_0$ is a first inverse transformed data value indicative of a corresponding first data value of a row of the original image, and where $H_0$ and $G_0$ are first low and high pass component transformed data values of a row of a sub-band decomposition.

An odd end inverse transform digital filter in accordance with the present invention is:

$$D_B = 4[(c+d) H_5 - (a+b) G_5] \qquad (equ.\ 88)$$

where, for example, $D_B$ is a last inverse transformed data value indicative of a corresponding last data value of a row of the original image, and where $H_5$ and $G_5$ are last low and high pass component transformed data values of a row of a sub-band decomposition.

An odd interleaved inverse transform digital filter in accordance with the present invention is:

$$\frac{D(2x-1)}{2} = \frac{1}{8} H(x-1) - \frac{5}{8} G(x-1) + \frac{3}{8} H(x) + \frac{1}{8} G(x) \qquad (equ.\ 89)$$

An even interleaved inverse transform digital filter in accordance with the present invention is:

$$\frac{D(2x)}{2} = -\frac{1}{8} H(x-1) + \frac{3}{8} G(x-1) + \frac{5}{8} H(x) + \frac{1}{8} G(x) \qquad (equ.\ 90)$$

As indicated by equations 89 and 90, the odd and even interleaved inverse transform digital filters operable on the same H and G values of the sub-band decomposition but generate the odd and even inverse transformed data values in a row between the even start and odd end filters of equations 87 and 88.

Using the above even start, odd end, odd interleaved and even interleaved inverse transform digital filters, a frame rate of approximately 15 frames/second is realizable executing on a Macintosh Quadra personal computer having a 68040 microprocessor. Digital filters using the coefficients b=⅝, a=⅜, c=⅛ and d=⅛ may also be realized in dedicated digital hardware to reduce the cost of a dedicated hardware implementation where a slightly lower compression ratio is acceptable.

To further increase software decompression speed when decompressing video on a digital computer, only two octaves of inverse transform are performed on video which was previously compressed using three octaves of forward transform. This results in the low pass component of the octave 0 decomposition. The low pass component of the octave 0 decomposition is a non-aliased high quality quarter size decimated version of the original image. Rather than performing octave 0 of inverse transform, horizontal linear interpolation is used to expand each row of data values of the low pass component of the octave 0 decomposition into twice the number of data values. To expand the number of rows, each row of interpolated data values is replicated once so that the total number of rows is doubled. In some embodiments, interpolation techniques other than linear interpolation are used to improve image quality. For example, spline interpolation or polynomial interpolation may be used.

To further increase software execution speed when decompressing video, luminance data values are decompressed using the digital filters of equations 87, 88, 89 and 90. The chrominance data values, on the other hand, are decompressed using even and odd interleaved reconstruction filters having a fewer number of coefficient than four. In one embodiments, two coefficient odd interleaved Haar and even interleaved Haar filters are used. The even interleaved Haar reconstruction filter is:

$$D_0=(H_0+G_0) \quad \text{(equ. 91)}$$

The odd interleaved Haar reconstruction filter is:

$$D_1=(H_0-G_0) \quad \text{(equ. 92)}$$

Because the above Haar filters each only have two coefficients, there is no boundary problem as is addressed in U.S. patent application Ser. No. 08/040,301. Accordingly, another start inverse transform digital filter and another end inverse transform digital filter are not used.

To increase software execution speed still further when decompressing video, variable-length SEND and STILL__SEND tokens are used. Data values are encoded using a Huffman code as disclosed in U.S. patent application Ser. No. 08/040,301 whereas tokens are generated in variable-length form and appear in this variable-length form in the compressed data stream. This allows decompression to be performed without first calculating flags.

Figure 44:
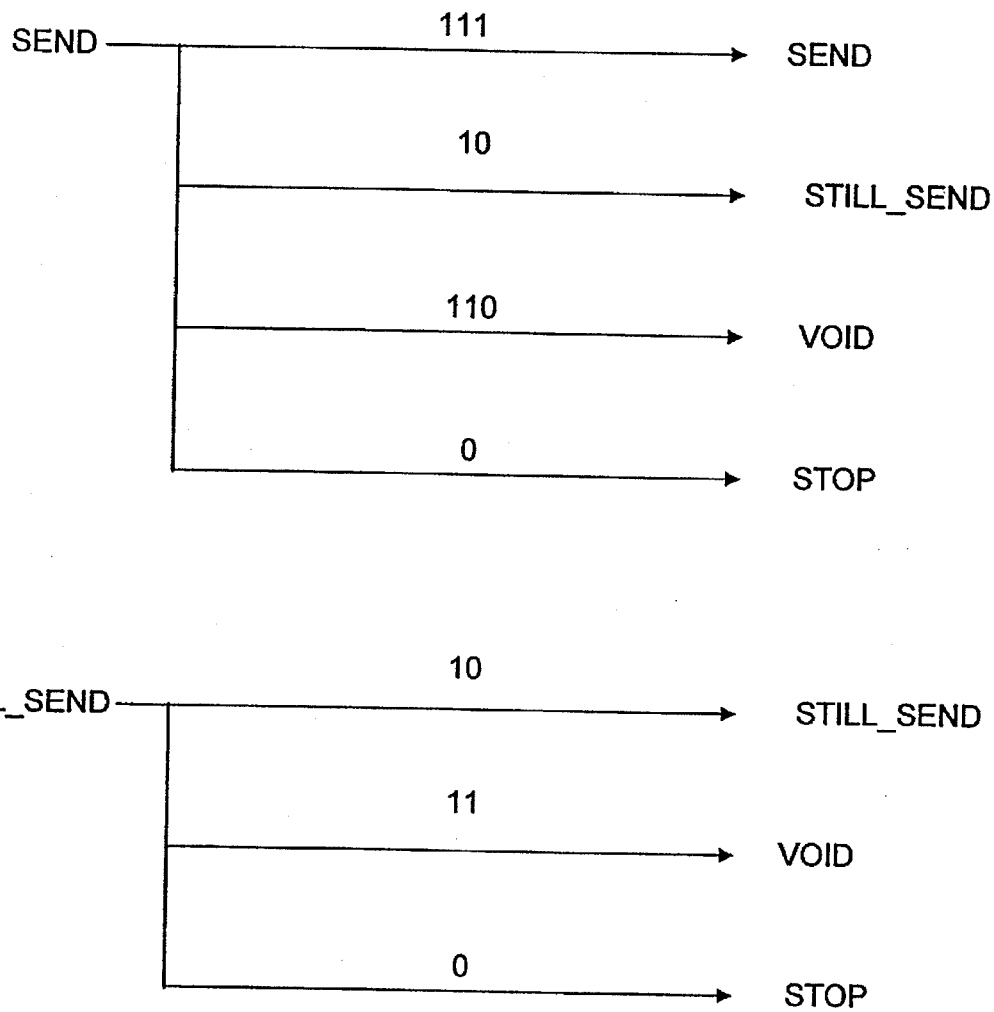
FIG. 44 is a diagram illustrating variable-length tokens in accordance with one embodiment of the present invention.

FIG. 44 shows variable-length tokens used for encoding and decoding in accordance with some embodiments of the present invention. Because transitions from SEND mode to STOP mode or from STILL__SEND mode to STOP mode occur most frequently of the transitions indicated in FIG. 44, the corresponding tokens consist of only one bit.

In general, if an area changes from white to black in two consecutive frames of a video sequence and if the encoder is in LPF__SEND mode, then the difference between the corresponding data values after quantization will be much larger than 37. 37 is the maximum number encodable using the specific Huffman code set forth in U.S. patent application Ser. No. 08/040,301. Because such a large change in data value cannot be encoded, an artifact will be generated in the decompressed image for any change in quantized data values exceeding 37. Accordingly, the Huffman code in the table below is used in accordance with one embodiment of the present invention.

TABLE 6

| HUFFMAN CODE | qindex |
|---|---|
| 0 | 0 |
| 1s1 | ±1 |
| 1s01 | ±2 |
| 1s001 | ±3 |
| 1s0001 | ±4 |
| 1s00001 | ±5 |
| 1s000001 | ±6 |
| 1s0000001 | ±7 |
| 1s0000000  (\|qindex\|–8) | ±8 ... ±135 |

In Table 6 above, the value (|qindex|–8) is seven bits in length. The s in Table 2 above is a sign bit.

Although the present invention has been described by way of the above-described specific embodiment, it will be understood that certain adaptations, modifications, rearrangements are combinations of various features of the specific embodiment described may be practiced without departing from the scope of the invention. The present invention is not limited to video mail applications and the method disclosed is not limited to systems using dedicated hardware to compress and software executing on a digital computer to decompress. Digital circuitry of a general purpose digital computer having a microprocessor may however be used to decode and inverse transform a compressed image data stream in some embodiments. The coefficients ⅝, ⅜, ⅛ and ⅛ independent of sign may be the four coefficients of four coefficient high and low pass forward transform perfect reconstruction digital filters used to transform image data values into a sub-band decomposition. The above-described specific embodiment is therefore described for instructional purposes only and is not intended to limit the invention as set forth in the appended claims.

We claim:

1. A method for compressing a first image represented by a first matrix of pixels into an encoded data sequence for transmission and/or storage, where each of said pixels is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points;

(d) selecting interleaved low and high frequency values at one or more octaves from said filtered digital signal array via a plurality of counters and predefined sub-indices;

(e) encoding said selected interleaved low and high frequency values at one or more octaves to produce encoded data values;

(f) repeating steps (d) and (e) for all the interleaved low and high values at one or more octaves in said filtered digital signal array to accumulate the encoded data values to produce an encoded data sequence having a second combined data length where said second combined data length is smaller than said first combined data length;

(g) evaluating the encoded data values in said encoded data sequence to identify the placement of reproduced interleaved low and high frequency values in a second filtered digital signal array;

(h) decoding the encoded data values in said encoded data sequence to produce said second filtered digital signal array having a plurality of reproduced filtered boundary subsequences and a plurality of reproduced filtered non-boundary subsequences;

(i) using an inverse boundary quasi-perfect reconstruction filter to reconstruct reconstructed boundary subsequences from said reproduced filtered boundary subsequences; and (j) using an inverse non-boundary quasi-perfect reconstruction filter to reconstruct reconstructed non-boundary subsequences from said reproduced filtered non-boundary subsequences, said reconstructed boundary subsequences and said reconstructed non-boundary subsequences forming output digital signal data points for a second matrix of pixels representing a second image, said inverse boundary quasi-perfect reconstruction filter and said inverse non-boundary quasi-perfect reconstruction filter use a plurality of coefficients and a plurality of decoded data points in reconstructing said reconstructed boundary subsequence and said reconstructed non-boundary subsequence, said plurality of coefficients including defined values a, b, c and d, where a equals $3/8$, b equals $5/8$, c equals $1/8$, and d equals $1/8$.

2. A method for compressing a first image represented by a first matrix of pixels into an encoded data sequence for transmission and/or storage, where each of said pixels containing luminance data point and chrominance data point and is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points;

(d) selecting interleaved low and high frequency values at one or more octaves from said filtered digital signal array via a plurality of counters and predefined sub-indices;

(e) encoding said selected interleaved low and high frequency values at one or more octaves to produce encoded data values;

(f) repeating steps (d) and (e) for all the interleaved low and high values at one or more octaves in said filtered digital signal array to accumulate the encoded data values to produce an encoded data sequence having a second combined data length where said second combined data length is smaller than said first combined data length;

(g) evaluating the encoded data values in said encoded data sequence to identify the placement of reproduced interleaved low and high frequency values in a second filtered digital signal array;

(h) decoding the encoded data values in said encoded data sequence to produce said second filtered digital signal array having a plurality of reproduced filtered boundary subsequences and a plurality of reproduced filtered non-boundary subsequences;

(i) using a first inverse non-boundary quasi-perfect reconstruction filter to reconstruct reconstructed non-boundary subsequences representing said luminance data points from said reproduced filtered non-boundary subsequences;

(j) using a second inverse boundary quasi-perfect reconstruction filter to reconstruct reconstructed boundary subsequences representing said chrominance data points from said reproduced filtered boundary subsequences; and (k) using a second inverse non-boundary quasi-perfect reconstruction filter to reconstruct reconstructed non-boundary subsequences representing said chrominance data points from said reproduced filtered non-boundary subsequences;

said first inverse boundary quasi-perfect reconstruction filter and said first inverse non-boundary quasi-perfect reconstruction filter use a first plurality of coefficients and a first plurality of decoded data points, said second inverse boundary quasi-perfect reconstruction filter and said second inverse non-boundary quasi-perfect reconstruction filter use a second plurality of coefficients and a second plurality of decoded data points, the number of coefficients in said first plurality of coefficients and the number of coefficients in said second plurality of coefficients are different; and said reconstructed boundary subsequence representing said luminance data points, said reconstructed boundary subsequence representing said chrominance data points, said reconstructed non-boundary subsequence representing said luminance data points, and said reconstructed non-boundary subsequence representing said chrominance data points forming said output digital signal sequence.

3. A method for compressing a first image represented by a first matrix of pixels into an encoded data sequence for transmission and/or storage, where each of said pixels is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points;

(d) selecting interleaved low and high frequency values at one or more octaves from said filtered digital signal array via a plurality of counters and predefined sub-indices;

(e) encoding said selected interleaved low and high frequency values at one or more octaves to produce encoded data values wherein said encoding includes huffman encoding said values to produce encoded data values, wherein the following huffman encoding table is used:

| HUFFMAN CODE | qindex |
| --- | --- |
| 0 | 0 |
| 1s1 | ±1 |
| 1s01 | ±2 |
| 1s001 | ±3 |
| 1s0001 | ±4 |
| 1s00001 | ±5 |

-continued

| HUFFMAN CODE | qindex |
| --- | --- |
| 1s000001 | ±6 |
| 1s0000001 | ±7 |
| 1s0000000 (q\|qindex\| − 8) | ±8 ... ±135 | where said qindex is a coded data subsequence from said coded sequence and s is a sign bit; and (f) repeating steps (d) and (e) for all the interleaved low and high values at one or more octaves in said filtered digital signal array to accumulate the encoded data values to produce an encoded data sequence having a second combined data length where said second combined data length is smaller than said first combined data length.

4. A method for compressing a first image represented by a first matrix of pixels into an encoded data sequence for transmission and/or storage, where each of said pixels is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves, said low pass boundary forward quasi-perfect reconstruction filter and said high pass boundary forward quasi-perfect reconstruction filter using a first plurality of coefficients;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points, said low pass non-boundary forward quasi-perfect reconstruction filter and said high pass non-boundary forward quasi-perfect reconstruction filter using said first plurality of coefficients;

(d) selecting interleaved low and high frequency values at one or more octaves from said filtered digital signal array via a plurality of counters and predefined sub-indices;

(e) encoding said selected interleaved low and high frequency values at one or more octaves to produce encoded data values;

(f) repeating steps (d) and (e) for all the interleaved low and high values at one or more octaves in said filtered digital signal array to accumulate the encoded data values to produce an encoded data sequence having a second combined data length where said second combined data length is smaller than said first combined data length;

(g) evaluating the encoded data values in said encoded data sequence to identify the placement of reproduced interleaved low and high frequency values in a second filtered digital signal array;

(h) decoding the encoded data values in said encoded data sequence to produce said second filtered digital signal array having a plurality of reproduced filtered boundary subsequences and a plurality of reproduced filtered non-boundary subsequences;

(i) using an inverse boundary quasi-perfect reconstruction filter to reconstruct reconstructed boundary subsequences from said reproduced filtered boundary subsequences, said inverse boundary quasi-perfect reconstruction filter using at least one second coefficient; and (j) using an inverse non-boundary quasi-perfect reconstruction filter to reconstruct reconstructed non-boundary subsequences from said reproduced filtered non-boundary subsequences, said inverse non-boundary quasi-perfect reconstruction filter using said at least one second coefficient, wherein the number of coefficients in said first plurality of coefficients is more than the number of coefficients in said at least one second coefficient, said reconstructed boundary subsequence and said reconstructed non-boundary subsequence forming said output digital signal sequence.

5. A method for compressing a first image represented by a first matrix of pixels into an encoded data sequence for transmission and/or storage, where each of said pixels is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points;

(d) selecting interleaved low and high frequency values at one or more octaves from said filtered digital signal array via a plurality of counters and predefined subindices;

(e) encoding said selected interleaved low and high frequency values at one or more octaves to produce encoded data values;

(f) repeating steps (d) and (e) for all the interleaved low and high values at one or more octaves in said filtered digital signal array to accumulate the encoded data values to produce an encoded data sequence having a second combined data length where said second combined data length is smaller than said first combined data length;

(g) evaluating the encoded data values in said encoded data sequence to identify the placement of reproduced interleaved low and high frequency values in a second filtered digital signal array;

(h) decoding the encoded data values in said encoded data sequence to produce said second filtered digital signal array having a plurality of reproduced filtered boundary subsequences and a plurality of reproduced filtered non-boundary subsequences; and (i) using an inverse quasi-perfect reconstruction filter to reconstruct reconstructed boundary subsequences and reconstructed non-boundary subsequences from said reproduced filtered boundary subsequences and said reproduced filtered non-boundary subsequence, said inverse quasi-perfect reconstruction filter is an even interleaved Haar reconstruction filter for even position output digital signal data points and is an odd interleaved Haar reconstruction filter for odd position digital signal data points.

6. A method as recited in 5 wherein said even interleaved Haar reconstruction filter produces a output digital signal data point $D_0$ in accordance with the following relationship:

$$D_0 = H_0 + G_0$$

wherein $H_0$ is a low pass filtered digital signal data point, and $G_0$ is a high pass filtered digital signal data point.

7. A method as recited in 5 wherein said odd interleaved Haar reconstruction filter produces a output digital signal data point $D_1$ in accordance with the following relationship:

$$D_1 = H_0 - G_0$$

wherein $H_0$ is a low pass filtered digital signal data point, and $G_0$ is a high pass filtered digital signal data point.

8. A method for compressing a first image represented by a first matrix of pixels into an encoded data sequence for transmission and/or storage, where each of said pixels is represented by an input digital signal data point, and for decompressing the encoded data sequence into a plurality of output digital signal data points corresponding to a second matrix of pixels representing a second image, wherein said input digital signal data points at or near boundary of the image comprise a plurality of boundary subsequences and said input digital signal data points not at or near the boundary of the image comprise a plurality of non-boundary subsequences, comprising the steps of:

(a) identifying each boundary subsequence and each non-boundary subsequence of a first image represented by a first matrix of pixels, each of said pixels represented by an input digital signal data point, said input digital signal data points forming said first image having a first combined data length;

(b) filtering each said boundary subsequence using a low pass boundary forward quasi-perfect reconstruction filter and a high pass boundary forward quasi-perfect reconstruction filter to produce a plurality of filtered boundary subsequences including interleaved low and high frequency values at one or more octaves;

(c) filtering each said non-boundary subsequence using a low pass non-boundary forward quasi-perfect reconstruction filter and a high pass non-boundary forward quasi-perfect reconstruction filter to produce a plurality of filtered non-boundary subsequences including interleaved low and high frequency values at one or more octaves, said interleaved low and high frequency values of said filtered boundary subsequences and said filtered non-boundary subsequences forming a filtered digital signal array having a plurality of filtered digital signal data points;

(d) selecting interleaved low and high frequency values at one or more octaves from said filtered digital signal array via a plurality of counters and predefined sub-indices;

(e) encoding said selected interleaved low and high frequency values at one or more octaves to produce encoded data values, said encoded data values comprising of a plurality of tokens and a plurality of coded data values, wherein each of said tokens indicates a mode;

(f) repeating steps (d) and (e) for all the interleaved low and high values at one or more octaves in said filtered digital signal array to accumulate the encoded data values to produce an encoded data sequence having a second combined data length where said second combined data length is smaller than said first combined data length;

(g) evaluating the encoded data values in said encoded data sequence to identify the placement of reproduced interleaved low and high frequency values in a second filtered digital signal array;

(h) using said tokens to decode the coded data values in said encoded data sequence to produce said second filtered digital signal array having a plurality of reproduced filtered boundary subsequences and a plurality of reproduced filtered non-boundary subsequences;

(i) using an inverse boundary quasi-perfect reconstruction filter to reconstruct reconstructed boundary subsequences from said reproduced filtered boundary subsequences; and (j) using an inverse non-boundary quasi-perfect reconstruction filter to reconstruct reconstructed non-boundary subsequences from said reproduced filtered non-boundary subsequences, said reconstructed boundary subsequences and said reconstructed non-boundary subsequences forming output digital signal data points for a second matrix of pixels representing a second image.

* * * * *